US012560766B2

(12) United States Patent
De Jong et al.

(10) Patent No.: US 12,560,766 B2
(45) Date of Patent: Feb. 24, 2026

(54) MALE PLUG OPTICAL CONNECTORS FOR USE WITH A CONVERSION ADAPTER FOR MATING WITH DISSIMILAR CONNECTOR

(71) Applicant: CORNING RESEARCH & DEVELOPMENT CORPORATION, Corning, NY (US)

(72) Inventors: Michael De Jong, Colleyville, TX (US); Ashley Wesley Jones, Denton, TX (US); Gordon Mueller-Schlomka, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 277 days.

(21) Appl. No.: 18/226,907

(22) Filed: Jul. 27, 2023

(65) Prior Publication Data

US 2025/0035857 A1    Jan. 30, 2025

Related U.S. Application Data

(63) Continuation of application No. PCT/US2023/028527, filed on Jul. 25, 2023.

(Continued)

(51) Int. Cl.
G02B 6/38 (2006.01)

(52) U.S. Cl.
CPC ......... G02B 6/3831 (2013.01); G02B 6/3825 (2013.01); G02B 6/3861 (2013.01)

(58) Field of Classification Search
CPC .......................... G02B 6/3831; G02B 6/3861
See application file for complete search history.

(56) References Cited

U.S. PATENT DOCUMENTS

| | | | |
|---|---|---|---|
| 2009/0148101 A1 | 6/2009 | Lu et al. | |
| 2020/0064561 A1 | 2/2020 | Alrutz | |
| 2023/0204868 A1* | 6/2023 | Baca .................... | G02B 6/3897 |
| | | | 385/60 |

FOREIGN PATENT DOCUMENTS

WO        2022/047277 A1      3/2022

OTHER PUBLICATIONS

International Search Report and Written Opinion of the International Searching Authority; PCT/US2023/028527; dated Nov. 2, 2023; 13 pages; European Patent Office.

* cited by examiner

*Primary Examiner* — Sung H Pak
(74) *Attorney, Agent, or Firm* — Michael E. Carroll, Jr.

(57) ABSTRACT

Male plug fiber optic connectors and a conversion adapter for mating with a dissimilar connector are disclosed along with cable assemblies using the same, thereby providing backwards compatibility with existing optical networks. The fiber optic connector comprises a ferrule, a connector housing having a female key disposed on the outer surface along with a threaded portion integrally formed on the connector housing, and a nose-piece having a pocket disposed at a front portion. The pocket of the nose-piece is configured for allowing optical mating with a dissimilar connector using the conversion adapter for legacy connectivity while also mating with other devices without using the conversion adapter. In one embodiment, the conversion adapter comprises a retainer that cooperates with the threaded portion of the connector housing for securing the conversion adapter to the male plug fiber optic connector. The fiber optic connectors disclosed advantageously allow for optical mating with dissimilar optical connectors with a quick and easy assembly for rugged applications or other optical communication networks.

65 Claims, 40 Drawing Sheets

Related U.S. Application Data

(60) Provisional application No. 63/393,523, filed on Jul. 29, 2022.

20

21

25

20G 20L
20W

23

20N

20R

TP

Z

X

Y

MALE PLUG OPTICAL CONNECTORS FOR USE WITH A CONVERSION ADAPTER FOR MATING WITH DISSIMILAR CONNECTOR

RELATED APPLICATIONS

This application is a continuation of International Patent Application No. PCT/US23/028527 filed Jul. 25, 2023, which claims the benefit of priority of U.S. Provisional Application Ser. No. 63/393,523 filed on Jul. 29, 2022, the content of which is relied upon and incorporated herein by reference in its entirety.

FIELD

The disclosure is directed to male plug optical connectors along with a conversion adapter for mating with a dissimilar connector, thereby providing backwards compatibility to existing connectors, devices or equipment in an optical network.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extends deeper into communication networks there exist a need for building more complex and flexible fiber optic networks using fiber optic connectors that are capable of making connections in a quick and easy manner.

Fiber optic connectors were developed for making plug and play optical connections at links or devices in the communication network such as terminals, cabinets, patch panels, and like. The fiber optic connectors allow the distribution of optical signals within an optical network and provide the flexibility of locating the devices in convenient locations for efficient network design and deployment and also deferring connectivity and the associated expense until needed in the communication network. As the deployment of optical networks expands more multi-fiber optical connectors are needed for building a suitable communications network. Multi-fiber connectors using a ferrule that supports and connects multiple optical fibers at a ferrule mating interface are much more challenging than optical connectors having ferrules that support a single optical fiber. Specifically, optical connectors with ferrules supporting multiple fibers requires the alignment and physical contact of all the end faces of the multiple optical fibers across the fiber array, and all of the optical channels of the optical connector need to meet the optical mating performance specification.

Different types of optical connectors exist and are deployed by network operators, but are typically not compatible with newer connector designs. This causes concerns and complexity for network operators for managing their communication networks. Specifically, network operators desire connectors will be compatible with the already installed equipment and optical connectors (i.e., legacy connectors) in their networks along with optical mating with new equipment and optical connectors that have different connector mating interfaces that may have improved characteristics.

Consequently, there exists an unresolved need for fiber optic connector designs that provide quick and easy manufacturing in a flexible manner while being able to optical mate with intended devices, ports or like and also being configured for optically mating with dissimilar connector designs in a simple manner while still providing reliable optical performance for the various mating connectors.

SUMMARY

The disclosure is directed to an assemblies comprising male plug multi-fiber optical connectors having a nosepiece along with a conversion adapter. The conversion adapter comprises an adapter, a coupling nut, and a retainer for securing the conversion adapter to the male plug multi-fiber optical connector. The conversion adapter allows the male plug multi-fiber connector to mate with a dissimilar connector for backwards compatibility in an optical network. Consequently, the male plug multi-fiber optical connector may be optically mated to a first type of interface such as a suitable configured port or inline connector designed to directly mate with the male plug multi-fiber optical connector while also advantageously being able to optically mate with a dissimilar connector using the conversion adapter. The disclosure is also directed to fiber optic cable assemblies having a fiber optic cable terminated with the male plug multi-fiber connector and/or the conversion adapter.

The conversion adapter of the conversion assembly comprises a passageway sized for receiving the male plug multi-fiber connector at a first end of a passageway and receives the dissimilar connector at the second end of the passageway of the adapter for mating the dissimilar connectors. The retainer is used for securing the conversion adapter to the male plug multi-fiber connector, and the coupling nut is configured for securing the dissimilar connector to the conversion adapter for the optical mating. The retainer is sized for fitting into a window at the forward portion of the adapter and may engage a threaded portion integrally formed on the outer surface of the connector housing for securing the adapter to the male plug multi-fiber connector.

The disclosure is directed to the male plug optical connector comprising a ferrule having a plurality of bores for optical fibers, a connector housing and a nosepiece that attaches to a front portion of the connector housing. The connector housing comprises a longitudinal passageway extending from a front to a rear end along with a female key disposed on an outer surface of the connector housing along with a threaded portion integrally formed on the outer surface of the connector housing. The nosepiece comprises a pocket extending from a front end to a medial portion configured for allowing optical mating with a dissimilar connector. The longitudinal passageway of the connector housing is sized so that the ferrule may pass through a rear opening of the connector housing through the longitudinal passageway and through a front opening of the connector housing for assembly. The ferrule is received in a passageway of a nosepiece and the nosepiece is attached to the connector housing when assembled. Methods of making cable assemblies are also disclosed.

One aspect of the disclosure is directed to a male plug multi-fiber optical connector that may be used with a conversion adapter if desired for mating the male plug connector with a dissimilar connector. The male plug connector comprises a ferrule comprising an optical mating end face and a plurality of bores for receiving one or more optical fibers, a nosepiece, and a connector housing. The nosepiece comprises a front portion and a rear portion along with a passageway extending from a front end to a rear end. The front portion of the nosepiece comprises a pocket disposed forward of a male key on a same side of the nosepiece, and the rear portion comprises at least one cantilevered arm. The connector housing comprises a longitudinal passageway extending from the rear end to the front end, and a female key disposed on the outer surface along with a threaded portion integrally formed on an outer surface of the connector housing. The optical mating end face of the ferrule is disposed rearward of the front end of the nosepiece by a recess depth of 1 millimeter or less when the connector is assembled, thereby providing easy inspection or cleaning of the optical mating end face of the ferrule.

The conversion adapter disclosed herein comprises an adapter, a coupling nut, and a retainer. The adapter comprises a passageway capable of receiving a portion of the connector housing of the male plug connector therein along with a female keyway on an outer surface of the adapter for keying with a dissimilar connector, and a window disposed adjacent to the female keyway. The coupling nut is capable of receiving a portion of the adapter therethrough and comprising internal threads for securing the optical mating with an OptiTip® connector available from Corning. The retainer is sized for fitting into the window of the adapter for securing the adapter to the connector housing by engaging the threaded portion of the connector housing.

Another aspect of the disclosure is directed to a male plug multi-fiber optical connector and a conversion adapter for mating the male plug connector with a dissimilar connector. The male plug connector comprising a ferrule comprising a plurality of bores for receiving one or more optical fibers, a nosepiece, and a connector housing. The connector housing comprises a longitudinal passageway extending from a rear end to a front end of the connector housing with a female key is disposed on an outer surface of the connector housing and a locking feature that is integrally formed in the connector housing. The nosepiece comprising a front portion and a rear portion along with a passageway extending from a front end to a rear end. The front portion comprises a pocket disposed forward of a male key on the same side of the nosepiece, and the rear portion comprises a first cantilevered arm and a second cantilevered arm. The conversion adapter comprises an adapter, a coupling nut, and a retainer. The adapter comprises a passageway capable of receiving a portion of the connector housing of the male plug connector therein, and comprising a female keyway on an outer surface of the adapter for keying with a dissimilar connector, and the coupling nut capable of receiving a portion of the adapter therethrough and comprising internal threads. The retainer is sized for fitting into the window of the adapter for securing the adapter to the connector housing.

Yet another aspect of the disclosure is directed to a male plug multi-fiber optical connector and a conversion adapter for mating the male plug connector with a dissimilar connector. The male plug connector comprising a ferrule comprising a plurality of bores for receiving one or more optical fibers, a nosepiece, and a connector housing. The nosepiece comprising a front portion and a rear portion along with a passageway extending from a front end to a rear end of the nosepiece. The front portion comprises a pocket disposed forward of a male key on the same side of the nosepiece, and the rear portion comprises a first cantilevered arm and a second cantilevered arm. The connector housing comprises a longitudinal passageway extending from a rear end to a front end with a female key is disposed on an outer surface of the connector housing and a locking feature is integrally formed in the connector housing along with a threaded portion integrally formed on the connector housing. The connector housing comprises a front opening sized for receiving a portion of the first cantilevered arm and a portion of the second cantilevered arm. The longitudinal passageway is sized so that the ferrule may pass through a rear opening of the connector housing through the longitudinal passageway and through a front opening of the connector housing. The conversion adapter comprises an adapter, a coupling nut, and a retainer. The adapter comprises a passageway capable of receiving a portion of the connector housing of the male plug connector therein, and comprising a female keyway on an outer surface of the adapter for keying with the dissimilar connector, and a window disposed adjacent to the female keyway, the coupling nut capable of receiving a portion of the adapter therethrough and comprising internal threads. The retainer is sized for fitting into the window of the adapter for securing the adapter to the connector housing by engaging the threaded portion of the connector housing.

Still another aspect of the disclosure is directed to a male plug multi-fiber optical connector and a conversion adapter for mating the male plug connector with a dissimilar connector. The male plug connector comprising a ferrule comprising a plurality of bores for receiving one or more optical fibers, a nosepiece, and a connector housing. The nosepiece comprising a front portion and a rear portion along with a passageway extending from a front end to a rear end of the nosepiece. The front portion comprises a pocket disposed forward of a male key on the same side of the nosepiece, and the rear portion comprises a first cantilevered arm and a second cantilevered arm, and the passageway is sized for receiving the ferrule therein. The connector housing comprises a longitudinal passageway extending from a rear end to a front end with a female key disposed on an outer surface of the connector housing and a locking feature integrally formed in the connector housing along with a threaded portion integrally formed on the connector housing, and the connector housing comprises a front opening sized for receiving a portion of the first cantilevered arm and a portion of the second cantilevered arm. The longitudinal passageway is sized so that the ferrule may pass through a rear opening of the connector housing through the longitudinal passageway and through a front opening of the connector housing. The conversion adapter comprises an adapter, a coupling nut, and a retainer. The adapter comprises a passageway capable of receiving a portion of the connector housing of the male plug connector therein, and comprising a female keyway on an outer surface of the adapter for keying the dissimilar connector, and a window disposed adjacent to the female keyway. The coupling nut is capable of receiving a portion of the adapter therethrough and comprises internal threads. The retainer is sized for fitting into the window of the adapter for securing the adapter to the connector housing by engaging the threaded portion of the connector housing.

A further aspect of the disclosure is directed to a male plug multi-fiber optical connector and a conversion adapter for mating the male plug connector with a dissimilar connector. The male plug connector comprising a ferrule comprising a plurality of bores for receiving one or more optical fibers, a nosepiece and a connector housing. The nosepiece comprises a front portion and a rear portion along with a passageway extending from a front end to a rear end of the nosepiece. The front portion comprises a pocket disposed forward of a male key on the same side of the nosepiece, and the rear portion comprises a first cantilevered arm and a second cantilevered arm, and the passageway is sized for receiving the ferrule therein. The connector housing comprises a rear end and a front end with a longitudinal passageway extending from the rear end to the front end of the connector housing with a female key disposed on an outer surface of the connector housing and a locking feature is integrally formed in the connector housing and configured as a subtractive portion from a cylindrical sleeve geometry of the connector housing along with a threaded portion integrally formed on the connector housing. The connector housing comprises a front opening sized for receiving a portion of the first cantilevered arm and a portion of the second cantilevered arm. The longitudinal passageway is sized so that the ferrule may pass through a rear opening of the connector housing through the longitudinal passageway and through a front opening of the connector housing. The conversion adapter comprises an adapter, a coupling nut, and a retainer. The adapter comprises a passageway capable of receiving a portion of the connector housing of the male plug connector therein, and comprising a female keyway on an outer surface of the adapter for keying with a dissimilar connector, and a window disposed adjacent to the female keyway. The coupling nut capable of receiving a portion of the adapter therethrough and comprising internal threads. The retainer is sized for fitting into the window of the adapter for securing the adapter to the connector housing by engaging the threaded portion of the connector housing.

A still further aspect of the disclosure is directed to a male plug multi-fiber optical connector and a conversion adapter for mating the male plug connector with a dissimilar connector. The male plug connector comprising a ferrule comprising a plurality of bores for receiving one or more optical fibers, a nosepiece, and a connector housing. The nosepiece comprises a front portion and a rear portion along with a passageway extending from a front end to a rear end of the nosepiece. The front portion comprises a pocket disposed forward of a male key on the same side of the nosepiece, and the rear portion comprises a first cantilevered arm and a second cantilevered arm, and the passageway of the nosepiece is sized for receiving the ferrule therein. The connector housing comprises a longitudinal passageway extending from a rear end to a front end with a female key disposed on an outer surface of the connector housing and a locking feature is integrally formed in the connector housing that is a subtractive portion from a cylindrical sleeve geometry of the connector housing and comprises a ramp with a ledge along with a threaded portion integrally formed on the outer surface of the connector housing. The connector housing comprises a front opening sized for receiving a portion of the first cantilevered arm and a portion of the second cantilevered arm. The longitudinal passageway is sized so that the ferrule may pass through a rear opening of the connector housing through the longitudinal passageway and through a front opening of the connector housing. The conversion adapter comprises an adapter, a coupling nut, and a retainer. The adapter comprises a passageway capable of receiving a portion of the connector housing of the male plug connector therein, and comprising a female keyway on an outer surface of the adapter for keying a dissimilar connector, and the coupling nut capable of receiving a portion of the adapter therethrough and comprising internal threads. The retainer is sized for fitting into the window of the adapter for securing the adapter to the connector housing by engaging the threaded portion of the connector housing.

Yet another aspect of the disclosure is directed to a male plug multi-fiber optical connector and a conversion adapter for mating the male plug connector with a dissimilar connector. The male plug connector comprising a ferrule comprising a plurality of bores for receiving one or more optical fibers, a nosepiece, and a connector housing. The nosepiece comprises a front portion and a rear portion along with a passageway extending from a front end to a rear end of the nosepiece. The front portion comprises a pocket disposed forward of a male key on the same side of the nosepiece, and the rear portion comprises a first cantilevered arm and a second cantilevered arm, and the passageway is sized for receiving the ferrule therein. The connector housing comprises a longitudinal passageway extending from a rear end to a front end with a female key is disposed on an outer surface of the connector housing and a locking feature is integrally formed in the connector housing that is a subtractive portion from a cylindrical sleeve geometry of the connector housing comprising a ramp with a ledge along with a threaded portion integrally formed on the connector housing. The connector housing comprises a front opening sized for receiving a portion of the first cantilevered arm and a portion of the second cantilevered arm. The longitudinal passageway is sized so that the ferrule may pass through a rear opening of the connector housing through the longitudinal passageway and through a front opening of the connector housing. The conversion adapter comprises an adapter, a coupling nut, and a retainer. The adapter comprises a passageway capable of receiving a portion of the connector housing of the male plug connector therein, and the adapter comprising a female keyway on an outer surface of the adapter for keying the dissimilar connector, and the coupling nut capable of receiving a portion of the adapter therethrough and comprising internal threads. The retainer is sized for fitting into the window of the adapter for securing the adapter to the connector housing by engaging the threaded portion of the connector housing.

Another aspect of the disclosure is directed to a male plug multi-fiber optical connector and a conversion adapter for mating the male plug connector with a dissimilar connector. The male plug connector comprising a ferrule comprising a plurality of bores for receiving one or more optical fibers, a nosepiece, and a connector housing. The nosepiece comprises a front portion and a rear portion along with a passageway extending from a front end to a rear end of the nosepiece. The front portion comprises a pocket disposed forward of a male key on the same side of the nosepiece, and the rear portion comprises a first cantilevered arm and a second cantilevered arm, and the passageway is sized for receiving the ferrule therein, where the ferrule is allowed limited movement between about 100-400 microns of movement in each of the three degrees of freedom in the unmated state. The connector housing comprises a longitudinal passageway extending from a rear end to a front end with a female key disposed on an outer surface of the connector housing and a locking feature is integrally formed in the connector housing and is a subtractive portion from a cylindrical sleeve geometry of the connector housing comprising a ramp with a ledge along with a threaded portion integrally formed on the connector housing. The female key is disposed about 180 degrees apart from the locking feature, and the connector housing comprises a front opening sized for receiving a portion of the first cantilevered arm and a portion of the second cantilevered arm. The longitudinal passageway is sized so that the ferrule may pass through a rear opening of the connector housing through the longitudinal passageway and through a front opening of the connector housing. The conversion adapter comprises an adapter, a coupling nut, and a retainer. The adapter comprises a passageway capable of receiving a portion of the connector housing of the male plug connector therein, and comprising a female keyway on an outer surface of the adapter for keying with the dissimilar connector, and the coupling nut capable of receiving a portion of the adapter therethrough and comprising internal threads. The retainer is sized for fitting into the window of the adapter for securing the adapter to the connector housing by engaging the threaded portion of the connector housing.

A still further aspect of the disclosure is directed to a male plug multi-fiber optical connector and a conversion adapter for mating the male plug connector with a dissimilar connector. The male plug connector comprising a ferrule comprising a plurality of bores for receiving one or more optical fibers, a nosepiece, and a connector housing. The nosepiece comprises a front portion and a rear portion along with a passageway extending from a front end to a rear end of the nosepiece. The front portion comprises a pocket disposed forward of a male key on the same side of the nosepiece, and the rear portion comprises a first cantilevered arm and a second cantilevered arm, a male keying feature, and the passageway is sized for receiving the ferrule therein, where the ferrule is allowed limited movement between about 100-400 microns of movement in each of the three degrees of freedom in the unmated state. The connector housing comprises a longitudinal passageway extending from a rear end to a front end and the longitudinal passageway with a female key is disposed on an outer surface of the connector housing and a locking feature is integrally formed in the connector housing that is a subtractive portion from a cylindrical sleeve geometry of the connector housing comprising a ramp with a ledge along with a threaded portion integrally formed on the connector housing. The female key is disposed about 180 degrees apart from the locking feature, and the connector housing comprises a front opening sized for receiving a portion of the first cantilevered arm and a portion of the second cantilevered arm. The longitudinal passageway is sized so that the ferrule may pass through a rear opening of the connector housing through the longitudinal passageway and through a front opening of the connector housing. The conversion adapter comprises an adapter, a coupling nut, and a retainer. The adapter comprises a passageway capable of receiving a portion of the connector housing of the male plug connector therein, and comprising a female keyway on an outer surface of the adapter for keying with the dissimilar connector, and a window disposed adjacent to the female keyway. The coupling nut is capable of receiving a portion of the adapter therethrough and comprising internal threads. The retainer is sized for fitting into the window of the adapter for securing the adapter to the connector housing by engaging the threaded portion of the connector housing.

Another aspect of the disclosure is directed to a male plug multi-fiber optical connector and a conversion adapter for mating the male plug connector with a dissimilar connector. The male plug connector comprising a ferrule comprising a plurality of bores for receiving one or more optical fibers, a nosepiece, a connector housing, and a plug. The nosepiece comprises a front portion and a rear portion along with a passageway extending from a front end to a rear end of the nosepiece. The front portion comprises a pocket disposed forward of a male key on the same side of the nosepiece, and the rear portion comprises a first cantilevered arm and a second cantilevered arm, a male keying feature, and the passageway is sized for receiving the ferrule therein, where the ferrule is allowed limited movement between about 100-400 microns of movement in each of the three degrees of freedom in the unmated state. The connector housing comprises a longitudinal passageway extending from a rear end to a front end and the longitudinal passageway with a female key disposed on an outer surface of the connector housing and a locking feature is integrally formed in the connector housing and is a subtractive portion from a cylindrical sleeve geometry of the connector housing comprising a ramp with a ledge along with a threaded portion integrally formed on the connector housing. The female key is disposed about 180 degrees apart from the locking feature, and the connector housing comprises a front opening sized for receiving a portion of the first cantilevered arm and a portion of the second cantilevered arm. The longitudinal passageway is sized so that the ferrule may pass through a rear opening of the connector housing through the longitudinal passageway and through a front opening of the connector housing. The conversion adapter comprises an adapter, a coupling nut, and a retainer. The adapter comprises a passageway capable of receiving a portion of the connector housing of the male plug connector therein, and comprising a female keyway on an outer surface for keying the dissimilar connector, and the coupling nut capable of receiving a portion of the adapter therethrough and comprising internal threads. The retainer is sized for fitting into the window of the adapter for securing the adapter to the connector housing by engaging the threaded portion of the connector housing.

The disclosure is also directed to a method of making a male plug multi-fiber optical cable assembly and a conversion adapter for mating the male plug connector with a dissimilar connector. The method comprises inserting and attaching one or more optical fibers of a fiber optic cable within a ferrule, passing the ferrule through a rear opening of a connector housing and through the longitudinal passageway the connector housing and through a front opening of the connector housing, inserting the ferrule into a passageway of a nosepiece, where the nosepiece comprises at least one cantilevered arm, inserting the at least one cantilevered arm of the nosepiece into a passageway of a connector housing from a front end, and placing an adhesive into the connector housing for securing the fiber optic cable to the connector housing. Attaching the conversion adapter to the connector comprising placing a coupling nut comprising internal threads about a portion of the adapter a female keyway on an outer surface for keying the dissimilar connector to the adapter, and attaching the connector housing within a passageway of the adapter. Securing of the connector housing to the adapter of the conversion adapter comprises inserting a retainer that fits into a window of the connector housing disposed adjacent to a female keyway of the connector housing for securing the adapter to the male plug optical connector by engaging the threaded portion of the connector housing with a portion of the retainer The disclosure is also directed to a conversion adapter for mating dissimilar connectors. The conversion adapter comprising an adapter and a coupling nut. The adapter comprises a passageway configured for receiving the connector housing of a male plug connector therein, a female keyway disposed on an outer surface configured for keying a dissimilar connector for mating with the male plug connector, an internal fastening feature comprising internal threads, and an alignment finger that acts as a rotational stop for the adapter. The coupling nut capable of receiving a portion of the adapter therethrough and comprising internal threads.

The male plug multi-fiber optical connector concepts disclosed may be varied for use with any suitable components or fiber optic cables desired for termination. For instance, the concepts may use any suitable connector housing with a suitable nosepiece that attaches directly to the connector housing for simplifying the assembly of the connector and providing flexibility and adaptability for manufacturing along with providing expanded connector connectivity options.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

Figure 1:
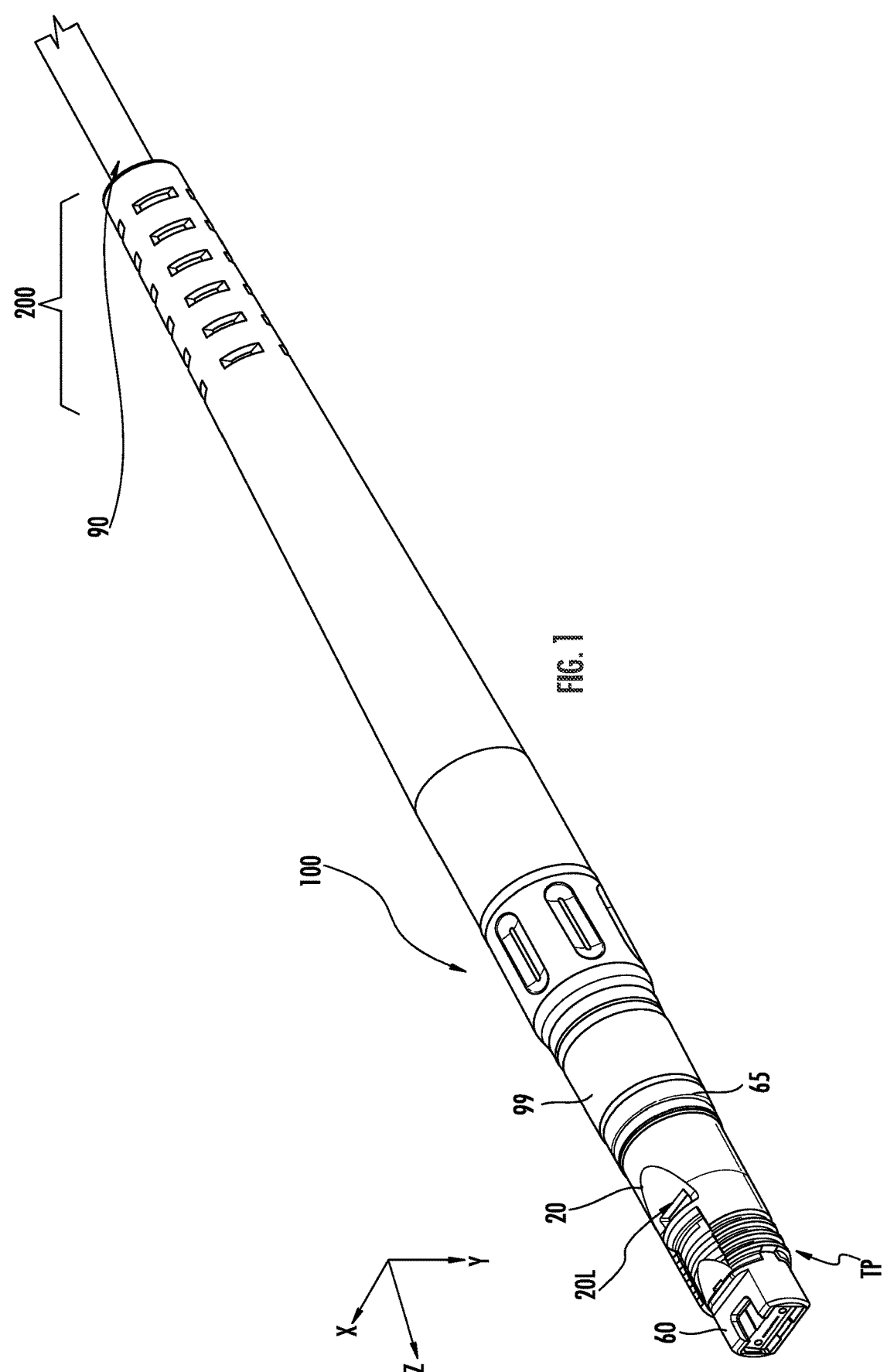
FIG. 1 is a bottom perspective view of an explanatory fiber optic cable assembly having a multi-fiber optical connector that terminates a fiber optic cable according to the present application.

Reference will now be made in detail to the embodiments of the disclosure, examples of which are illustrated in the accompanying drawings. Whenever possible, like reference numbers will be used to refer to like components or parts.

The concepts disclosed are related to male plug connectors such as multi-fiber optical connectors (hereinafter "connectors") along with fiber optic cable assemblies (hereinafter "cable assemblies") using the connectors and methods of making the same. The disclosed connectors are configured so that they may be used with a conversion adapter disclosed herein for mating to a dissimilar multifiber connector that is widely used and deployment in existing optical networks (i.e., legacy connectors) as well as working with newly introduced connectors such as an inline female connector for direct optical mating with the disclosed connectors without the conversion adapter, thereby providing network operators the flexibility to introduce new connectors into their optical network while still being able to optically mate with the legacy connectors installed into their network. The conversion adapter may be attached to the disclosed connector and a dissimilar connector such as an OptiTip® connector available from Corning Optical Communications of Charlotte, NC may be inserted into the opposite end of the conversion adapter for optical mating with the disclosed connector.

The connectors disclosed comprises a ferrule having a plurality of bores for receiving one or more optical fibers, a nosepiece that limits the travel of the ferrule and a connector housing having a female key disposed on an outer surface. During assembly, the ferrule is inserted into a passageway of the nosepiece comprising at least one cantilevered arm. The cantilevered arm of the nosepiece is inserted into a passageway of the connector housing from a front end opening for securing the nosepiece to the connector housing. In certain embodiments, the nosepiece of connector may comprise a front portion with a pocket configured for enabling the mating of the connector with a dissimilar connector having an exclusion feature such as the OptiTip® connector using the conversion adapter. The concepts disclosed provide a simple and reliable connector that is quick and easy to assemble for terminating optical fibers using fewer parts than conventional multi-fiber optical connectors for optical mating with recently released connection ports on Evolv™ terminals and inline connectors having Pushlok™ technology available from Corning Optical Communications while also allowing mating with a dissimilar connector using a nosepiece having a pocket configured for cooperating an exclusion feature of the dissimilar OptiTip® connector, thereby extending and expanding the use of the disclosed connectors and assemblies for network operators.

In addition to having ability to optical mate with dissimilar connectors, the nosepiece of the connector protects the optical mating end face of ferrule while still allowing access for visual inspection and easy cleaning. This is accomplished by locating the optical mating end face of the ferule rearward of the front end of the nosepiece by a distance (i.e., recessed depth) of 1 millimeter or less. The disclosed connector also allows limited movement or "float" of the ferrule within the nosepiece of the connector in the unmated state for allowing limited movement of the ferrule during mating with a complimentary device. The limited movement or "float" of the ferrule during mating allows three degrees of freedom of movement (X-, Y- and Z-axis) of the ferrule during mating while excluding the spring or resilient member for biasing the ferrule to a forward position like a conventional connector. By way of example, the ferrule is allowed limited movement between about 100-400 microns of movement in the three degrees of freedom for allowing the ferrule to "float" in the unmated state, but other ranges of limited movement are possible for the movement of the ferrule within the connector while excluding the biasing spring. For instance, the ferrule may allow limited movement between about 150-350 microns in the three degrees of freedom while excluding the biasing spring for allowing the ferrule to "float" within the connector in the unmated state, or the ferrule may allow limited movement between about 200-300 microns of movement in the three degrees of freedom while excluding the biasing spring, thereby allowing the ferrule to "float" within the connector in the unmated state. For instance, the ferrule may have limited travel to the rearward Z-direction using the concepts disclosed. The disclosed connectors may also exclude a spring for biasing the ferrule to a forward position if desired or not.

The complimentary mating device such as a port on a terminal or complimentary mating connector has a ferrule that biases the complimentary mating ferrule to a forward position using a spring and influences the spring mating force between the ferrules in a mated optical connection. After mating with a complementary device, the ferrule of the connector of the present application may be constrained in the Z-direction (i.e., abutting the backstop of the nosepiece). Fiber optic cable assemblies may be formed by securing or strain-relieving the fiber optic cable to the connector housing in any suitable fashion such as using an adhesive, but other methods of attaching the cable to connector are possible. Consequently, the disclosed connector design is highly-adaptable to a wide variety of fiber optic cables of various shapes and/or construction for different customer requirements or preferences such as by tailoring the passageway of the connector housing for the desired cable. For instance, the connector may be terminated to fiber optic cables comprising a round cross-section or a non-round cross-section as desired. Likewise, the connector may be terminated to cables having rigid strength members such as GRPs or flexible yarn-like strength members such as aramid, fiberglass or the like.

In other embodiments, the connectors and fiber optic cable assemblies disclosed may comprise a connector construction with push-to-secure locking feature integrally formed the connector housing as further disclosed. For instance, the locking feature may be integrally formed in the connector housing as a subtractive portion from a cylindrical geometry of the connector housing. Thus, no features such as a rotating coupling nut or bayonet that increases the size of the connector is required. Likewise, inserting the fiber optic cable into the connector housing for attachment (e.g., strain-relief) also results a relatively small form-factor for the connector. Thus, the connectors disclosed advantageously have a relatively small diameter or form-factor compared with conventional connectors.

The concepts may be used with any suitable cables and may be especially advantageous with compact cable form-factors along with enabling smaller footprints for complimentary mating devices such as terminals, closures or the like with one or more multi-fiber connection ports. The connector concepts are also scalable to any suitable count of optical fibers within the ferrule (e.g., 2-24 fibers or more in one or more rows of fiber in the ferrule) in a variety of arrangements or constructions for building fiber optic networks.

The concepts disclosed herein are suitable for fiber optic networks such as for Fiber-to-the-location (FTTx), network densification, 5G applications, and are equally applicable to other optical applications as well including indoor, industrial, wireless, or other desired applications. Additionally, the concepts disclosed may be used with other devices having any suitable footprint or construction. Various designs, constructions, or features for multi-fiber optical connectors (hereinafter "connector") and cable assemblies are disclosed in more detail as discussed herein and may be modified or varied as desired.

Figure 31:
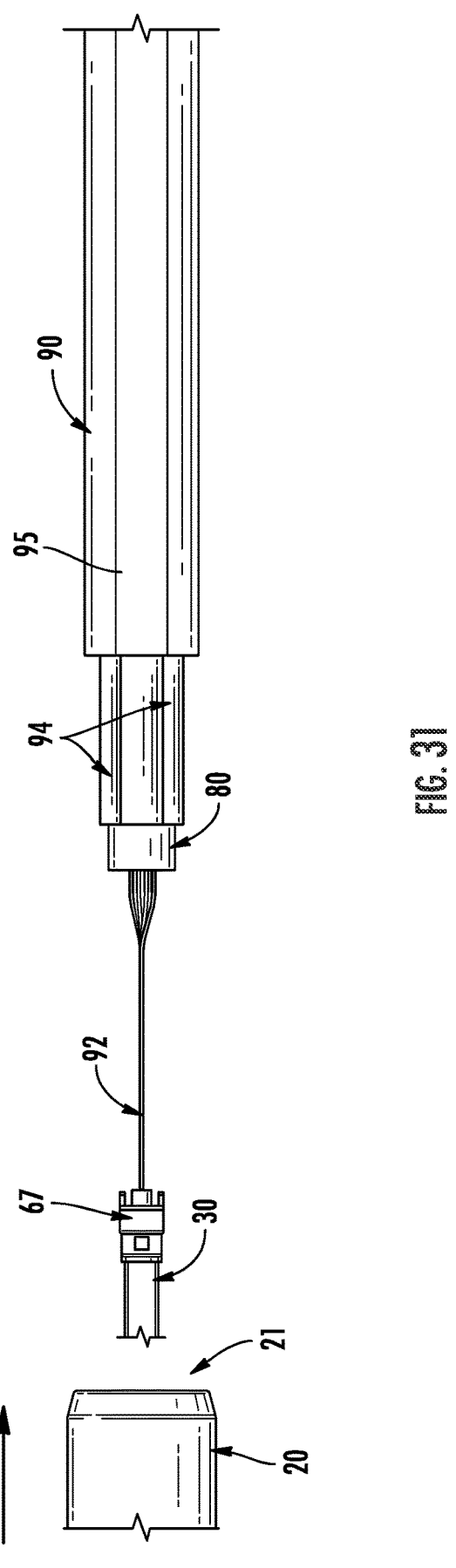
Figure 32:
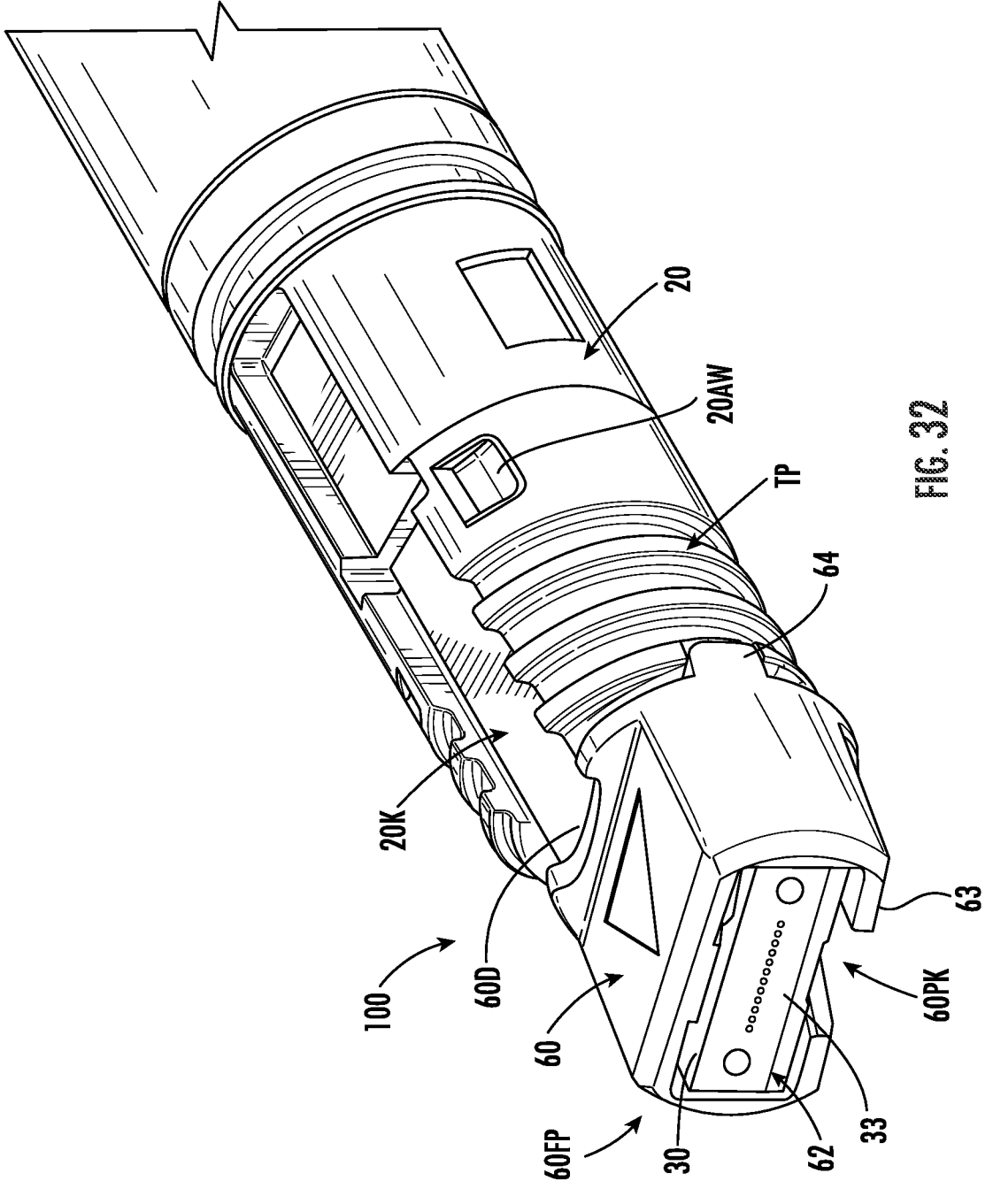
FIG. 32 is a top front perspective view of the assembled explanatory multi-fiber optical connector adapted for mating with a dissimilar connector with the optical mating end face of the ferrule disposed rearward of the front end of the nosepiece for protection while still allowing for easy inspection and cleaning.
Figure 33:
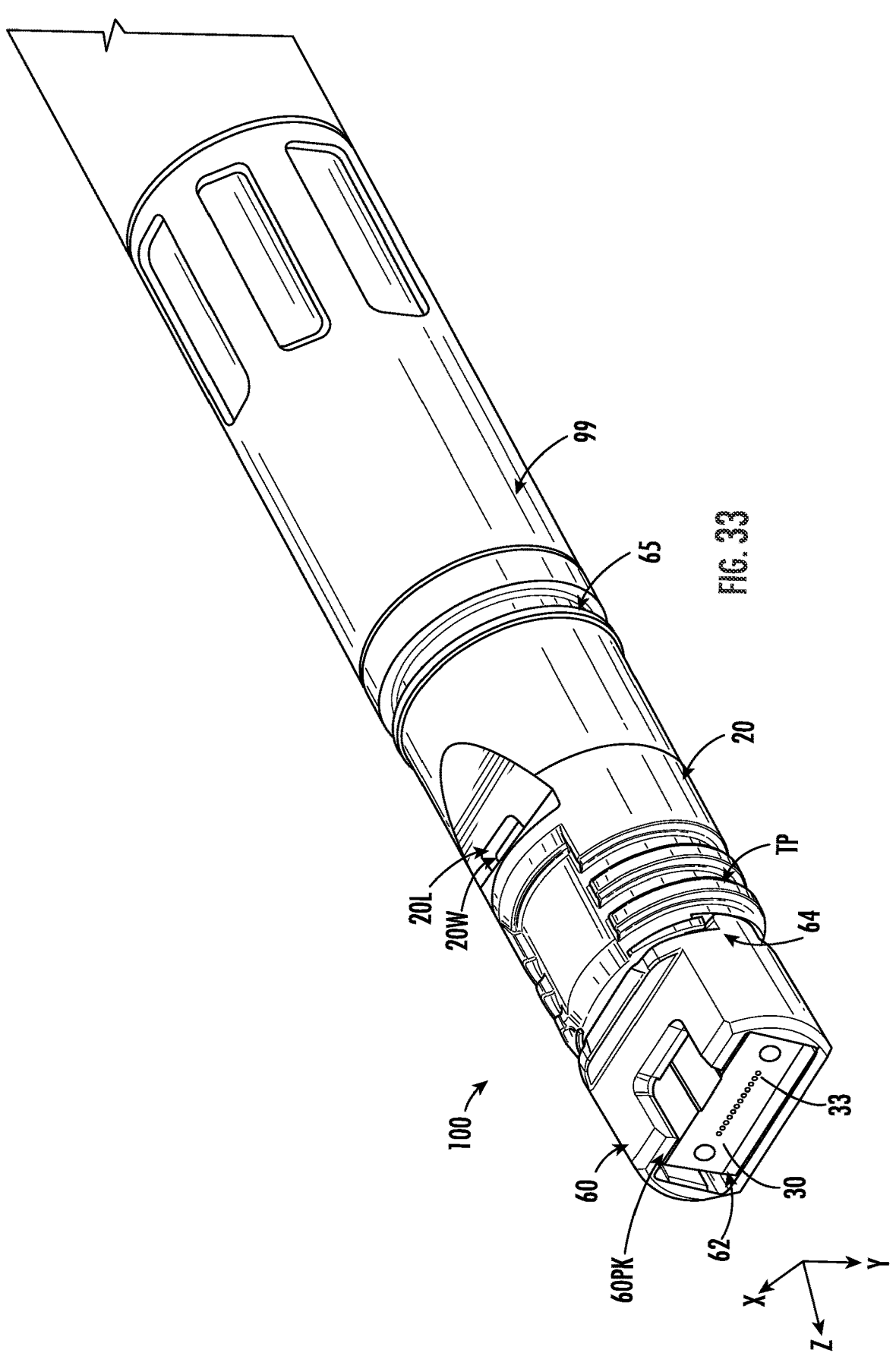
FIG. 33 is a bottom front perspective view of the assembled multi-fiber optical connector of FIG. 32 showing a pocket disposed on the front portion of the nosepiece of the connector adapted for mating with a dissimilar connector.

The concepts are disclosed with explanatory connector constructions having nosepieces with pockets for accommodating optical mating with dissimilar connectors using the conversion adapter. FIGS. 1-21F depict an explanatory connectors 100 and components for the same FIGS. 22-31 disclose methods of making fiber optic cable assemblies 200 having connector 100 according to the concepts disclosed. FIGS. 32 and 33 depict close-up views of connector 100 showing details of the design for enabling the optical mating of the connector with a dissimilar connector, and FIGS. 34-44 show various views of a conversion adapter 101 and components for cooperating with the connector 100 for enabling optical mating with a dissimilar connector along with other design details. Conversion adapter 101 comprises an adapter 102, a coupling nut 104 (not shown in FIGS. 34-36 for clarity) and a retainer 110 for securing the conversion adapter 101 to the connector 100. Conversion adapter 101 is useful for receiving connector 100 at a first end and the dissimilar connector at the second end, thereby advantageously expanding the use of connector 100 with the installed base of devices are in use with network operators.

Figure 3:
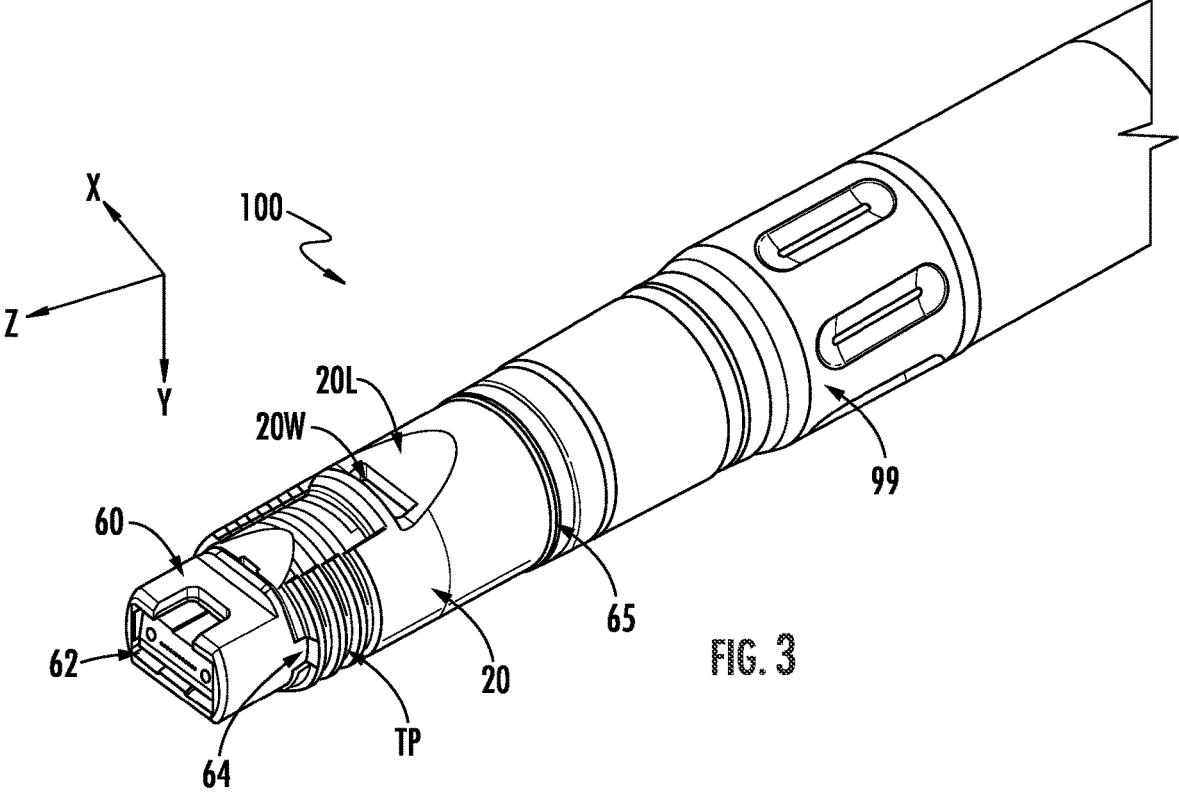
FIG. 3 is a close-up bottom perspective view of the assembled multi-fiber optical connector of FIG. 1.
Figure 4:
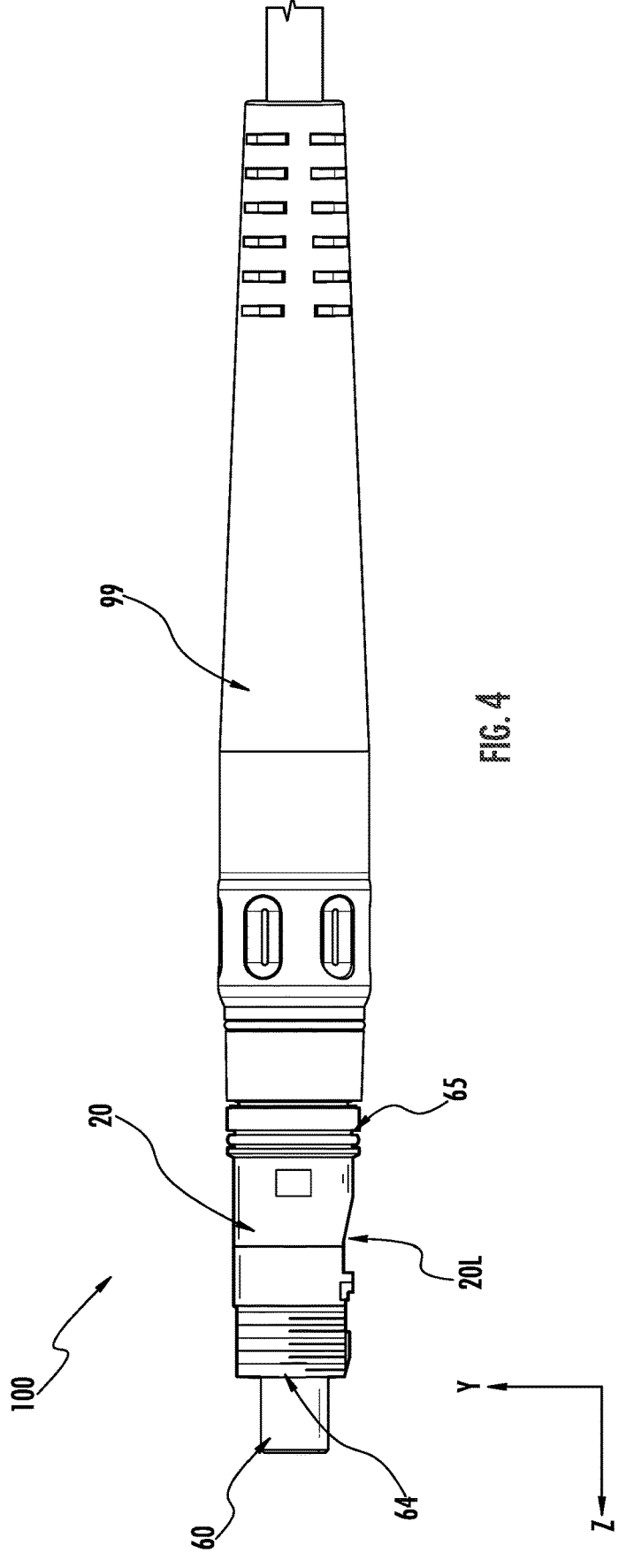
FIG. 4 is a side view of the assembled multi-fiber optical connector of FIG. 1.
Figure 5:
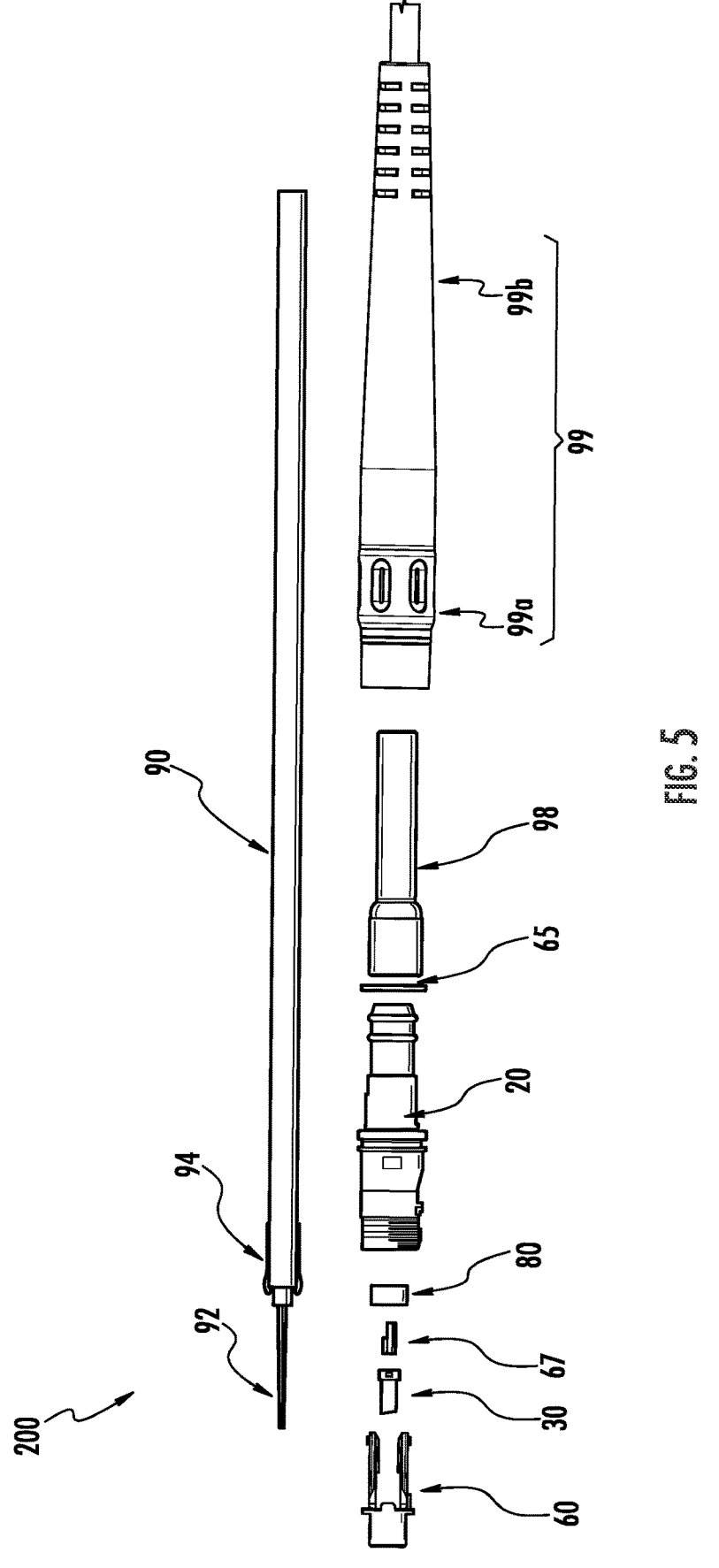
FIG. 5 is an exploded view of the multi-fiber optical connector of the fiber optic cable assembly of FIG. 1.
Figure 6:
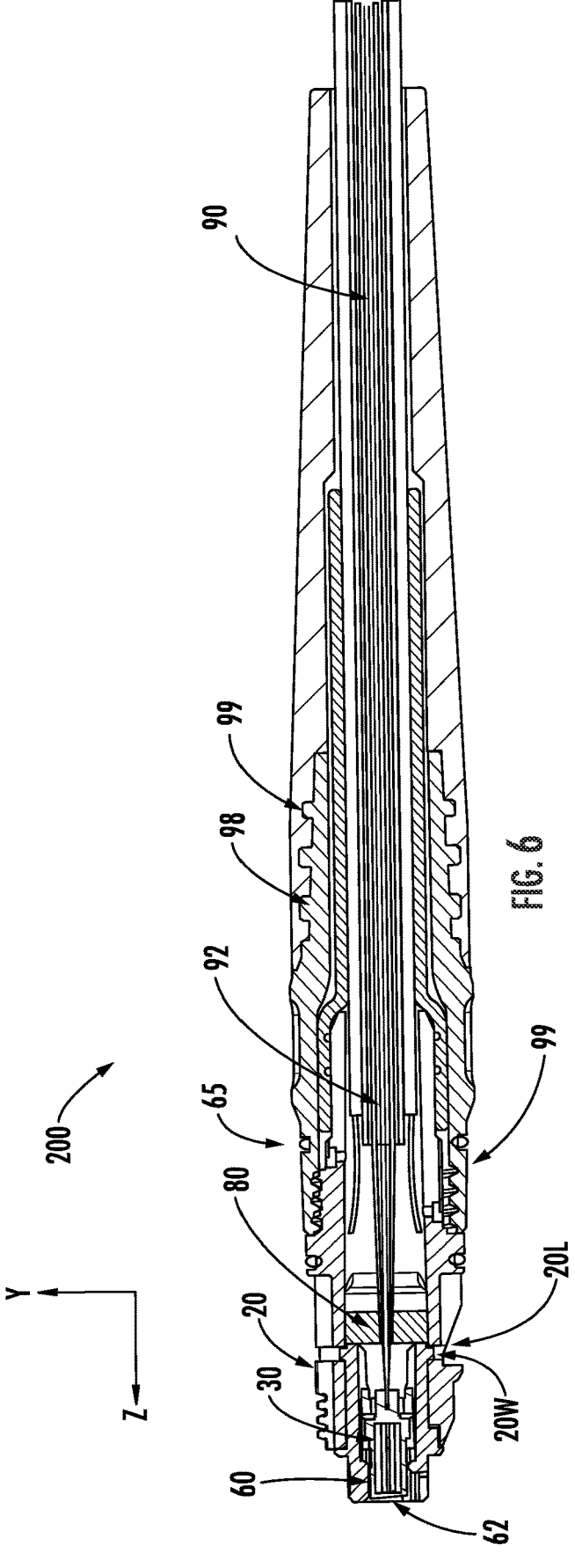
FIG. 6 is a longitudinal cross-sectional view of the front portion of the fiber optic cable assembly of FIG. 1.
Figure 7:
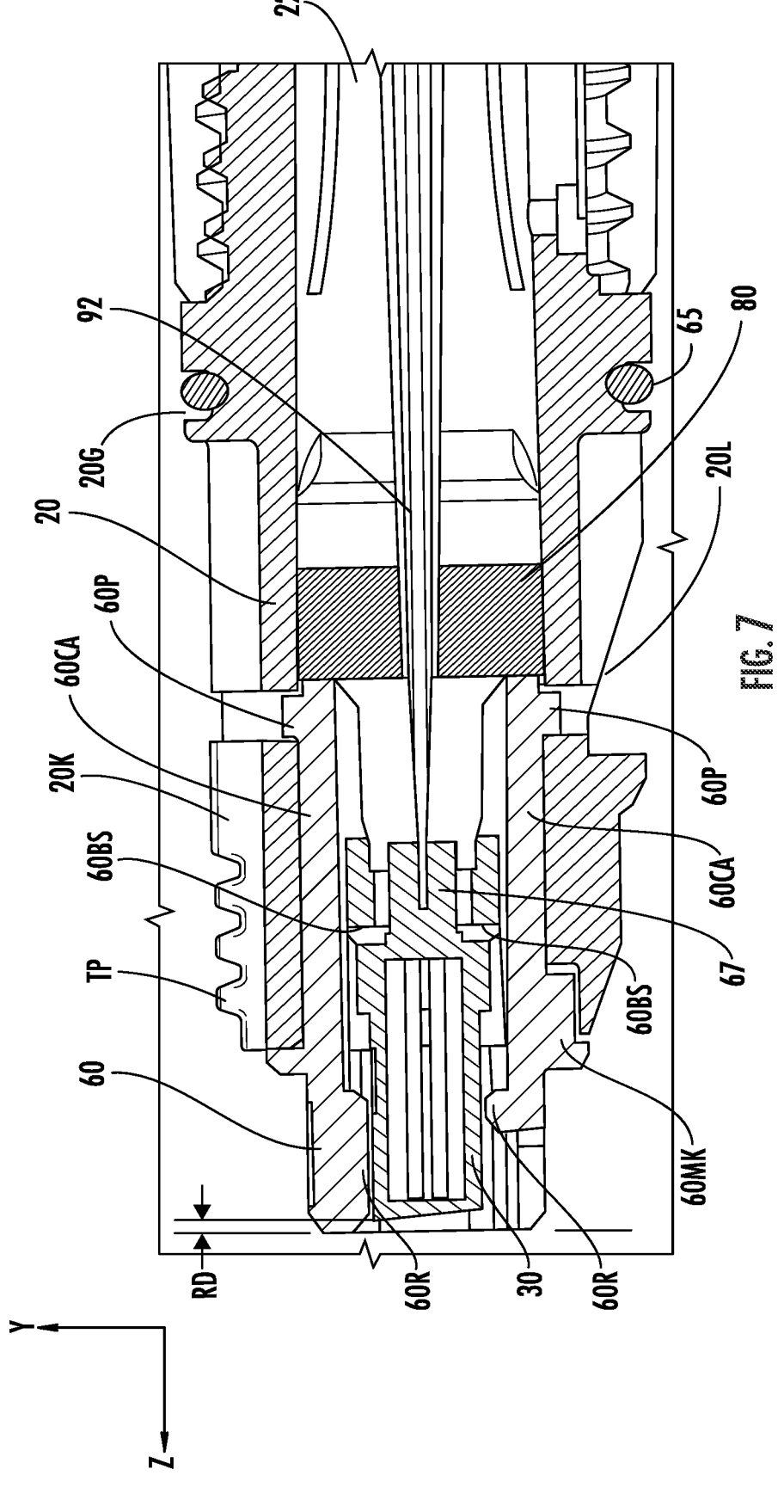
FIG. 7 is a close-up cross-sectional view of the front portion of the multi-fiber optical connector of FIG. 1.

FIG. 1 depicts a bottom perspective view of cable assembly 200 comprising connector 100 terminating a fiber optic cable 90. Connector 100 is depicted in top and bottom assembled perspective views in FIGS. 2 and 3, respectively. FIG. 4 is a side view of the assembled connector 100, and FIG. 5 is an exploded view of the cable assembly 200, and FIGS. 6 and 7 are cross-sectional views of the assembled cable assembly 200 and connector 100.

Figure 12:
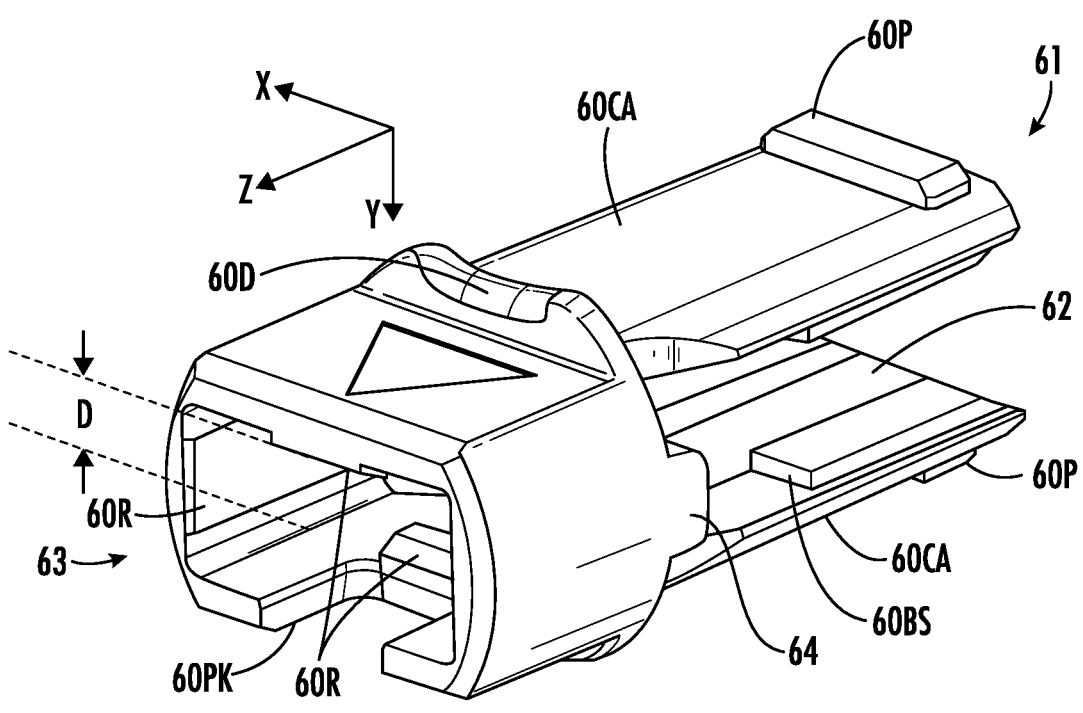
FIG. 12 is a front perspective view of the nosepiece of the multi-fiber optical connector of FIG. 1.
Figure 13:
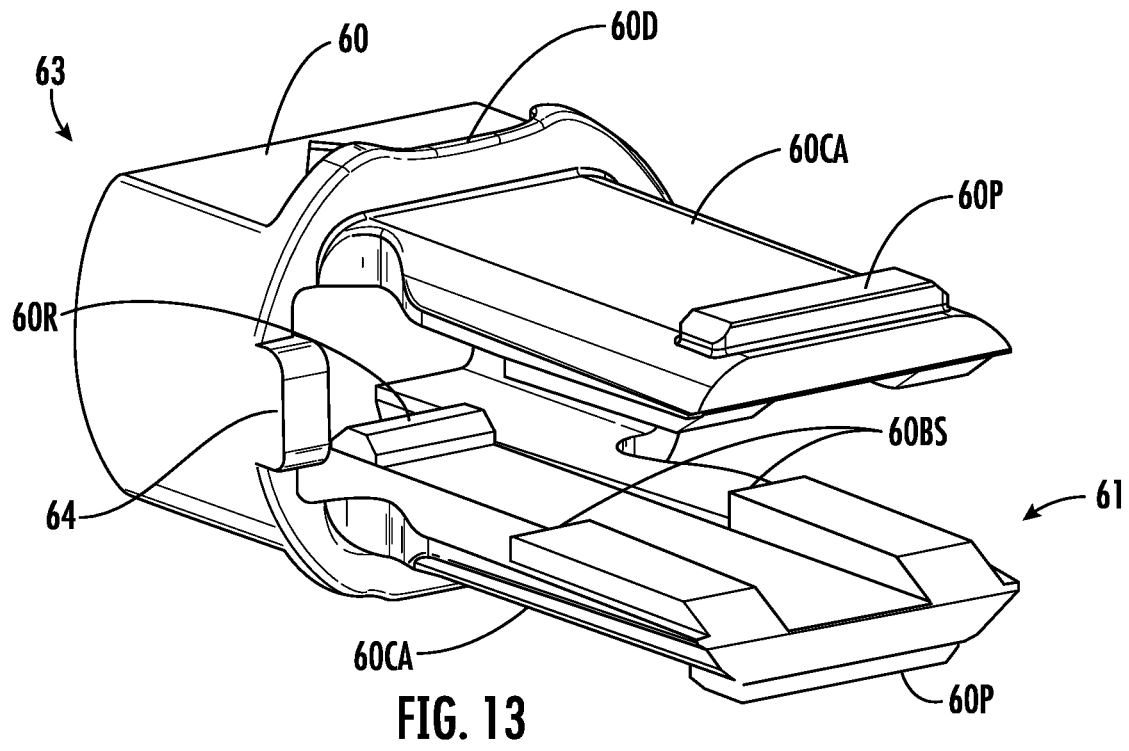
FIG. 13 is a rear perspective view of the connector housing of the multi-fiber optical connector of FIG. 1.

Connector 100 comprises a ferrule 30, a nosepiece 60, a connector housing 20. Although this embodiment excludes a spring for biasing ferrule 30 to a forward position, other connectors using the concepts disclosed may use a spring for biasing the connector to a forward position if desired. Nosepiece 60 comprises a rear portion 60RP having at least one cantilevered arm, and a ferrule backstop 60BS disposed within a passageway 62 of the nosepiece 60. The backstop 60BS limits the travel of the ferrule 30 in the Z-direction (e.g., limits travel of the ferrule in the rearward direction) as shown in FIGS. 12 and 13. Connector housing 20 comprises a rear end 21 and a front end 23 with a longitudinal passageway 22 extending from the rear end 21 to the front end 23 along with a female key 20K disposed on an outer surface OS. Ferrule 30 comprises a plurality of bores 32 (FIG. 24) for receiving one or more optical fibers as known in the art. By way of example, ferrule 30 may be a MT or MPO ferrule, but other suitable ferrules are possible using the disclosed concepts.

The disclosed connector concepts are also adaptable to different types of ferrules such as having ferrules 30 that are not MT or MPO based ferrules such as TMT ferrules available from US Conec of Hickory, NC. Further, there are different way to adapt the connector design for use different ferrule types. Connector 100 may be adapted for accommodating different ferrules such as by using a spacer 70 with the ferrule 30 (FIGS. 19A-19C) and/or by adapting the passageway 62 of the nosepiece 60 (FIGS. 19D and FIG. 19E) as desired.

Figure 8:
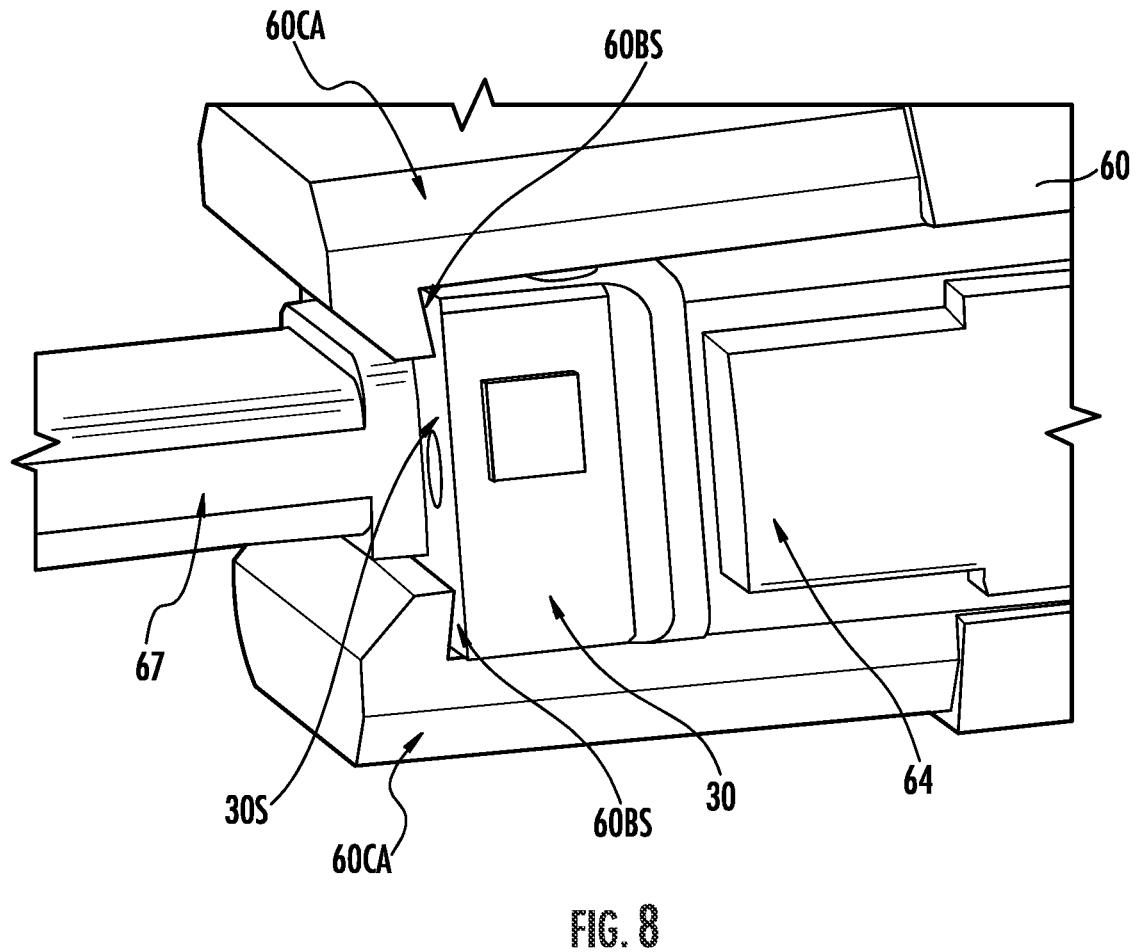
FIG. 8 is a representative partial view of the ferrule disposed within the passageway of the nosepiece of the multi-fiber optical connector without the use of a spacer.

FIG. 8 depicts a representative perspective view of ferrule 30 captured within the nosepiece 60 for allowing limited movement of the ferrule in the unmated state, but other constructions are possible such as using a spacer or other like components.

Figure 9:
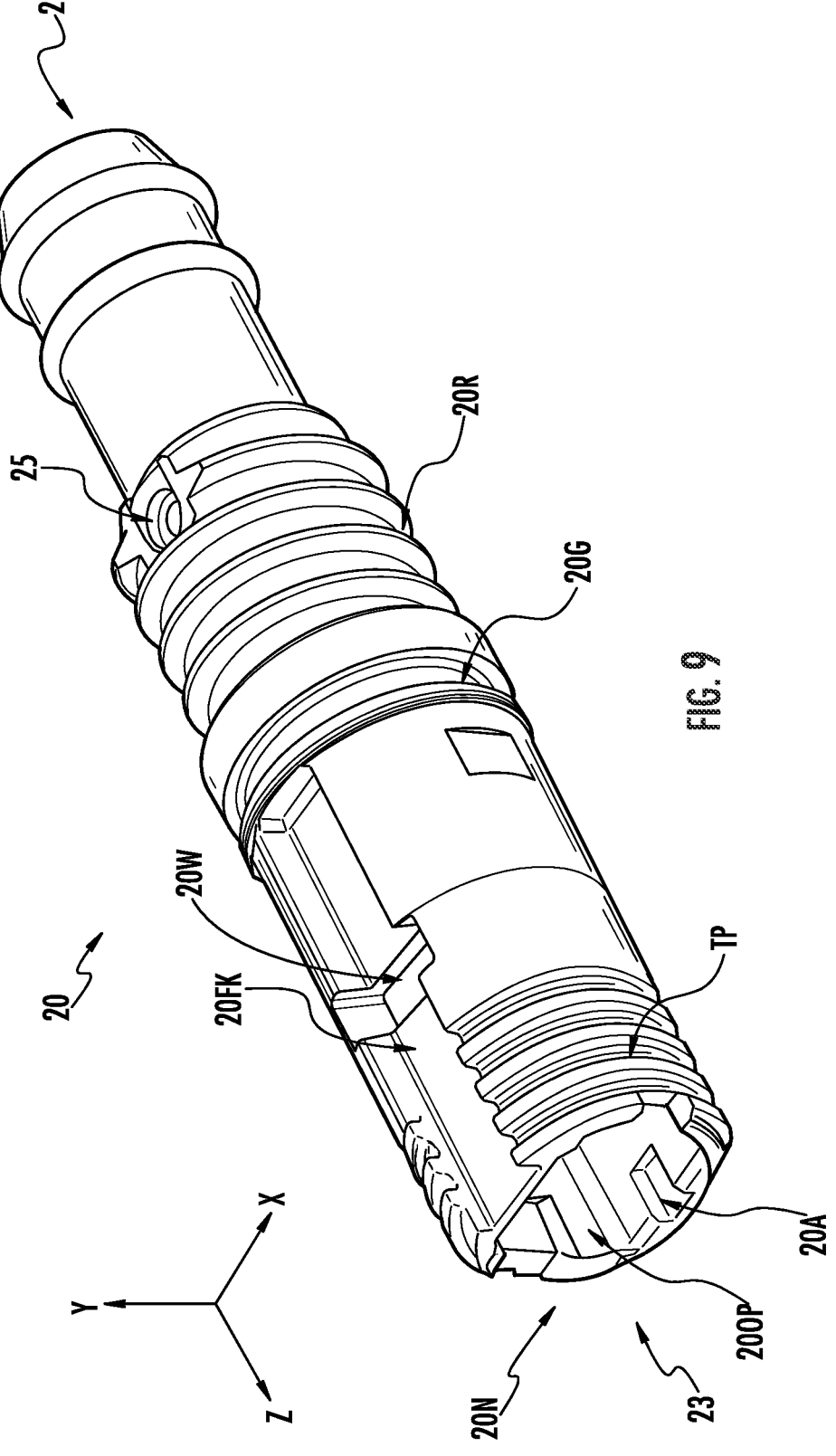
FIG. 9 is a front top perspective view of the connector housing of the multi-fiber optical connector of FIG. 1.
Figure 10:
FIG. 10 is a rear bottom perspective view of the connector housing of the multi-fiber optical connector of FIG. 1.
Figure 11:
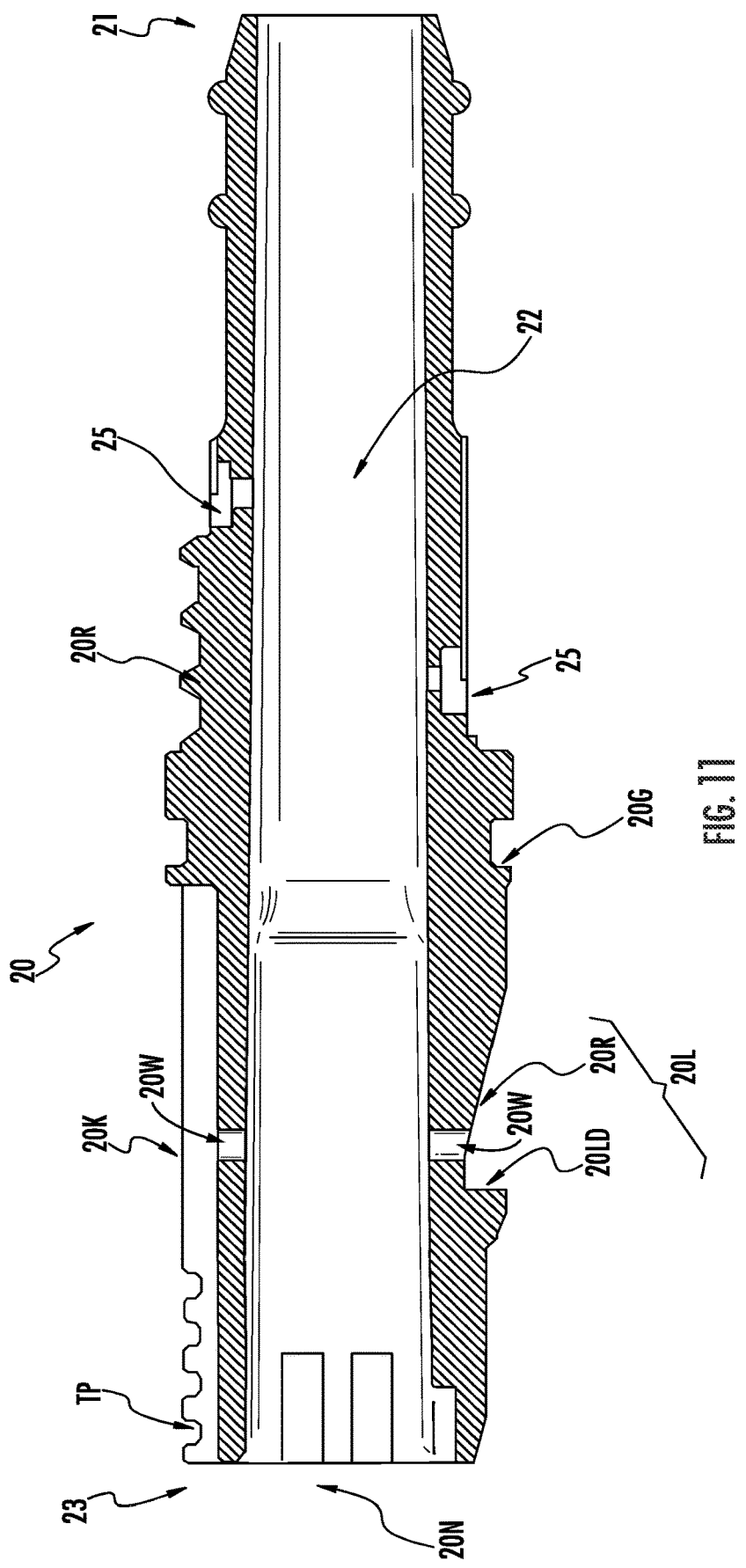
FIG. 11 is a cross-sectional view of the connector housing of the multi-fiber optical connector of FIG. 1.
Figure 16:
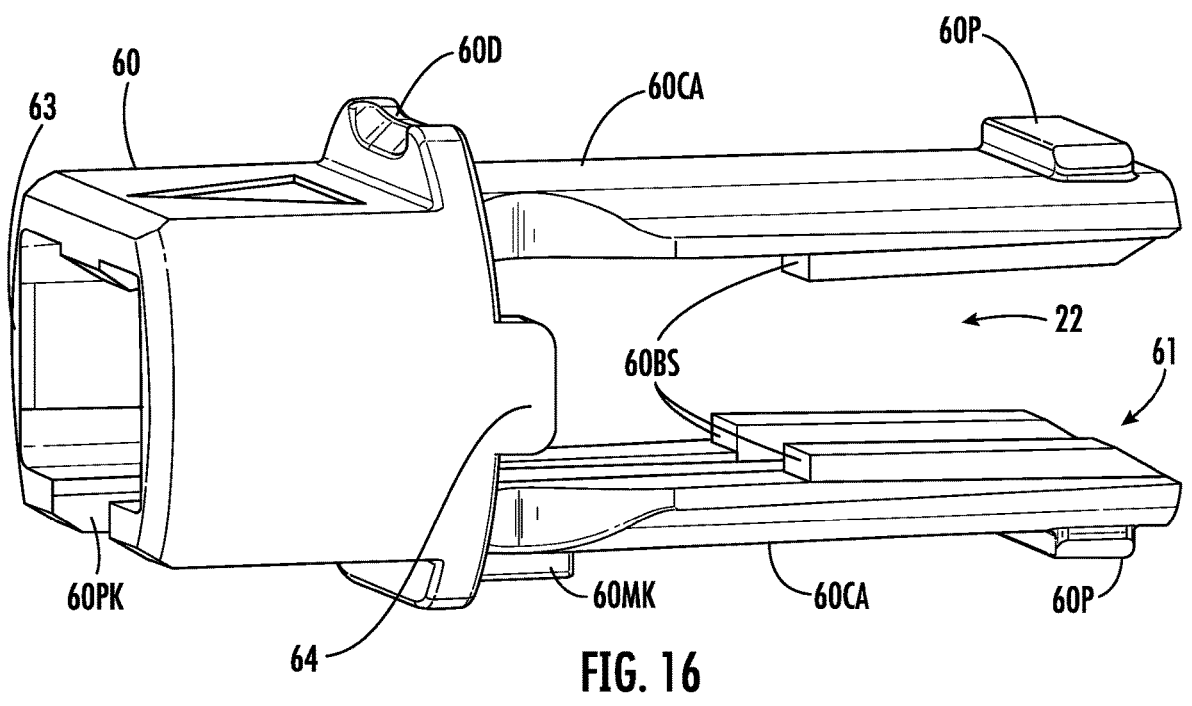
FIG. 16 depicts a side perspective view of the nosepiece for the multi-fiber optical connector of FIG. 1.

FIGS. 9-11 show views of connector housing 20, and FIGS. 12, 13 and 16 show views of nosepiece 60. Connector housing 20 comprises one or more features that cooperate with nosepiece 60. By way of explanation, connector housing 20 may comprise one or more alignment features 20A for the alignment interface between the connector housing 20 and nosepiece 60. Connector housing 20 also has one or more securing features 20W for attaching the nosepiece 60 to the connector housing 20. Likewise, the nosepiece 60 has complimentary alignment feature(s) or securing feature(s) for cooperating with the connector housing 20. Nosepiece 60 comprises a rear end 61 and a front end 63 with a passageway 62 extending from the rear end 61 to the front end 63. The passageway 62 of the nosepiece 60 is sized for receiving a portion of the ferrule 30 therein as depicted. The passageway of nosepiece 60 is sized and shaped for retaining the ferrule 30 while allowing a limited movement or "float" so that the ferrule 30 is allowed to slightly move during mating with a complimentary device. Further, the nosepiece 60 comprises one or more backstops 60BS for limiting the travel of the ferrule in the rearward direction (–Z axis).

As best shown in FIG. 9, connector housing 20 comprises a front opening 20OP sized for receiving a portion of the nosepiece 60. The front opening 20OP of the connector housing 20 is sized for receiving a rear portion of the nosepiece 60. Specifically, the front opening 20OP of connector housing 20 is sized for receiving a portion of at least one cantilevered arm of nosepiece 60. The connector housing 20 also comprises one or more securing features 20W for attaching the nosepiece 60 thereto. Securing features 20W may have any suitable geometry. By way of explanation, securing features may be one or more notches, windows, or the like for securing the nosepiece 60. As illustrated, the securing features 20W are windows that extend through the side wall of the connector housing 20, but the securing features need not extend thru a sidewall of the connector housing 20. The windows 20W of connector housing 20 are useful for receiving securing features of the nosepiece 60 for retaining the same when the connector 100 is assembled.

As depicted, connector 100 has a nosepiece with a non-round cross-section (NRCS). The non-round cross-section (NRCS) may have flat-sides on opposing ends with curved-sides connecting to the flat-sides such as depicted. Connector housing 20 has a generally round cross-section or cylindrical sleeve with one or more features integrally formed in the primitive geometry of the cylindrical sleeve as discussed and shown.

Connector housing 20 may also comprises one or more alignment features 20A that cooperate with complimentary features on the nosepiece 60 for rotational alignment between the components for assembly or not. Alignment feature 20A may have any suitable geometry disposed on the front end 23 of the connector housing 20. By way of explanation, alignment feature may be one or more pockets, notches, protrusion, or the like for cooperating with complimentary alignment feature disposed on the nosepiece 60. As illustrated in FIG. 9, the alignment feature 20A may a pocket in the front end 23 of connector housing 20. While the complimentary alignment feature on nosepiece 60 may be a protrusion 60MK such as male key. However, the alignment features could be reversed with the protrusion being disposed on the connector housing 20, and the pocket could be disposed on the nosepiece 60 if desired. Moreover, connector housings 20 and nosepiece 60 do not require an alignment feature; however, the use of the alignment features allow assembly of the connector housing 20 and nosepiece 60 in only a single orientation as depicted in FIG. 6. In other words, connector 100 may also include an interface between the connector housing 20 and nosepiece 60 with one or more clocking features for rotational alignment during assembly.

Figure 2:
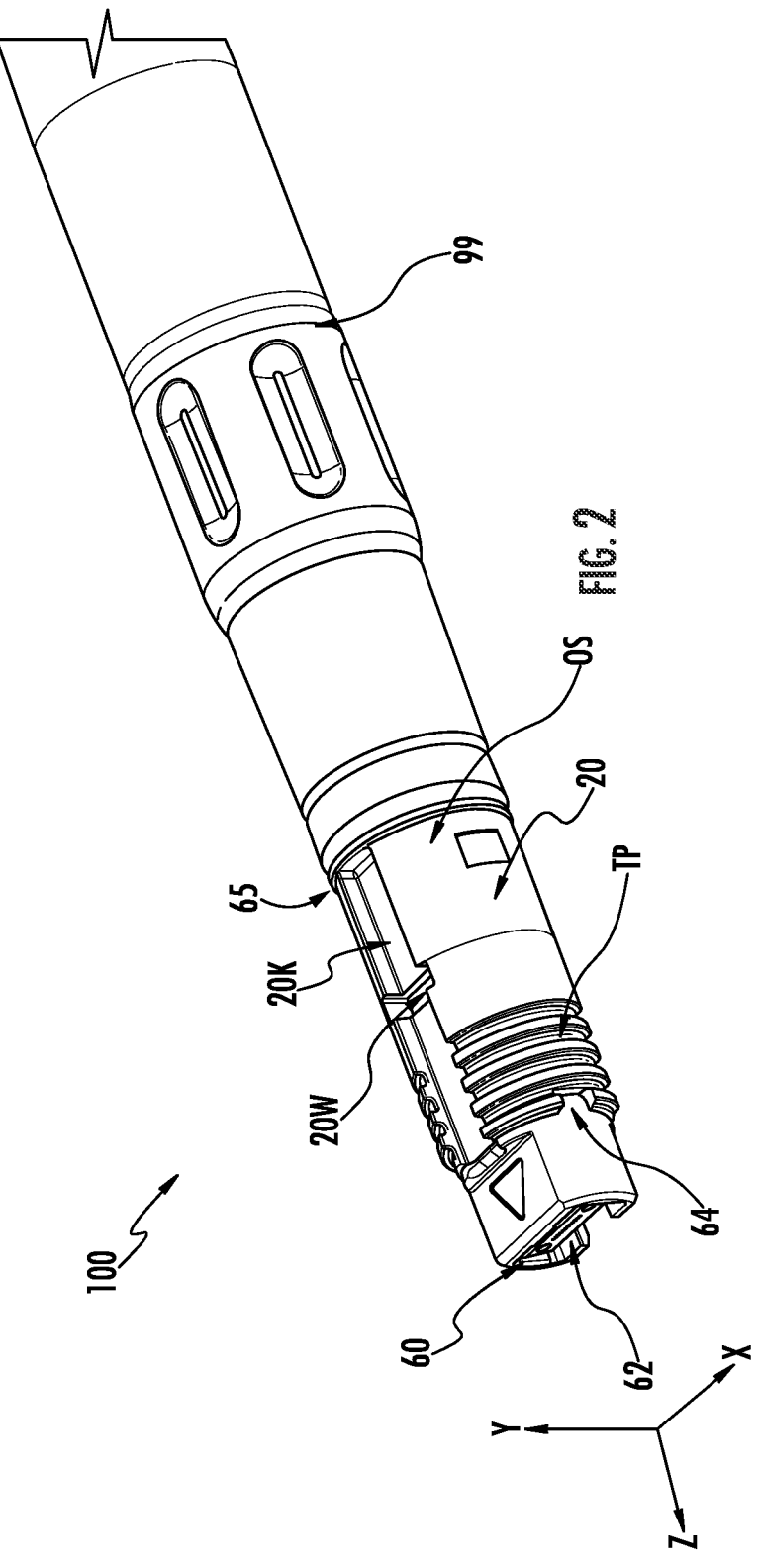
FIG. 2 is a top perspective view of the assembled multi-fiber optical connector of FIG. 1.

Connector housing 20 may also comprises one or more notches 20N that cooperate with complimentary features on the nosepiece 60 if used. Notches 20N may have any suitable geometry disposed on the front end 23 of the connector housing 20. By way of explanation, notches 20N cooperate with complimentary features of the nosepiece 60. As illustrated, the notches 20N are cutouts on the front end 23 of connector housing 20. Connector housings 20 do not require notches 20N; however, the use of the notches 20N allows the use of one or more sidewall guides 64 on the nosepiece 60. As shown in FIGS. 2 and 3, the notches 20N of connector housing 20 cooperate with the sidewall guides 64 for providing a relatively uniform outer surface of the connector 100 when assembled.

Figures 20, 21:
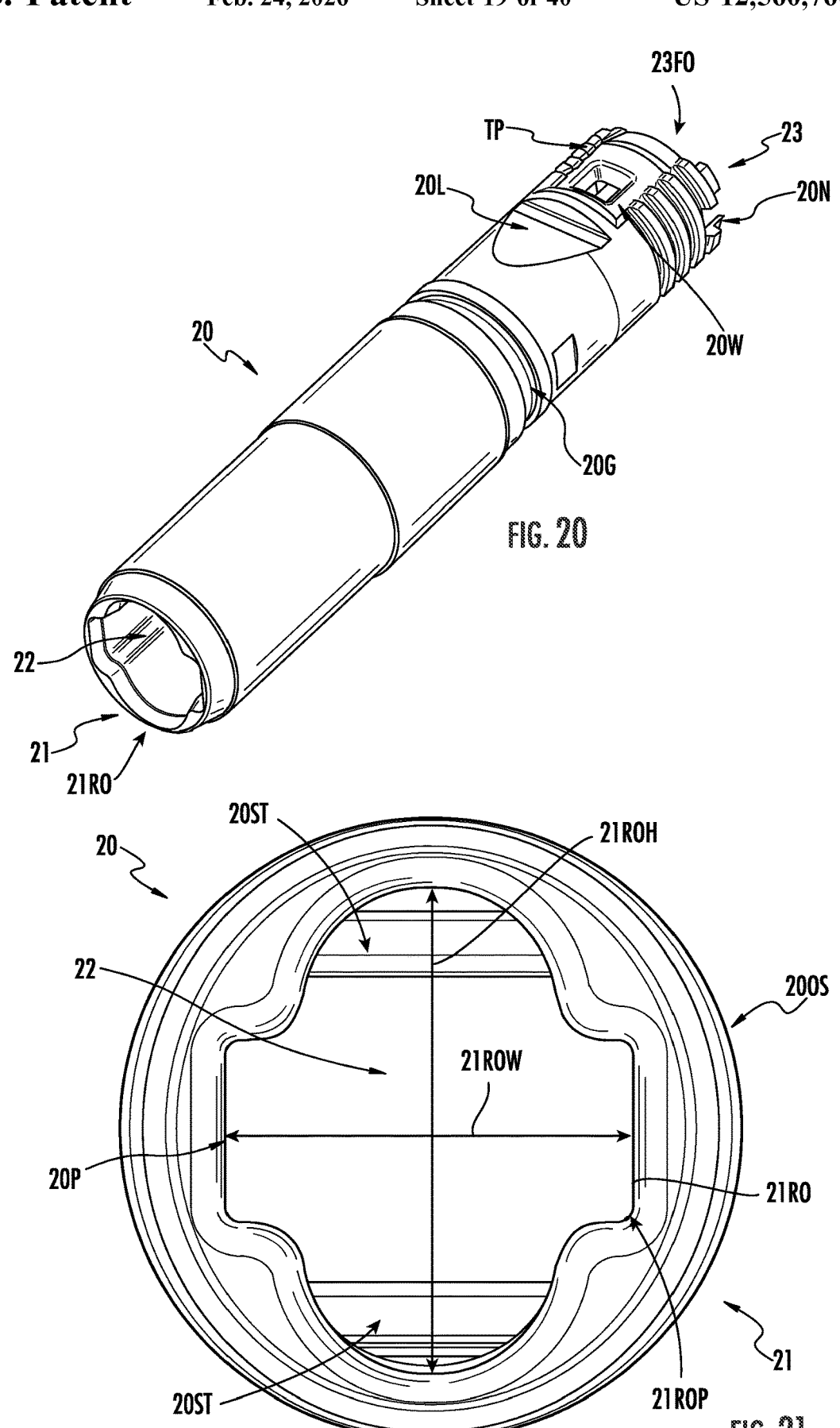
FIGS. 20 and 21 show an alternative connector housing of the multi-fiber optical connector with a passageway shaped for a non-round fiber optic cable according to the concepts disclosed.

Connector housing 20 may have other geometry or features as desired or not. Moreover, connector housing 20 may have any suitable shaped longitudinal passageway 22 between the rear end 21 and front end 23 for the desired fiber optic cable or termination technique. FIG. 11 shows connector housing 20 in cross-section with the explanatory features formed on primitive geometry of cylindrical sleeve of the connector housing 20 (the desired features are formed on the primitive cylindrical geometry of the sleeve for the desired final shape on the outer surface of the connector housing) and cross-sections are generally round with explanatory features that may interrupt the round cross-sections. FIG. 20 shows a similar connector housing 20 with features formed on primitive geometry of the cylindrical sleeve, but with a different shape for the longitudinal passageway 22 for a different cable cross-section. More specifically, FIGS. 20-21E depict cross-sections of the connector housing 20 with a longitudinal passageway 22 having a shape suitable for termination on a non-round fiber optic cable. The connector housing 20 of FIGS. 20-21E also has different locations for windows 20W that require a modified nosepiece with shorter cantilevered arms as well.

Examples of further features in the connector housing 20 include locking features 20L for securing the connector 100 in a complementary device such as the port of a terminal or closure. Further, connector housing 20 may also comprise features for keying connector 100 during mating. Additionally, connector housing 20 may comprise one or more groove 20G for seating an O-ring 65 for sealing the connector 100 upon mating or for sealing to a portion of the convertor assembly. Still further, the connector housing 20 may have features for securing a dust cap such as a threaded portion TP adjacent the front end 23 and/or securing the convertor assembly. Connector housing 25 may also comprise one or more apertures 25 through the sidewall for placing an adhesive, epoxy, glue, or the like into the passageway 22 for securing the cable 90 to the connector housing. Moreover, the apertures 25 may be located about 180 degrees apart on the outer surface OS of the connector housing 20 and/or be offset laterally from or along the longitudinal axis for improving flow of the adhesive. The features of connector housing 20 described herein are explanatory and may be used in different combinations as desired for creating different connector footprints.

With reference to FIG. 11, the cylindrical primitive geometry for connector housing 20 shown may comprise a generally cylindrical primitive geometry with different diameters along the longitudinal axis as depicted. Using different diameters for the cylindrical primitive geometry of connector housing 20 allows a heat shrink 98 and/or connector boot 99 to fits relatively flush with the larger diameter portion of connector 100. Further, connector housing 20 may include one or more ribs 20R for securing the heat shrink 98 or connector boot 99 in a robust manner.

In one advantageous connector housing design, a locking feature 20L is integrally formed in the material of the connector housing 20 such as a negative cutout from the primitive round or cylindrical sleeve geometry of the connector housing 20 as shown. The negative cutout from the primitive round or cylindrical sleeve geometry for locking feature 20L allows a relatively small connector footprint while retaining the connector 100 in a complimentary device or port. For instance, the locking feature 20L may cooperate with a translating securing member of the device or port that engages the negative cutout for securing connector 100.

The locking feature 20L may have any suitable geometry. The locking feature 20L cooperates with a suitable device or optical port to secure the connector 100 for optical connection. In this explanatory example, locking feature 20L of connector housing 20 may be configured as a ramp 20R with a ledge 20LD as the retaining feature for connector 100. The ramp 20R and ledge 20LD may have geometry that allows a push and lock feature for securing the connector 100 to a suitable optical port or other device. The locking feature 20L may also comprise a flat portion disposed between the ramp 20R and ledge 20LD if desired. Of course, other locking features or configurations are possible for connector housing 20 using the concepts disclosed herein.

Connector housing 20 may include still other features if desired. For instance, connector housing may further comprise a suitable keying portion. By way of example, connector housing 20 comprises a female key (20FK). Female key 20FK may interrupt or extend into a portion of the threaded portion (TP) if desired. One arrangement may have the locking feature 20L integrally formed in the connector housing 20 with the female key 20K that extends into a portion of the transition region (TR), and the locking feature 20L is disposed about 180 degrees apart from the female key 20K.

Connector housing 20 may have other geometry as desired or not. For instance, the connector housing 20 may have different shapes for the passageway 22 for securing different cable types. Likewise, the connector housing 20 may have different alignment feature(s), securing feature(s), and/or keying features while still using the disclosed concepts.

Connector housing 20 may be formed from any suitable materials such as a polymer, metal, composite, etc. The material of the connector housing 20 may depend on the method used for securing the cable 90 to the connector housing 20. For instance, if connector housing 20 was intended to receive an adhesive for securing the cable 90, then the connector housing 20 would be made from a suitable material to cooperate with the adhesive. In other embodiments, connector housing 20 may be formed from materials with other desired properties. For instance, the connector housing 20 could be formed from a metal if desired. Likewise, the nosepiece 60 may use materials that are similar to the connector housing 20 or not.

FIGS. 12 and 13 depict detailed views of the nosepiece 60 of connector 100 of FIG. 1. The nosepiece 60 depicted in FIGS. 12 and 13 comprises a first cantilevered arm 60CA and a second cantilevered arm 60CA extending rearward as depicted. As shown in FIG. 13, backstops 60BS may be disposed on the cantilevered arms 60CA for limiting the rearward travel of ferrule 30 in the Z-direction. Specifically, an enlarged shoulder 30S of ferrule 30 or alternatively the shoulder 30S may contact a spacer that abuts the backstops 60BS when pushed rearward as illustrated in FIG. 8. However, when the ferrule 30 is captured in the passageway 62 of the nosepiece 60 the ferrule has limited movement in the Z-direction such as between 100-400 microns of travel in the unmated state while excluding a biasing spring for the ferrule 30.

Independently, the ferrule 30 is allowed limited movement in the X-direction and Y-direction within the passageway 62 of the nosepiece 60 when in the unmated state. Moreover, the limited movement in the various directions can have different distances of travel as desired. For instance, nosepiece 60 may comprise one or more rails 60R. Rails 60R are disposed on a surface of the passageway 62 of nosepiece 60. A distance D between a first rail 60R disposed on a first side of the nosepiece 60 and a second rail 60R disposed on an opposing side of the nosepiece 60 is between 100-400 microns larger that a complementary dimension of the ferrule such as ferrule height FH (e.g., in the Y-direction as shown in FIG. 12). The distance D between the rails allows the ferrule 30 to have limited movement such as in the Y-direction. The distance D between the rails 60R also guides the complementary mating ferrule to properly align and engage ferrule alignment pins of connector 100 during mating. Ferrule alignment pins could be disposed on the ferrule of connector 100 or on the mating ferrule as desired.

Likewise, nosepiece 60 comprises similar structure in the X-direction for allowing limited movement of ferrule 30 in the unmated state. In this embodiment, nosepiece 60 comprises one or more sidewall guides 64 as depicted. The rails 60R disposed for limiting travel in the X-direction extend to the sidewall guides 64. In the X-direction, a distance D between a first rail 60R disposed on a first side of the nosepiece 60 and a second rail 60R disposed on the opposing side of the nosepiece 60 is between 100-400 microns larger that a complementary dimension of the ferrule such as ferrule width FW depicted in FIG. 25. Consequently, the ferrule 30 has limited movement in the X-direction as well.

Nosepieces 60 comprise a front portion 60FP and a rear portion 60RP along with a passageway 62 extending from a front end 63 to a rear end 61 and sized to receive the ferrule 30 therein. By way of explanation, the pocket 60PK extends from the front end 63 of nosepiece 60 to a medial portion of the nosepiece. As shown, pocket 60PK is disposed on the same side of the nosepiece 60 as the key 60MK. Moreover, the pocket 60PK may be disposed forward of the key 60MK

(i.e., closer to the front end 63 of nosepiece 60). Although a male key is shown for key 60MK for orientating the nosepiece 60 with respect to the connector housing 20, other arrangements are possible for keying the nosepiece 60 with connector housing 20 such as a female keyway on the nosepiece 60 for cooperating with a male key on the connector housing 20.

As disclosed herein, nosepieces 60 may snap-fit to the front end of the connector housings. Nosepiece 60 also comprises one or more securing features 60P for attaching the nosepiece 60 to the connector housing. For instance, nosepiece may have a snap-fit to the connector housing 20 by using securing features disposed on the cantilevered arms 60CA. In this embodiment, securing features 60P are protrusions disposed on cantilevered arms 60CA that cooperate with securing features 20W disposed on connector housing 20. Securing features 60P may have any suitable geometry.

Figure 14:
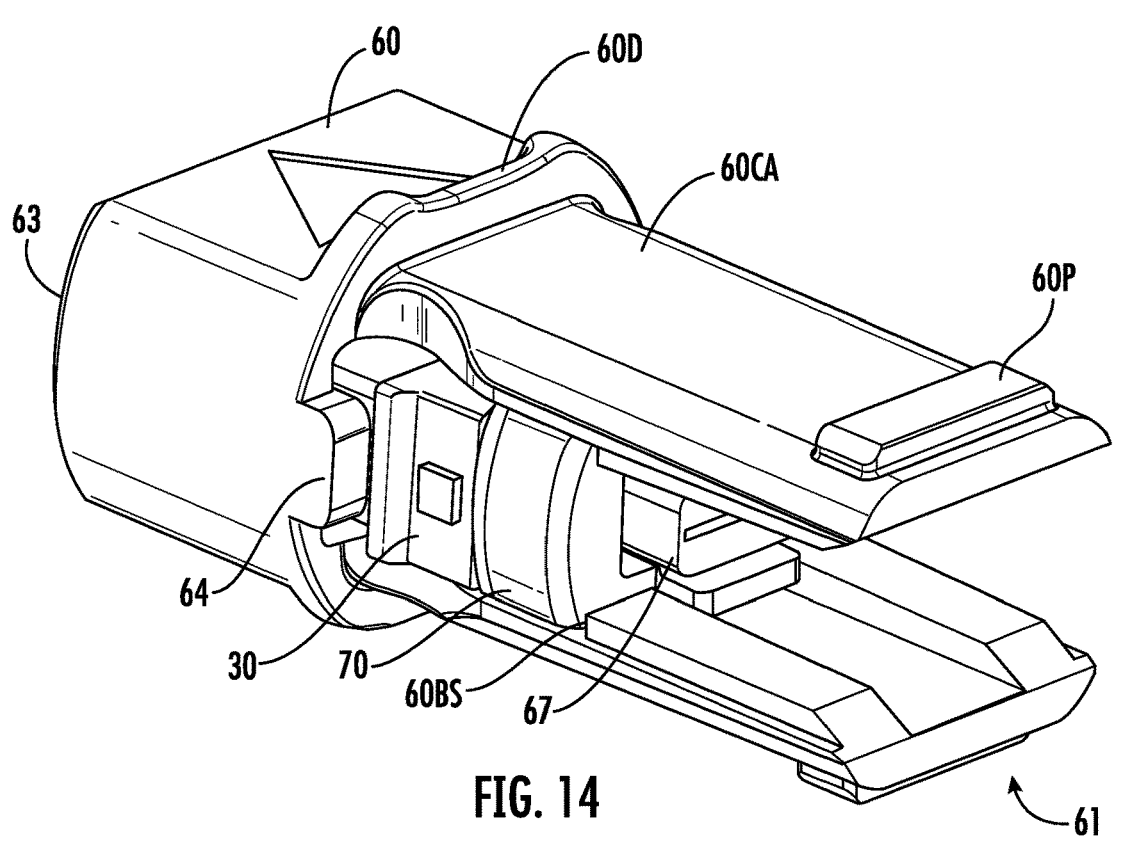
FIGS. 14 and 15 depict various views of the nosepiece for the multi-fiber optical connector of FIG. 1 showing details of the use of a spacer disposed in the nosepiece.
Figure 15:
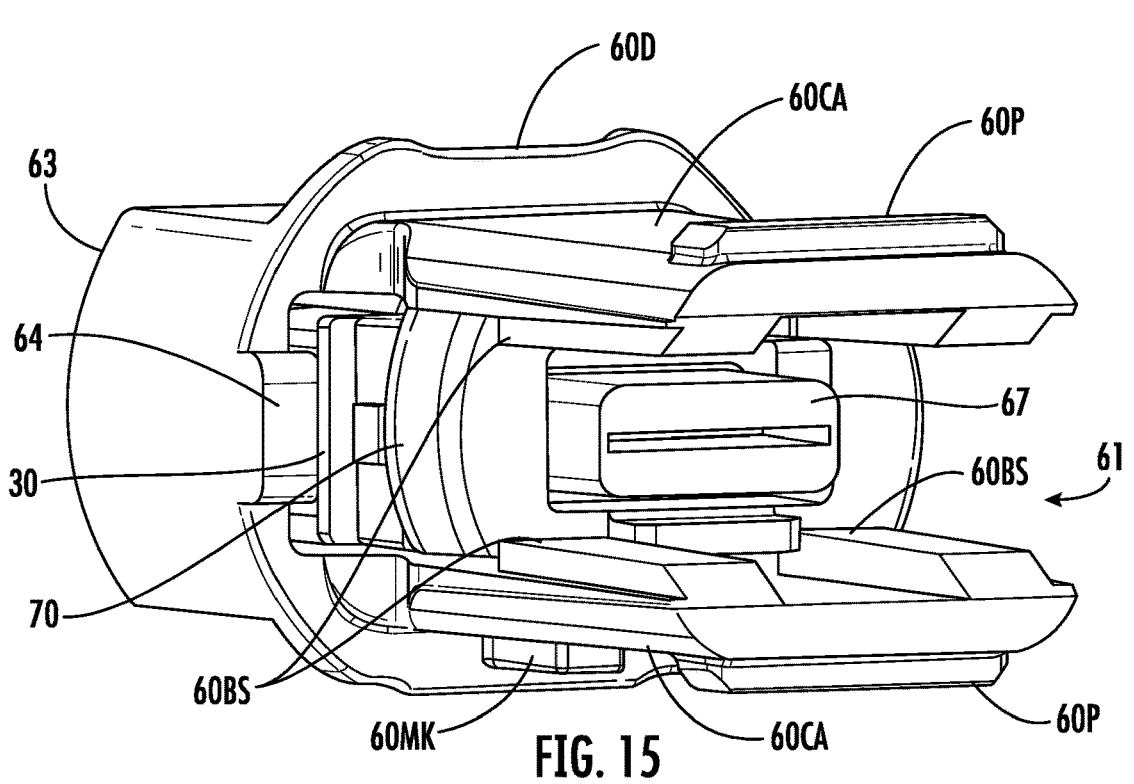

FIGS. 14 and 15 depict the assembly of the spacer 70 (FIG. 17) and ferrule 30 disposed within nosepiece 60. Spacer 70 keeps a predetermined distance between the cantilevered arms 60CA so that the ferrule 30 does not drag on the cantilevered arms 60CA and restrict movement. As shown, the spacer 70 is disposed rearward of ferrule 30 when assembled. When using spacer 70, the nosepiece requires modification such as moving the backstops 60BS further rearward to account for the thickness of the spacer. FIG. 16 depicts a side view of the nosepiece 60 showing the backstops 60BS on the inner portions of the cantilevered arms 60CA.

Figure 17:
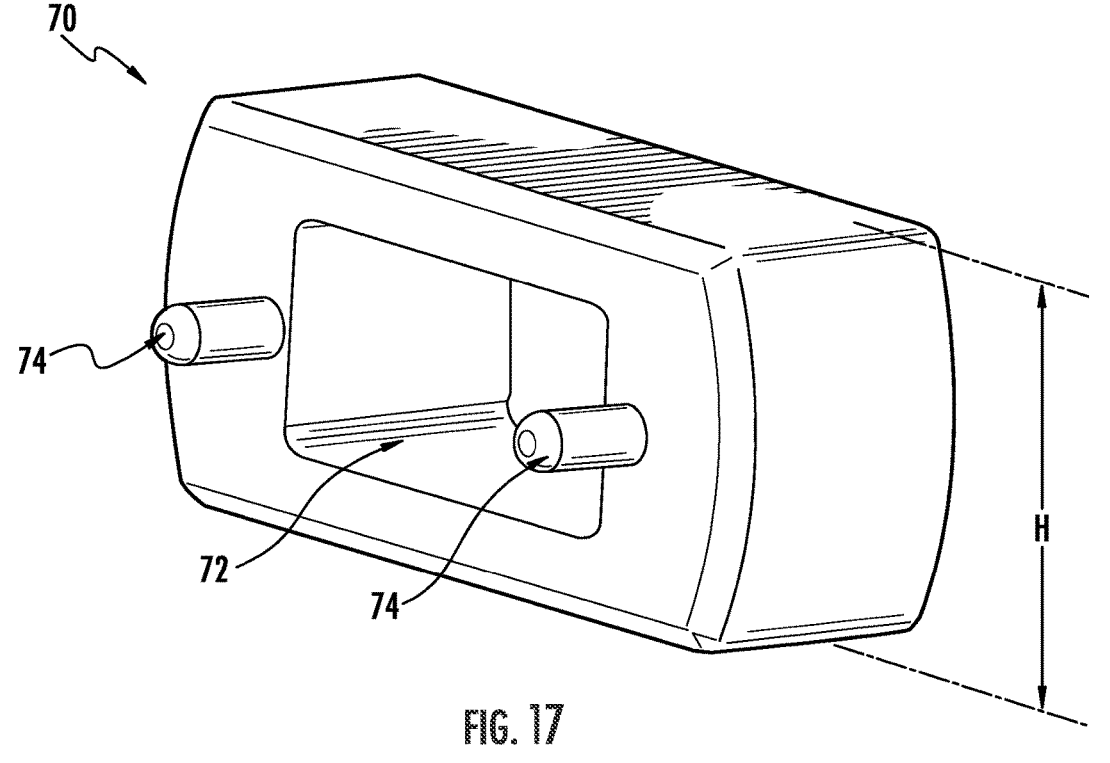
FIG. 17 depicts a detailed view of the spacer of FIGS. 14 and 15 that may be used with the multi-fiber optical connector according to the disclosed concepts.
Figure 18:
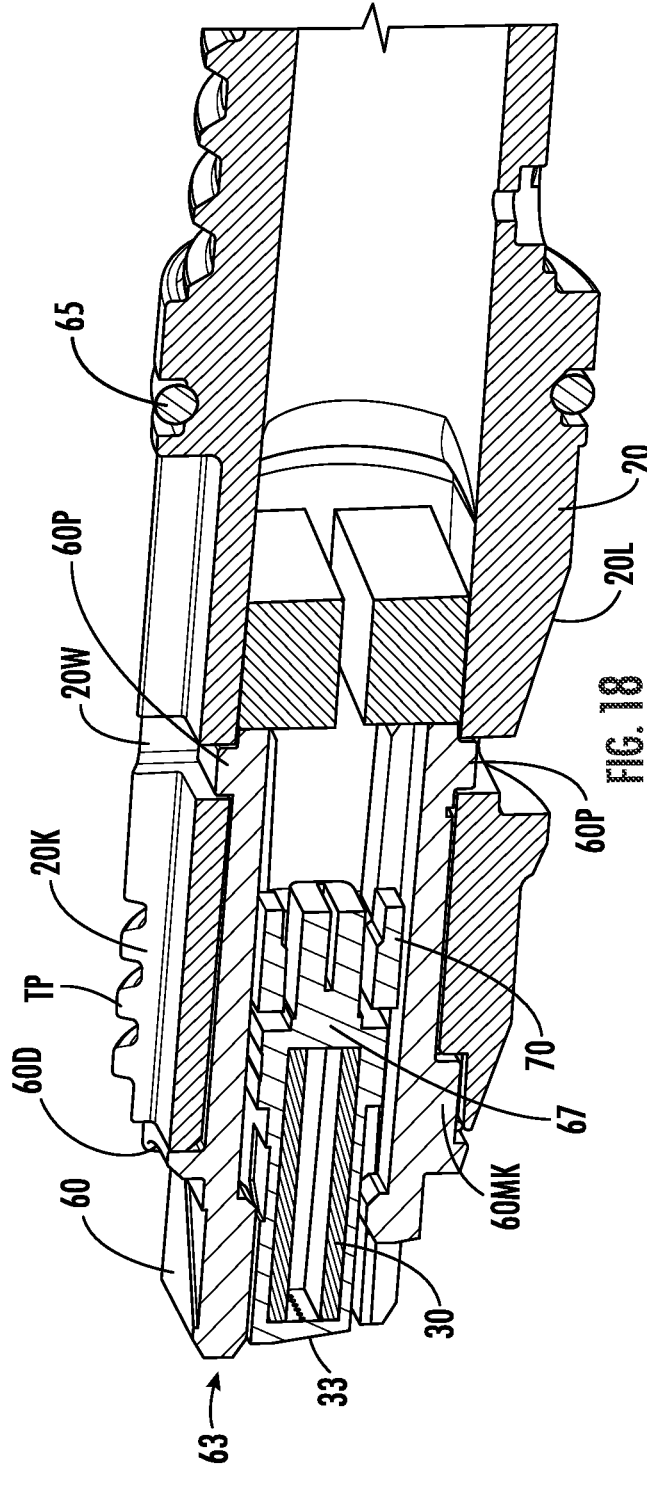
FIG. 18 depicts a cross-sectional view of a front portion of the multi-fiber optical connector with the optical fibers removed for clarity.
Figures 19, 19A:
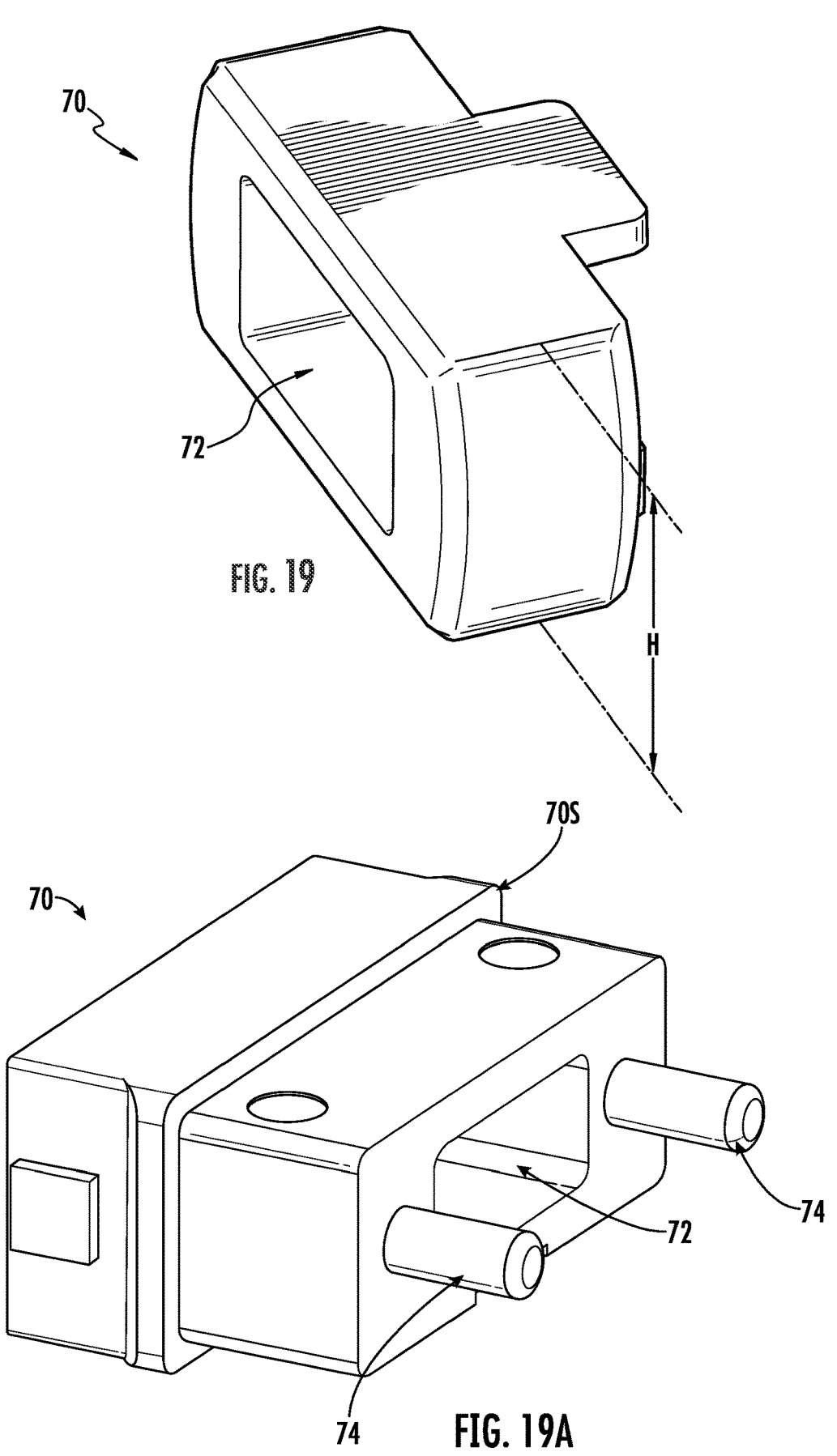
FIG. 19 depicts a detailed view of another spacer that may be used with the multi-fiber optical connector according to the disclosed concepts.
FIGS. 19A and 19B depict still another spacer useful for cooperating with alternative ferrules using the multi-fiber optical connector concepts disclosed.

FIG. 17 shows an explanatory spacer 70. Spacer 70 has a predetermined height H that is greater than a height of the ferrule shoulder 30S. Thus, the cantilevered arms 60CA are inhibited from interfering with the limited travel of ferrule 30 in the Y-direction. Spacer 70 also includes an opening 72 so that the optical fibers may pass through. The ferrule 30 may also have a ferrule boot 67, and the opening 72 may be sized appropriately for the ferrule boot 67. Spacer 70 may also optionally comprise one or more pins 74 that cooperate with alignment bores 32 of ferrule 30, thereby maintaining alignment of components. If pins 74 are used on spacer 70, the pins 74 are appropriately undersized compared to the alignment bores 32 so that the ferrule 30 may still move freely with the limited travel as discussed herein. Due to this change in the nosepiece design, the cantilevered arms 60CA may be longer and the securing features 60P of the nosepiece and the securing features 20W may have different placements on the components such as depicted in FIG. 18. FIG. 19 depicts an alternative spacer 70 that does not use pins like the spacer 70 of FIG. 17.

FIGS. 19A-19E show different adaptations for connector 100 using a ferrule 30 configured as TMT ferrules available from US Conec of Hickory, NC. Illustratively, FIG. 19A depicts a spacer 70 useful for cooperating with a ferrule 33 such as a TMT ferrule in FIG. 19B. Like other spacers, this spacer 70 includes an opening 72 so that the optical fibers may pass through, and the opening 72 may be sized other components. Spacer 70 upsizes the length for smaller ferrule 30 and also provides a shoulder 70S, thereby increasing the overall length and providing a front stop surface for cooperating with an adapted nosepiece 60. Spacer 70 also comprises pins 74 that cooperate with alignment bores 32 of ferrule 30 at the rear end, thereby maintaining alignment of components. As discussed, pins 74 may be appropriately undersized compared to the alignment bores 32 so that the ferrule 30 may still move freely with the limited travel.

Figures 19B, 19C:
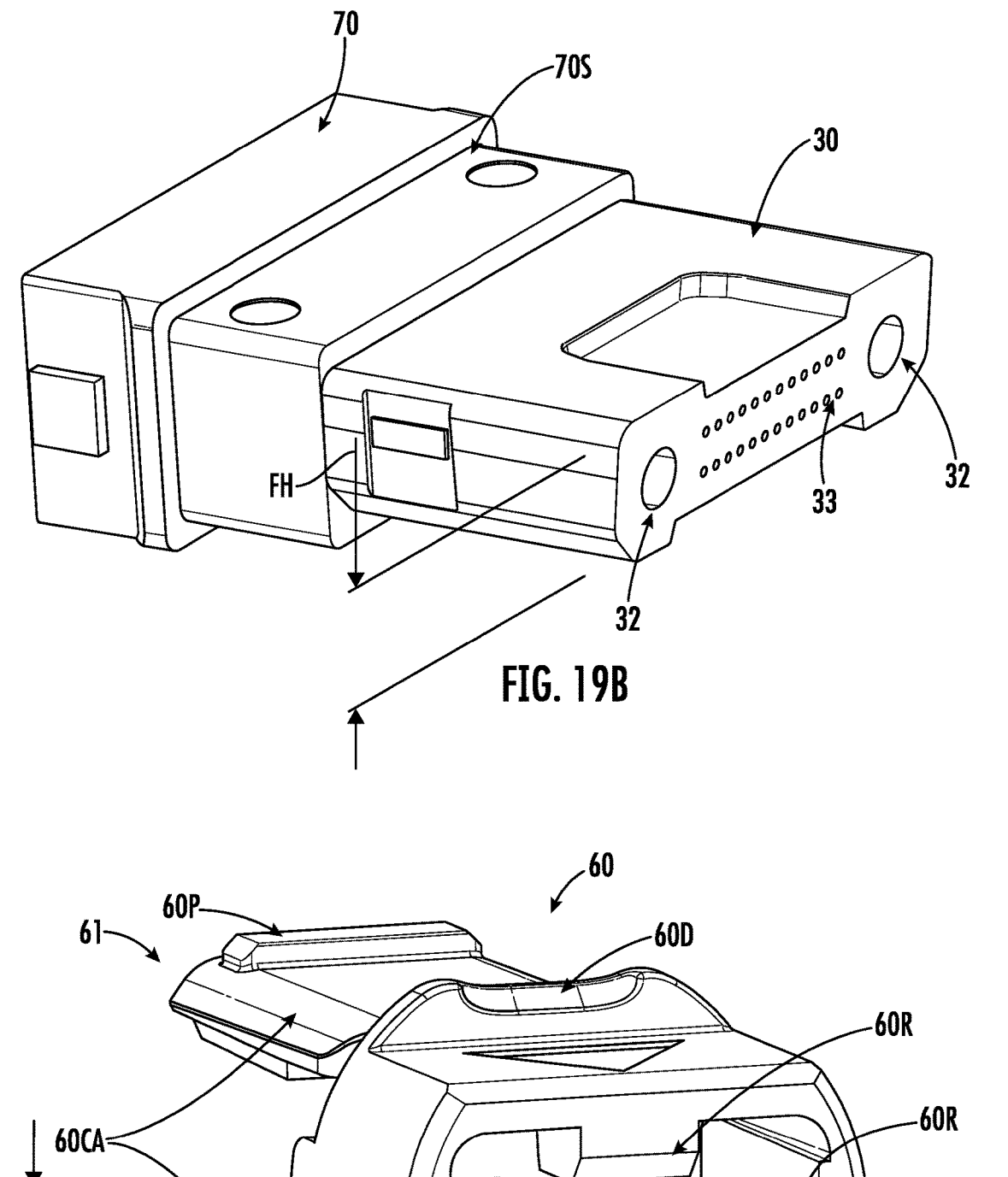
FIG. 19C shows a nosepiece adapted for the ferrule of FIG. 19B as part of the multi-fiber optical connectors disclosed.
Figure 19D:
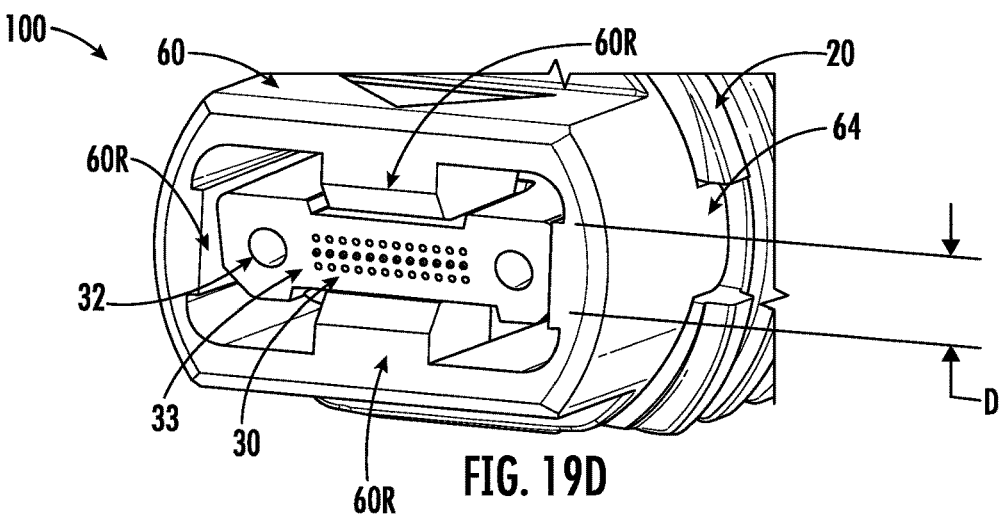
FIG. 19D shows an assembled perspective front view of the multi-fiber optical connector using the spacer and ferrule of FIGS. 19A and 19B along with the nosepiece of FIG. 19C.

FIG. 19C shows a nosepiece 60 adapted for the TMT ferrule 30 using the and spacer 70 of FIGS. 19A and 19B as part of connector 100 that is similar to the other nosepieces disclosed herein. Nosepiece 60 comprises a passageway 62 extending from the front end 63 to the rear end 61. As shown best shown in FIG. 19C, nosepiece 60 comprises rails 60R or guides on one or more sides for accommodating the smaller ferrule height FH (e.g., in the Y-direction) for the ferrule of FIG. 19B along with rails 60R on the sides for limiting travel in the X-direction. The distance D between a first rail 60R disposed on a first side of the nosepiece 60 and a second rail 60R disposed on the opposing side of the nosepiece 60 is between 100-400 microns larger that a complementary dimension of the ferrule such as ferrule height FH or ferrule width FW. Nosepiece 60 also comprises backstops 60BS. Nosepiece 60 also provides a suitable recess depth RD for the optical mating end face 33 of ferrule 30 with respect to the front end 63 of the nosepiece 60 such as being 1 millimeter or less. Consequently, the ferrule 30 has limited movement as restricted by the nosepiece 60 as disclosed herein. FIG. 19D shows an assembled perspective front view of the connector 100 using the spacer 70 and ferrule 30 of FIGS. 19A and 19B along with the nosepiece 60 of FIG. 19C. As depicted, the ferrule 30 may terminate any suitable number of optical fibers in one or more rows of optical fibers.

Figure 19E:
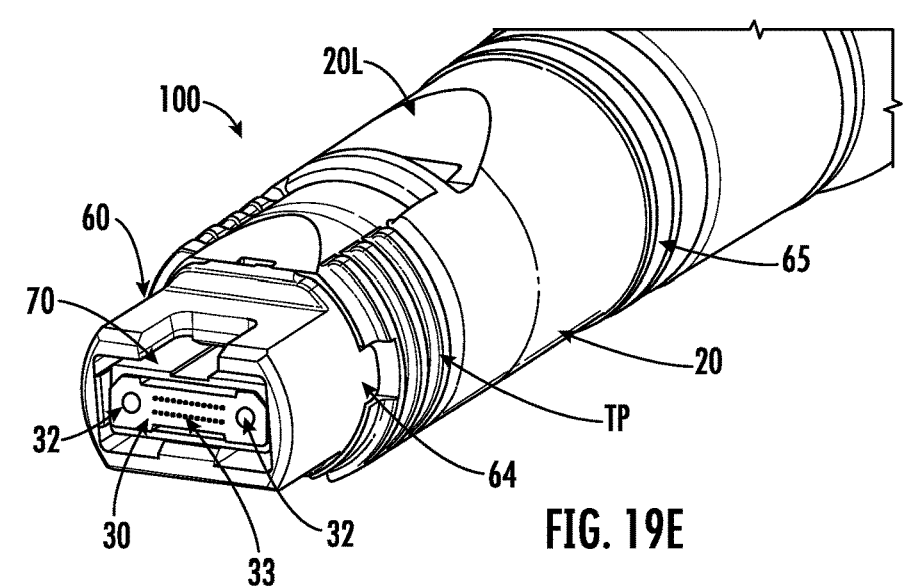
FIG. 19E shows another spacer and ferrule arrangement for use with the multi-fiber optical connector where the spacer sheaths a portion of the ferrule.

Still other spacer constructions are possible for cooperating with ferrules according to the connector concepts disclosed. FIG. 19E shows another spacer 70 and for use with the multi-fiber optical connector 100 where the spacer 70 sheaths a forward portion of the ferrule 30 as depicted. Having the spacer 70 sheath a front portion of the ferrule 30 allows the same nosepiece to be used with multiple ferrule types such as MT, MPO along with the smaller TMT ferrule. By way of explanation, spacer 70 upsizes the one or more dimensions of the smaller ferrule depicted so the packaging is similar with the dimensions (i.e., ferrule height and/or ferrule width) of an MT or MPO ferrule. As shown and not numbered, the spacer 70 of FIG. 19E may also comprise a keying feature such as a key or keyway for adapting the ferrule to a desired form such as a MT or MPO interface. Thus, a single nosepiece 60 may accommodate several different ferrule types for further expanding flexibility of the connector design for working various fiber counts, ferrule types along with simplifying manufacturing. Other arrangements are possible for adapting ferrules to the connector concepts disclosed.

Figure 19F:
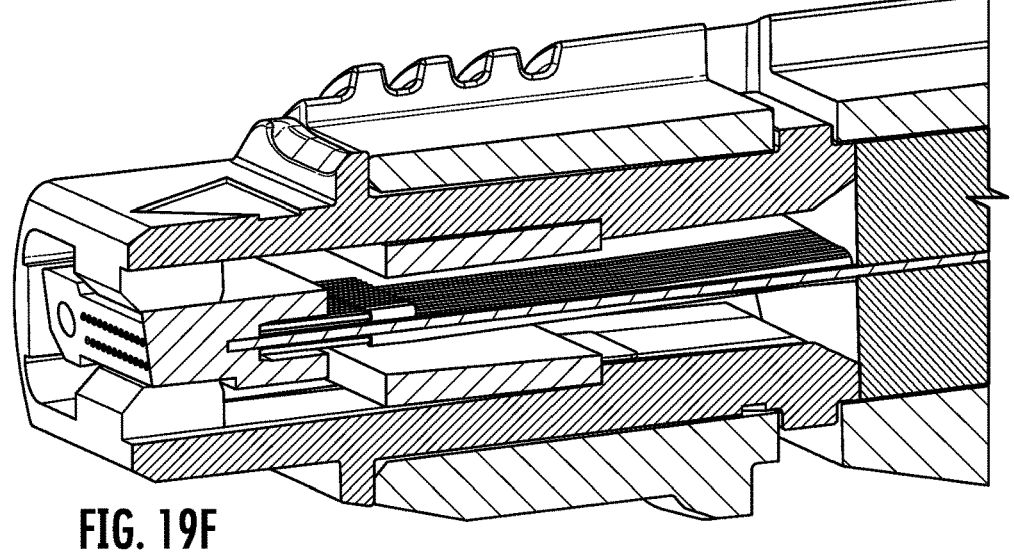
FIG. 19F shows still another arrangement using the ferrule depicted in FIG. 19B for use with a nosepiece of the multi-fiber optical connector.

FIG. 19F shows a cross-sectional view of another arrangement using the ferrule 30 depicted in FIG. 19B with a nosepiece 60 for connector 100. As shown, ferrule 30 comprises multiple rows of optical fiber bores along with corresponding optical fibers for making a high-count connector 100 greater than 12-fibers. This nosepiece 60 comprises rails 60R or guides on one or more sides for accommodating the smaller ferrule height FH (e.g., in the Y-direction) for the ferrule of FIG. 19B along with rails 60R on the sides for limiting travel in the X-direction as shown with a different spacer 70 than shown in FIG. 19A. Thus, the concepts of connector 100 may advantageously provide the flexibility for using different types of ferrules 30 as desired.

FIGS. 20 and 21 depict another connector housing 20 for multi-fiber optical connector 100 with a passageway shaped for receiving and terminating a non-round fiber optic cable. This connector housing 20 has a different shaped longitudinal passageway 22 tailored for the specific cable design. In this embodiment, the longitudinal passageway 22 has a width shaped for a flat cable having glass-reinforced rods (GRPs), instead of shaped for a round cable with aramid yarns and allows the ferrule 30 to be inserted from the rear end 21 of the connector housing 20 and pass all the way through to and past the front end 23 of the connector housing 20. The windows 20W are also disposed closer to the front end 23 of the connector housing 20 to show that the concepts disclosed may be use with alternate nosepieces having shorter cantilevered arms.

Figure 21B:
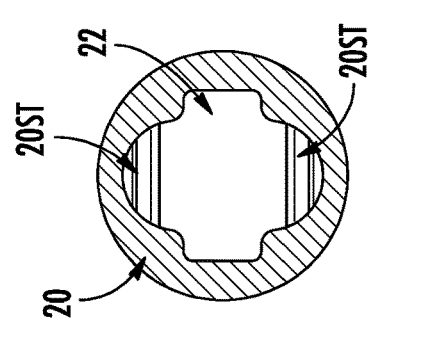
FIGS. 21A-21D show various cross-sections of connector housing depicted in FIGS. 20 and 21.
Figure 21D:
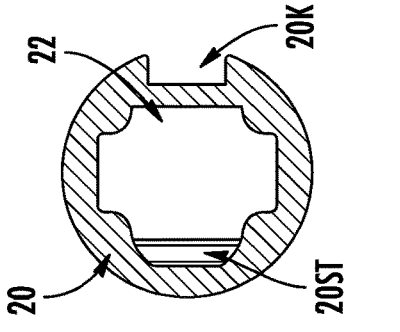
Figure 21A:
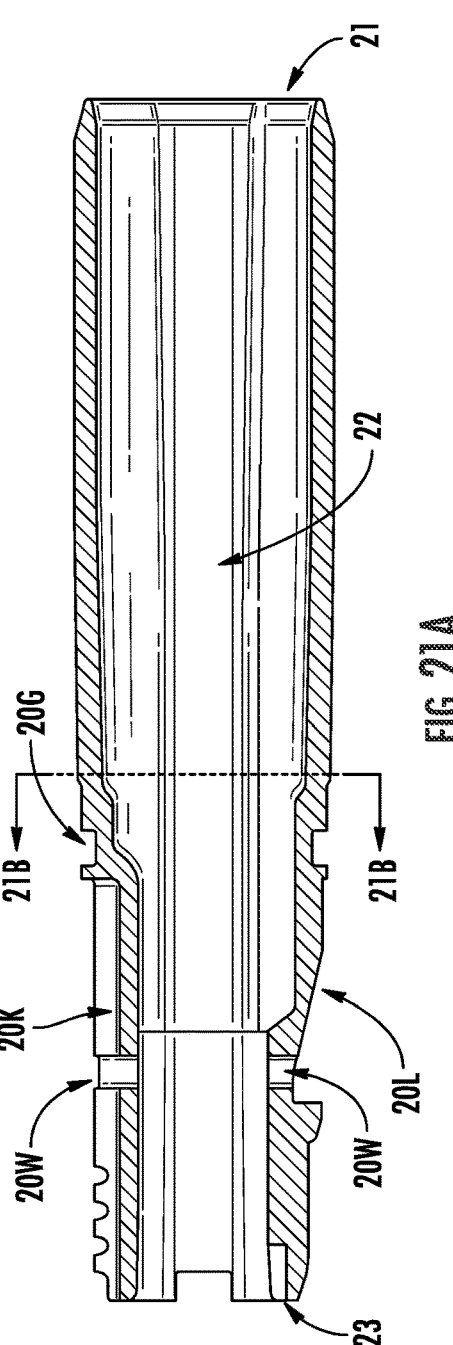
Figure 21C:
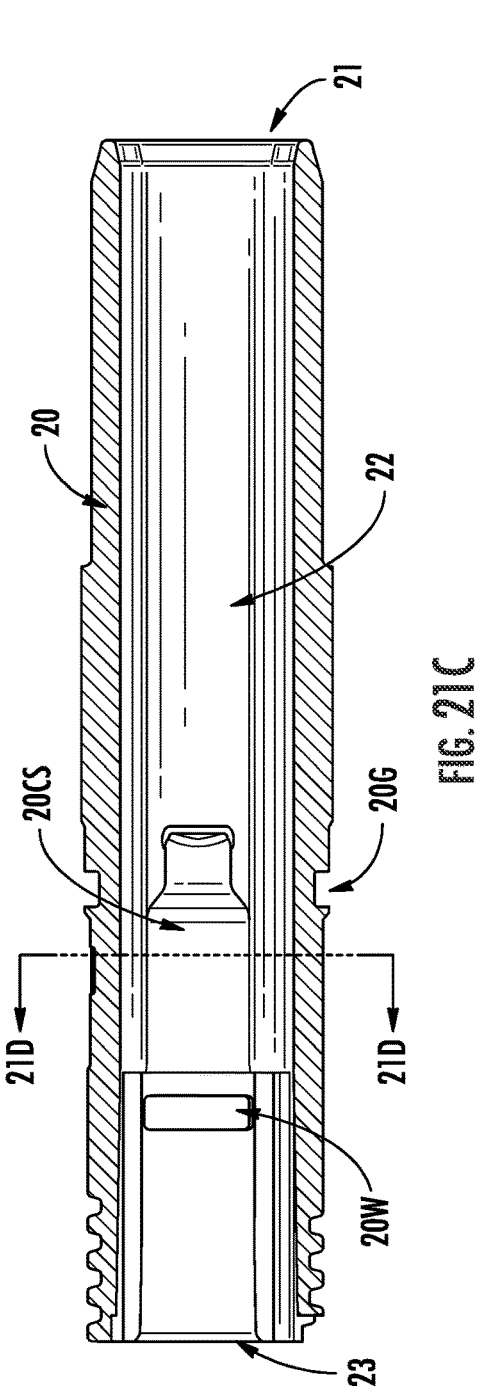
Figure 21E:
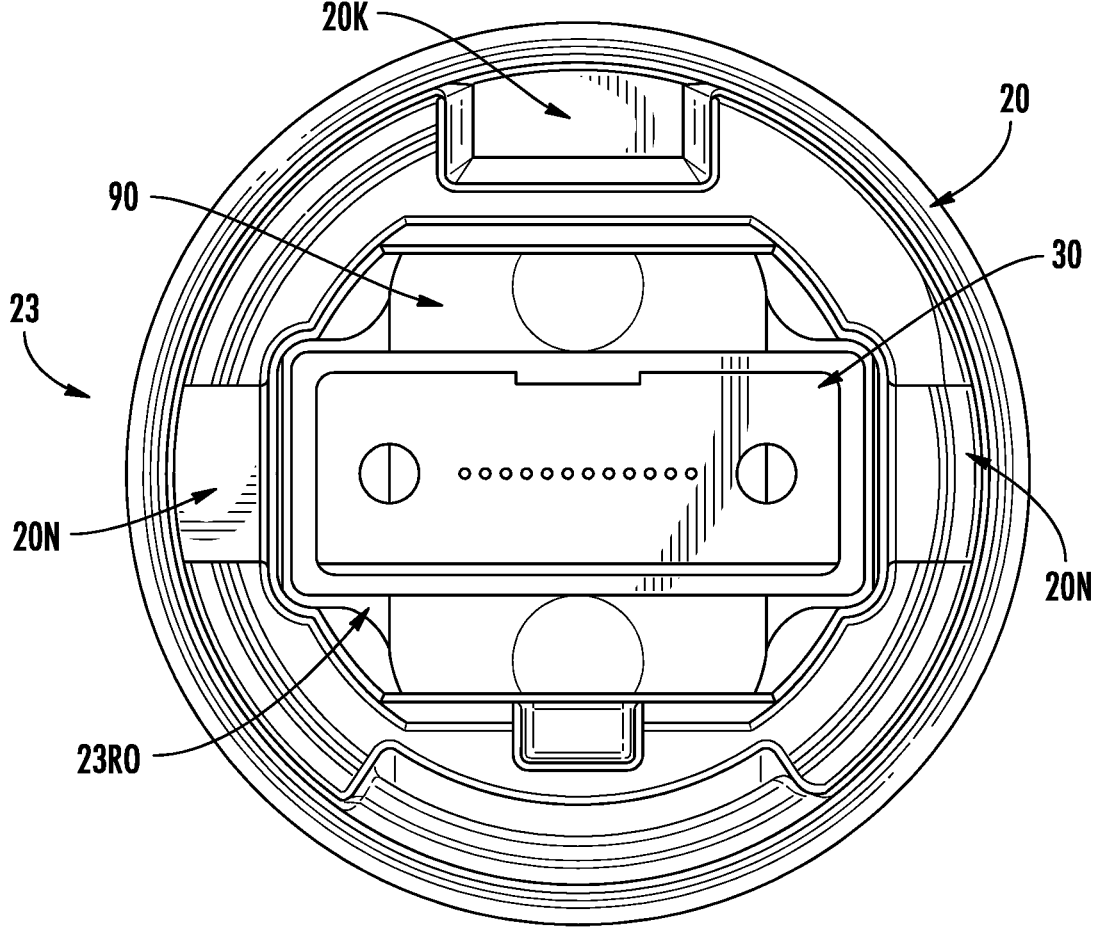
FIG. 21E shows a front view of the connector housing of FIGS. 20 and 21 with the ferrule and fiber optic cable disposed in the longitudinal passageway.

FIGS. 21A-21D depict various sectional views of the connector housing 20 shown in FIGS. 20 and 21, and FIG. 21E shows a front view of the connector housing 20 with ferrule 30 attached to fiber optic cable 90 inserted into the longitudinal passageway 22 from a rear opening 21RO and showing ferrule 30 extending through a front opening 20RO of the connector housing 20. FIG. 21B is a cross-section of connector housing taken at line 21*b*-21*b* of FIG. 21A, and FIG. 21D is a cross-section of connector housing taken at line 21*d*-21*d* of FIG. 21A. Other connector housings 20 could have other shaped passageway 20 tailored for different cable types.

FIG. 21 shows the rear end 21 of the connector housing 20 of FIG. 20 having a rear opening 21RO. Rear opening 21RO defines an opening having a rear opening perimeter 20ROP. As depicted, the rear opening perimeter 20ROP has a rear opening height 21ROH and a rear opening width 21ROW. Rear opening 21RO is non-round and accommodates the insertion of the ferrule 30 that is attached to the fiber optic cable 90 from the rear end 21. Specifically, this connector housing 20 has the rear opening height 21ROH sized for receiving and accommodating the insertion of a non-round fiber optic cable 90 into the longitudinal passageway 22. The rear opening width 21ROW is sized to receive and accommodate the insertion of ferrule 30 from the rear end 21. As depicted, the rear opening height 21ROH and rear opening width 21ROW are disposed orthogonally. Consequently, the fiber optic cable 90 is oriented in the connector 100 so that the preferential bend axis of the cable is orthogonal to the major width of the ferrule 30.

Figures 21F, 22:
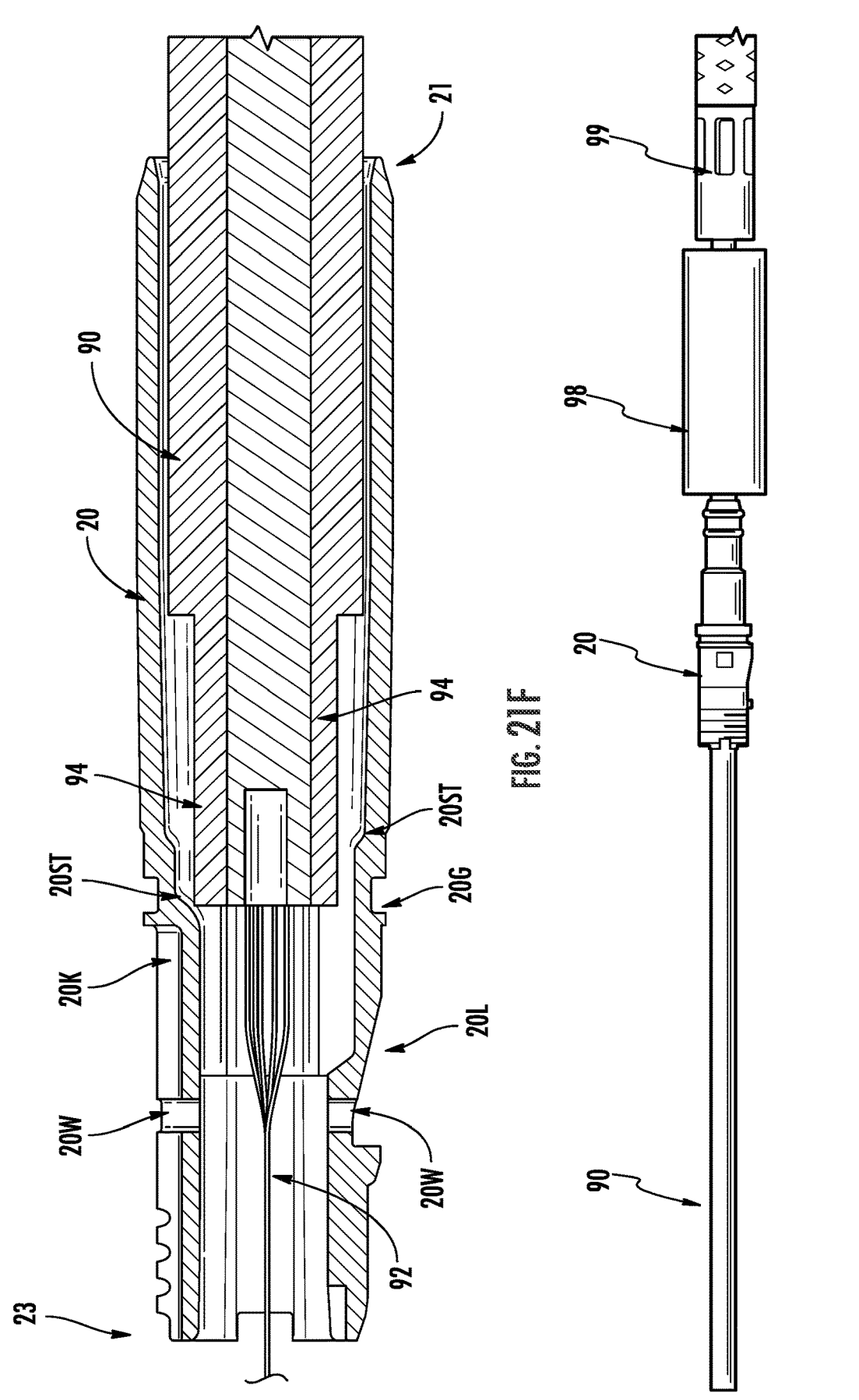
FIG. 21F shows a cross-section of the connector housing of FIGS. 20 and 21 with the fiber optic cable disposed therein.
FIGS. 22-31 show explanatory methods for making the fiber optic cable assemblies disclosed herein.

As shown, the longitudinal passageway 22 is sized so that the ferrule 30 may pass through the rear opening 21RO of the connector housing 20 through the longitudinal passageway 22 and through a front opening 23RO of the connector housing 20 of FIG. 20. Consequently, the ferrule 30 may have optical fibers 92 of the fiber optic cable 90 attached thereto and then the connector housing 20 over the ferrule 30 with the attached fiber optic cable 90. Longitudinal passageway 22 has one or more steps 20ST therein as depicted. The one or more steps 20ST may act as a stop for the insertion of the prepared fiber optic cable 90. FIG. 21F shows a longitudinal cross-section of connector housing 20 of FIGS. 20 and 21 with the prepared end of fiber optic cable 90 disposed therein. As depicted, the strength members 94 of the prepared end of the fiber optic cable 90 may abut the one or more steps 20ST disposed within the longitudinal passageway 22. FIG. 31 depicts the connector housing 20 being installed from the front so that the ferrule 30 is inserted from the rear end 21 of the connector housing 20 and passes through passageway 22 and past the front end 23 of the connector housing; otherwise, the assembly of the cable assembly is similar to the methods shown.

Connector housing 20 may be secured to cable 90 in any other suitable manner for enabling the termination of a variety of cable types or constructions. Cable 90 may also be attached to connector housing 20 using an adhesive such as epoxy, glue, or the like. The adhesive, epoxy, glue, or the like may also secure one or more optical fibers and/or strength members of the cable to the connector housing 20 in addition to the cable. The adhesive or the like can be inserted into an aperture 25 in the connector housing 20 for securing the cable 90 to the retention body 60. Alternatively, adhesive or the like may be inserted into the connector housing 20 from the rear end opening for securing cable 90 to the retention body 60. Consequently, the connector housing 20 does not need apertures 25 in this variation. Connector housings 20 may also be designed with other features allowing multiple ways for securing cable 90 if desired.

Cable assemblies 200 may include other connector structures or components. For instance, connector 100 may comprise one or more O-rings 65 that may be disposed on one or more grooves 20G of connector housing 20. Likewise, the cable assembly may comprise one or more heat shrinks 98 for assembling the connector 100 to cable 90. Dust caps for connector 100 and other components may be used as well and may secured to threaded portion TP. Further variations of connectors are also discussed below.

Figures 23, 24:
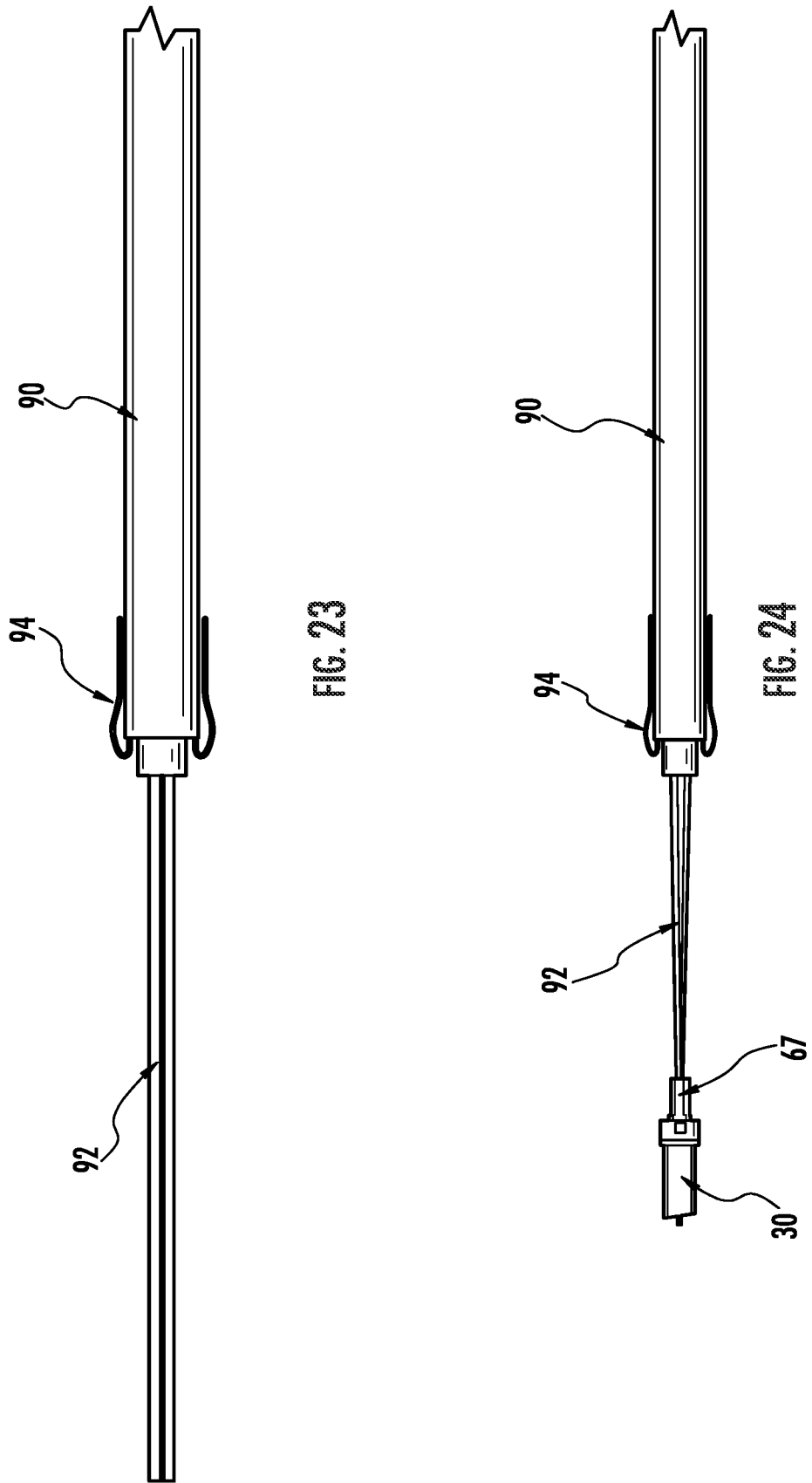

FIGS. 22-31 show explanatory methods for making the fiber optic cable assemblies 200 disclosed herein. Cable assemblies 200 is formed by terminating cable 90 with connector 100. FIG. 22 depicts components of connector 100 slide onto the cable 90 having an optical fiber 92. As depicted, boot 99, heat shrink 98 and connector housing 20 are threaded onto cable 90 in the desired order. Cable 90 may be prepared in any suitable manner for insertion into passageway 22 of connector housing 20. Preparation of cable 90 typically comprises exposing the optical fiber 92 and prepping any other cable components as desired for termination such as strength members 94 or cable jacket 95. As best shown in FIG. 23, cable 90 is prepared so that optical fibers 92 and strength members 94 extend beyond cable jacket 95. Strength members 94 may be any suitable type such as rigid glass-reinforced plastic (GRPs) or flexible yarns such as aramid or fiberglass. In this case, the strength members 94 may be folder rearward for this cable 90 for convenience since they are flexible yarns of a round cable. Cable construction may influence how the cable 90 is secured to the connector housing 20, and may be accomplished in a variety of manners using the concepts disclosed herein.

FIG. 24 depicts inserting and attaching one or more optical fibers 92 of cable 90 within ferrule 30. Ferrule 30 comprises a plurality of bores 32 for receiving one or more optical fibers 92. Optical fibers 92 are secured to ferrule 30 in a suitable fashion such as adhesive like a UV or heat curable material, but other processes are possible. Thereafter, the end face of ferrule 30 is polished or finished as known in the art.

Figure 25:
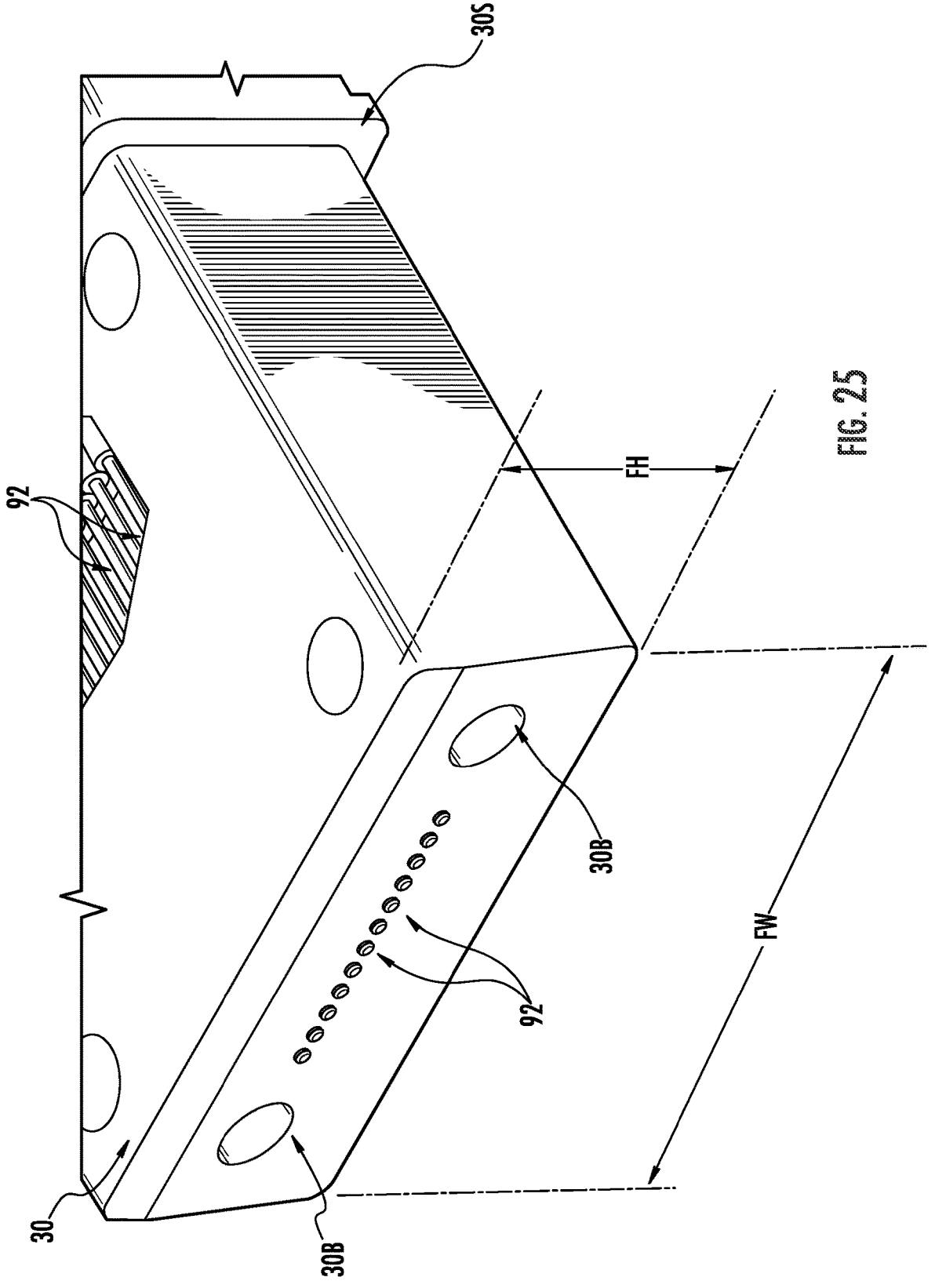
Figure 26:
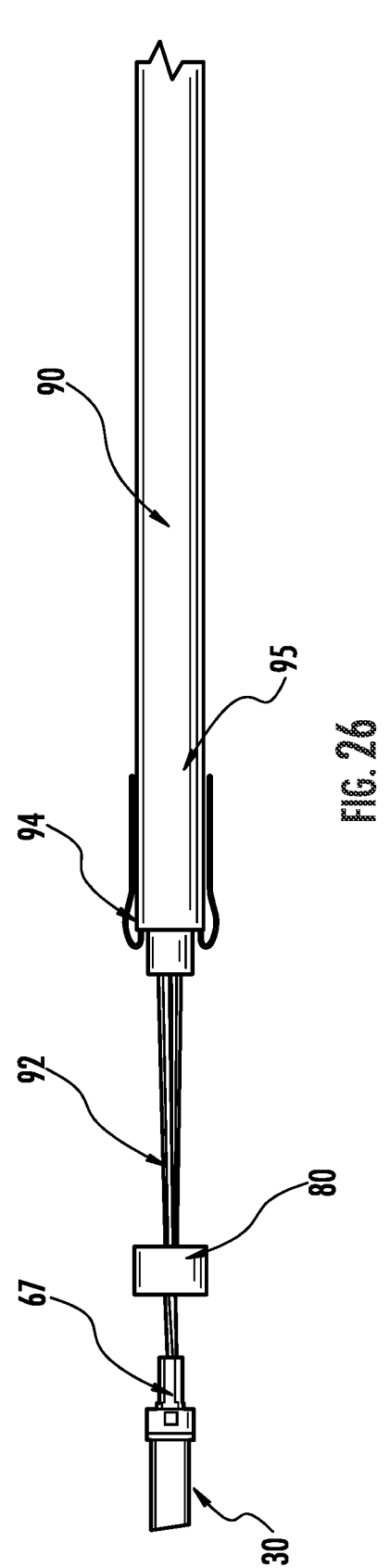

FIG. 25 is a detailed view of ferrule 30 showing optical fibers 92 at the front face of ferrule 30. As depicted, ferrule 30 may comprise a ferrule body having a ferrule shoulder 30S at the rear along with alignment bores 30B for receiving alignment pins as known in the art. If a ferrule boot 67 is used, then the optical fibers 92 are threaded through the ferrule boot 67 before inserting and attaching the optical fibers to the ferrule 30. FIG. 26 depicts an optional plug 80 that may be placed about the optical fibers 92 for inhibiting adhesive or the like from leaking into the forward portion of the connector 100. The plug may also inhibit the pistoning of optical fibers 92 within in the connector 100.

Figure 27:
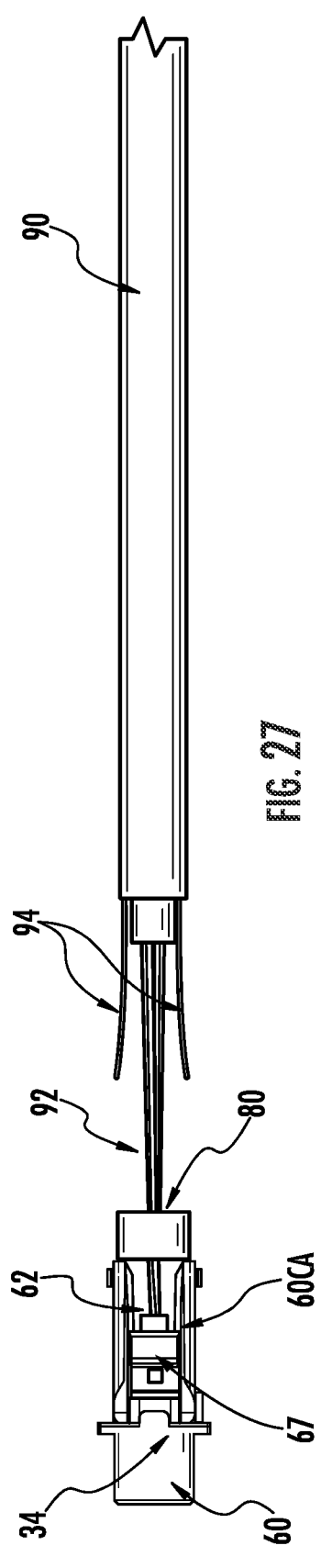
Figures 28, 29:
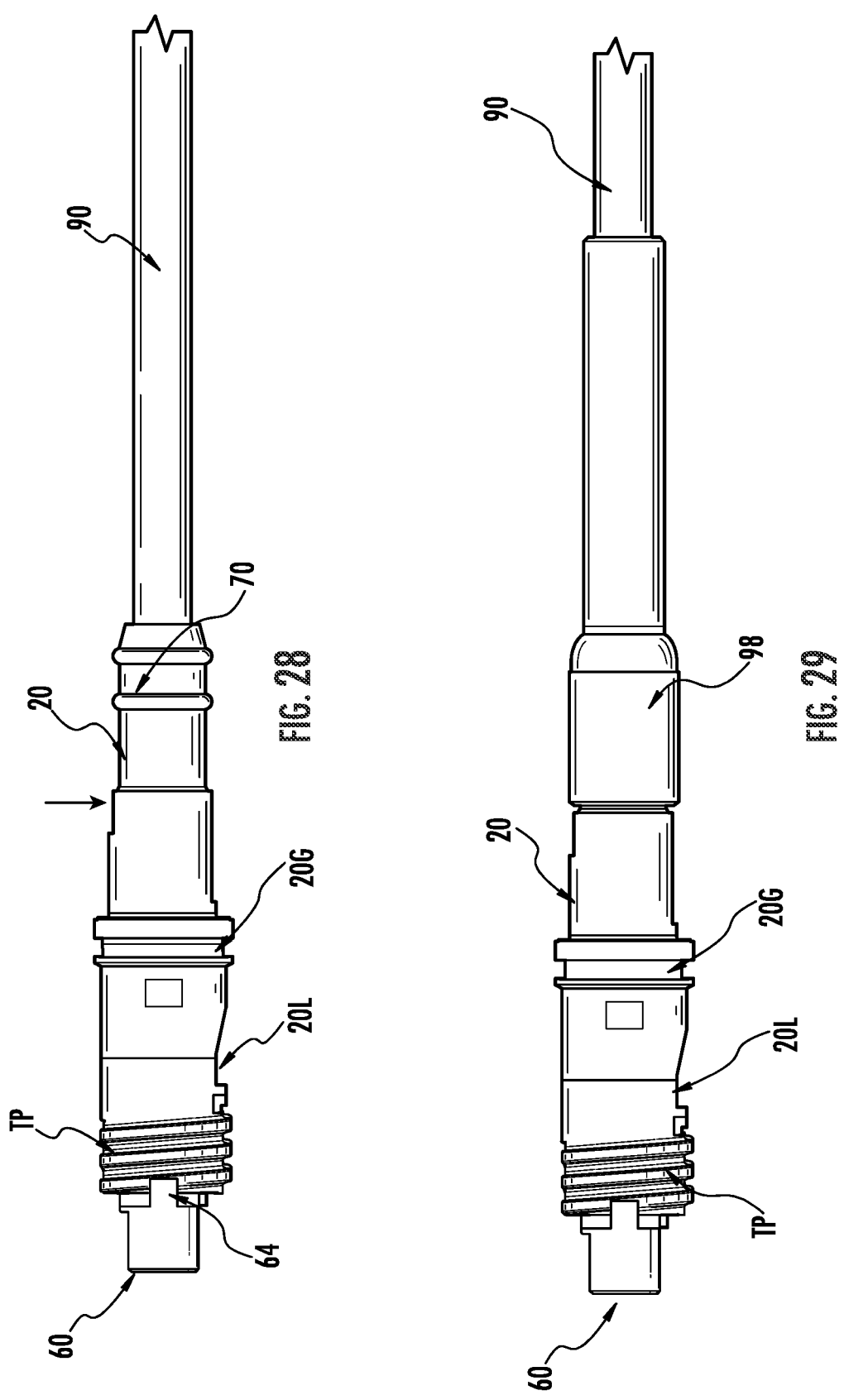

FIG. 27 depicts inserting the ferrule 30 into a passageway 62 of nosepiece 60. The ferrule 30 deflects the cantilevered arms 60CA as it is inserted into the passageway so it may be properly placed within the nosepiece 20. If an angled ferrule 30 the proper orientation of the ferrule 30 with respect to the nosepiece 60 is observed. Then the strength members 94 may be arranged in the proper orientation as shown. Then the connector housing 20 is slid up the cable 90 for inserting the at least one cantilevered arm 60CA of the nosepiece 60 into a passageway 22 of connector housing 20 from the front end 23. Cantilevered arms 20CA of nosepiece 20 are connected at the front end and cantilevered at the rear end so they can be deflected when the connector housing 20 is attached to the nosepiece 20, and then spring back to retain the connector housing 20 to nosepiece 60 once it is fully-inserted as shown. FIG. 28 depicts the nosepiece 20 attached to connector housing 20 with the prepared portion of the cable 90 disposed in the passageway 22 of connector housing 20.

Connector housing 20 may have one or more apertures 25 for placing an adhesive such as epoxy, glue, resin, radiation-curable, polymer (cured using an ultrasonic or induction welding process) or other such materials for securing cable 90 to the connector housing 20. The vertical arrow represents placing an adhesive into the connector housing 20 for securing the cable 90 to connector housing 20. A lower aperture 25 on connector housing 20 allows air to escape and adhesive or the like to wick about the cable and fill the passageway 22 of connector housing 22. Of course, the connector housing 20 may be secured to cable 90 or a portion of cable 90 in any suitable fashion. For instance, connector housing 20 may be terminated or secured to strength members 94 of cable 90 using other manners such as a crimp if desired.

In further variations, a cable having GRPs may be prepared in a suitable manner and secured in a similar manner by placing an adhesive into the connector housing 20. As used herein, "adhesive" means any suitable material for securing the cable 90 to connector housing 20.

However, the use of adhesive is possible without using an aperture 25 if desired. Using an adhesive or the like for securing the retention body 60 to cable 90 allows for the use of many different types or constructions of cables with the retention body 60. By way of explanation, the cable 90 is prepared and adhesive may be inserted into a passageway 62 of retention body 60. The adhesive may be inserted into passageway 22 of connector housing 20 using one or more apertures 25 or it could be placed from the passageway 62. Any suitable adhesive or other like material could be used such as a heat curable, UV curable, or other curing and the adhesive or material may be placed before, during or after the cable 90 is placed into the connector housing 20 as desired. In other variations, the outer jacket or strength members could be shaved to fit inside the passageway 22 of connector housing 20 to fit an oversized cable or shaping the cable to the passageway 22. Moreover, shaving the cable 90 may improve the adhesion to the cable 90.

FIG. 23 depicts ferrule 30 attached to one or more optical fibers 92 of cable 90, and FIG. 24 shows an enlarged view of ferrule 30 having fiber bores 32 for supporting one or more optical fibers 92 of cable 90. Ferrule 30 may support any suitable fiber count in one or more rows of fiber bores 32 or any other suitable arrangement as desired. Ferrule 30 may also have one or more guide pin bores 30B for aligning ferrule 30 of connector 100 with a complimentary mating ferrule or other suitable device using alignment pins as known in the art.

Figure 30:
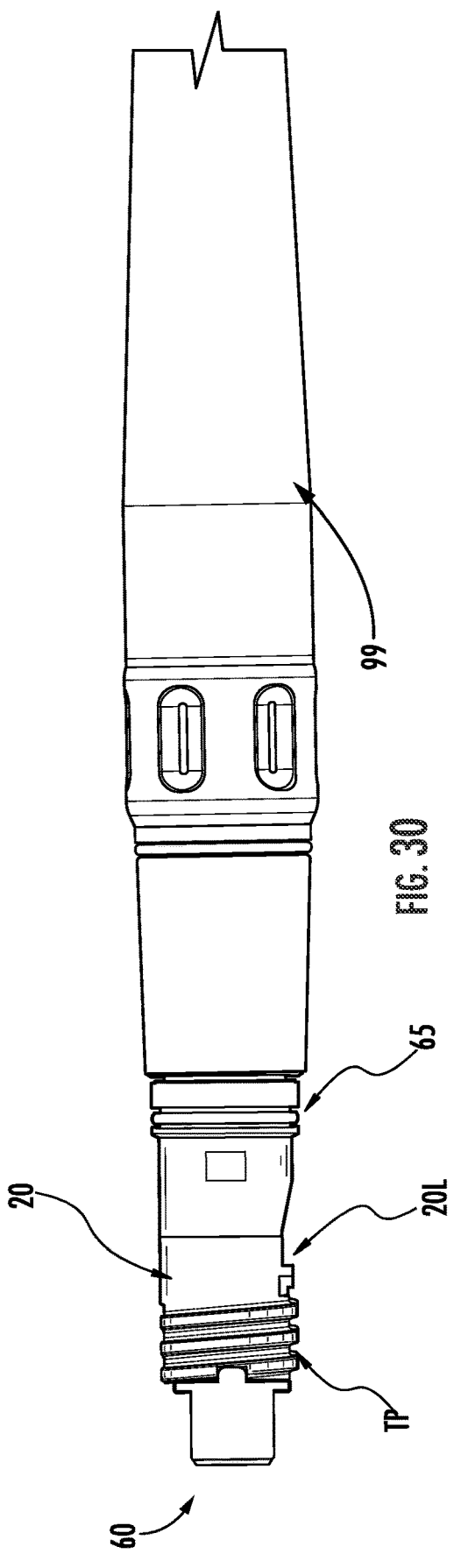

FIG. 29 shows heat shrink 98 may be installed over the rear portion of the connector housing 20 and a portion of cable 90. Connector housing 20 may have on or more ribs 20R for providing a gripping surface for the heat shrink 98. Using a heat shrink aids in making a weather-proof interface between the cable 90 and connector 100 Any suitable size or type of heat shrink such as an adhesive lined heat shrink may be used for sealing or securing components as desired. FIG. 30 depicts a boot 99 attached to a rear portion of connector housing 20. Ribs 20R may also be used for providing a gripping surface for boot 99 if desired. Boot 99 may be omitted if desired, but can provided improved side-pull performance for the cable assembly.

FIG. 31 depicts the optical fibers 92 of the non-round cable 90 attached to the ferrule 30 and is similar to the stage of assembly as shown in FIG. 26 except with a different cable type. In this embodiment, the connector housing 20 is then installed from the front so that the ferrule 30 is inserted into the rear end 21 of the connector housing 20 and passes through passageway 22 so the ferrule 30 goes past the front end 23 of the connector housing as represented by the horizontal arrow. After sliding the connector housing 20 on from the front, the assembly of the cable assembly using this connector housing 20 on the non-round cable is similar to the assembly disclosed herein.

The concepts disclosed also enable small connector footprints. By way of example, connector 100 may have a diameter of 12 millimeters or smaller, but other sizes are possible. The small connector footprint allows relatively smaller terminals using ports with the locking features for securing connector 100. Of course, the concepts disclosed may be used with any suitable connector having a threaded, bayonet, push-pull, or other suitable mating structure.

Explanatory connectors 100 avoid bulky mating structures such as a coupling nut or bayonet used with conventional connectors. In other words, conventional connectors have threaded, bayonet, or push-pull connections that require finger access for connection and disconnecting. By eliminating the structures such as threaded coupling nuts or bayonets on connector 100 (which is a separate component that must rotate about the connector) the spacing between conventional connectors disposed in a terminal may be greatly reduced. Also eliminating the dedicated coupling nut from the conventional connectors also allows the footprint of the connectors to be smaller, and arrays of connectors to likewise be more compact. Likewise, the smaller connector design also advantageously allows the conversion adapter 101 to have a smaller conversion adapter footprint.

FIGS. 32 and 33 are close-up views showing connector 100 using a nosepiece 60 configured for providing further mating options with a dissimilar connector. As best shown in FIG. 33, nosepiece 60 of connector 100 has pocket 60PK for allowing the optical mating of the connector with the dissimilar connector. The pocket 60PK allows the optical mating of connector 100 with the dissimilar connector such as the OptiTap® since the exclusion feature of the dissimilar connector for inhibiting the optical mating with non-compliant connectors is accommodated by the pocket 60PK of the nosepiece 60 of connector 100. Nosepiece 60 also provides connector 100 with convenient inspection and access for cleaning ferrule 30 since the optical mating end face 33 of the ferrule 30 is disposed rearward of the front end 63 of the nosepiece 60 by a recess depth (RD) that is 1 millimeter or less when the male optical plug connector is assembled such as shown in FIG. 7.

Figure 34:
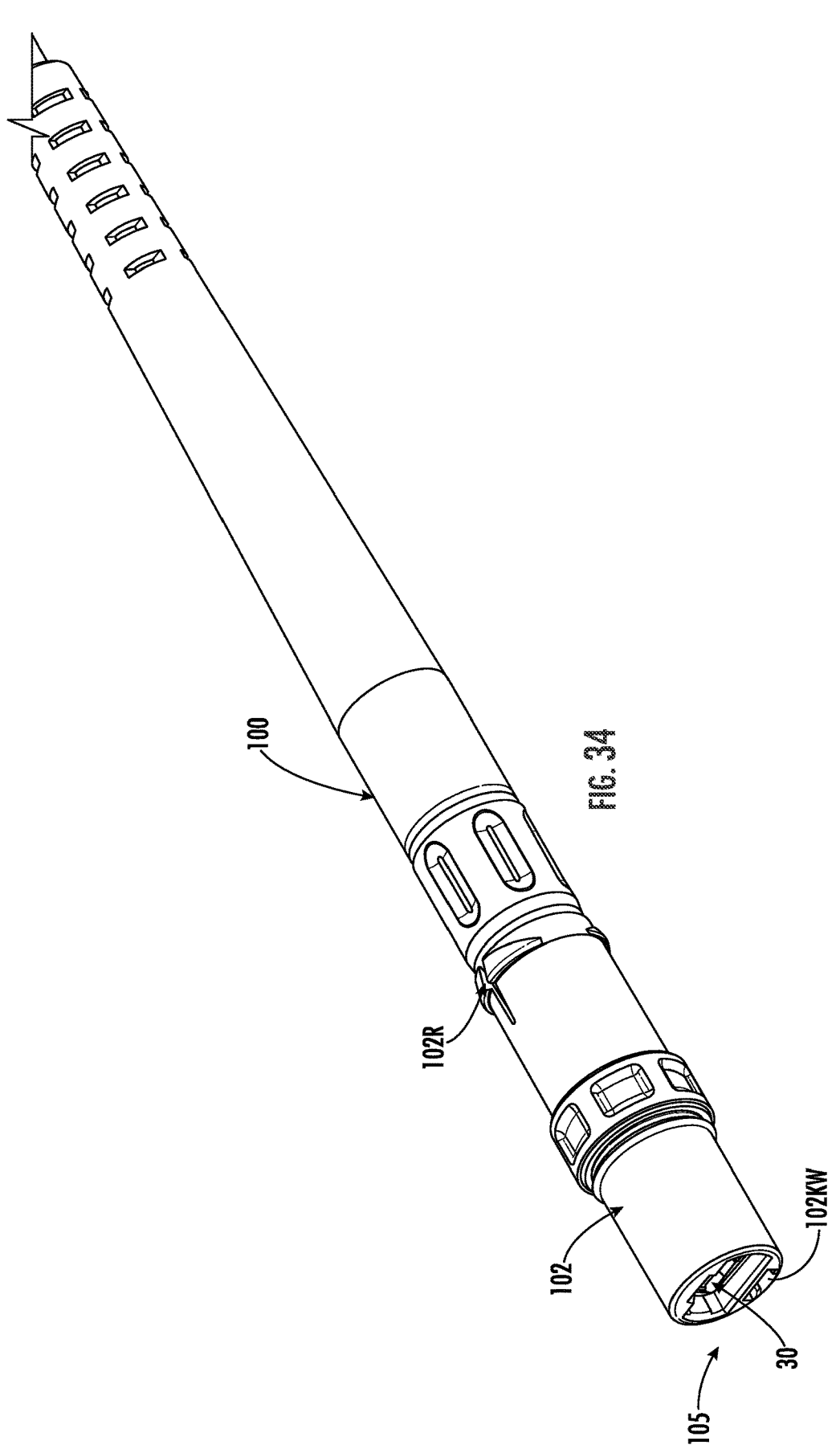
FIG. 34 depicts another view of the explanatory multi-fiber optical connector of further comprising a conversion adapter with the coupling nut removed for the sake of clarity attached to the multi-fiber optical connector for enabling optical mating with a dissimilar connector.
Figure 35:
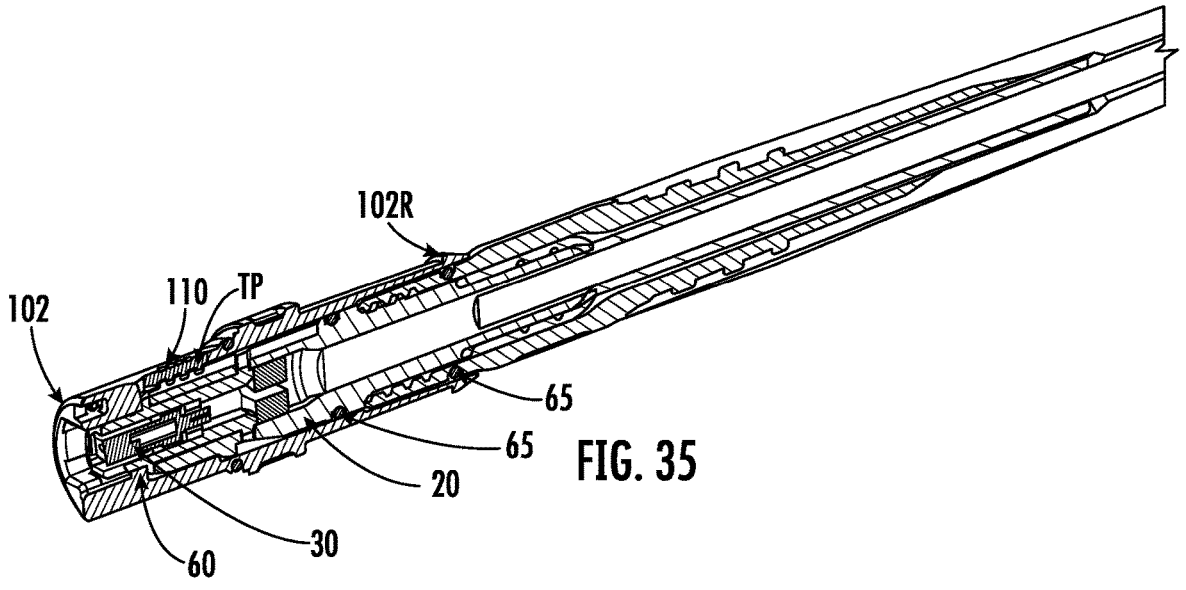
FIG. 35 is a cross-sectional view of the assembled multi-fiber optical connector having the conversion adapter of FIG. 34 for enabling the optical mating with a dissimilar connector.
Figure 36:
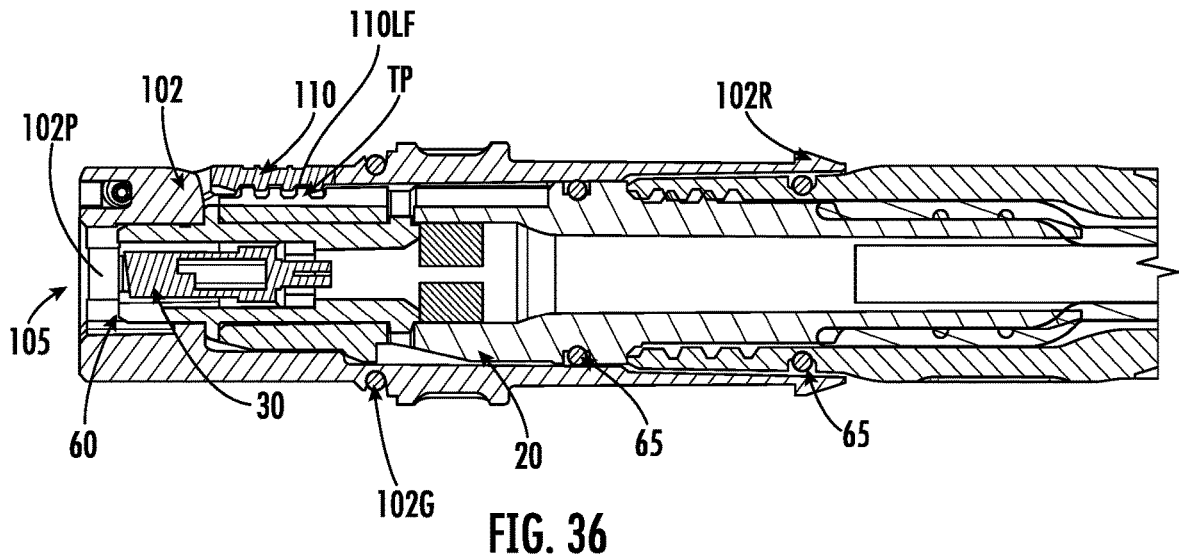
FIG. 36 is a close-up perspective view of the multi-fiber optical connector having a conversion adapter of FIG. 34 for enabling the optical mating with a dissimilar connector.
Figure 37:
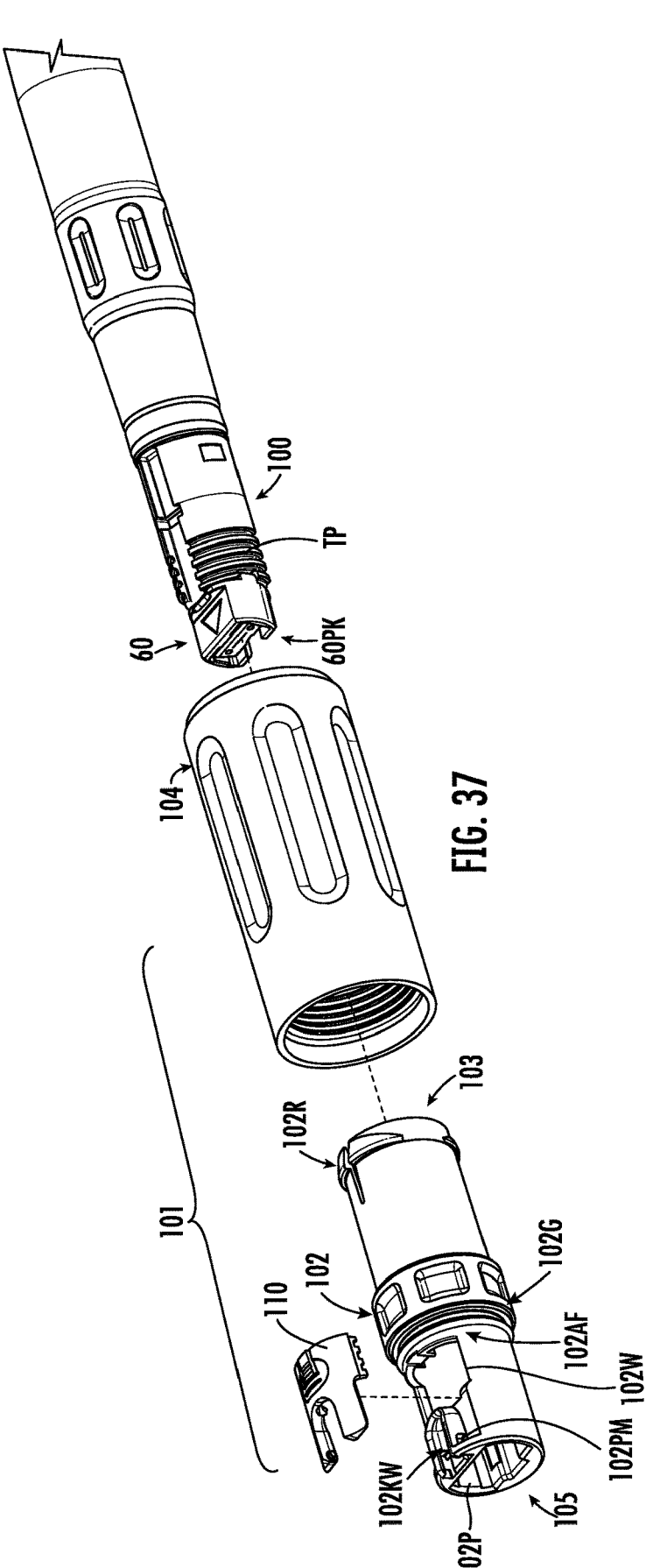
FIG. 37 shows an assembled multi-fiber optical connector with an exploded view of a conversion adapter with the coupling nut for enabling for the optical mating the multi-fiber optical connector with a dissimilar connector.
Figure 38:
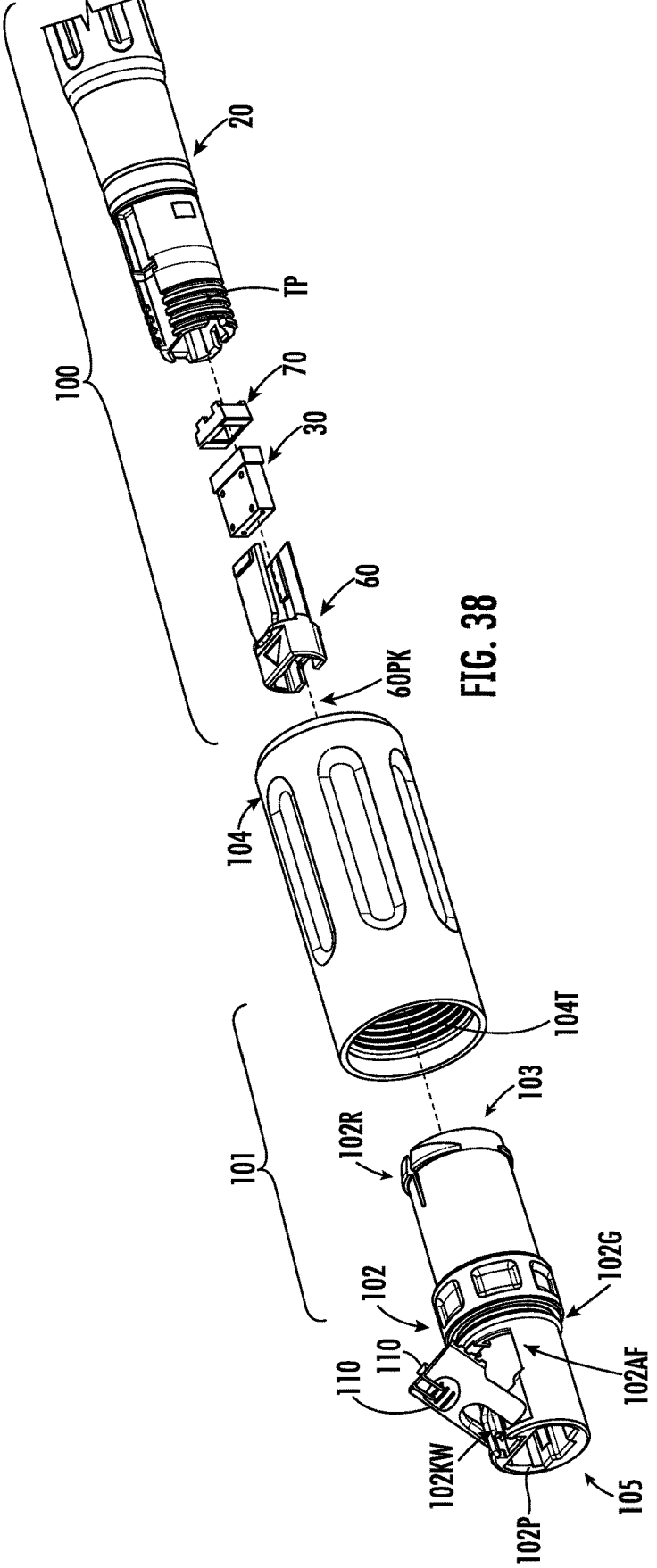
FIG. 38 is a further partially exploded view of the multi-fiber optical connector and conversion adapter of FIG. 37 with the retainer being placed into the window of the adapter with the retainer in the open position.
Figure 43:
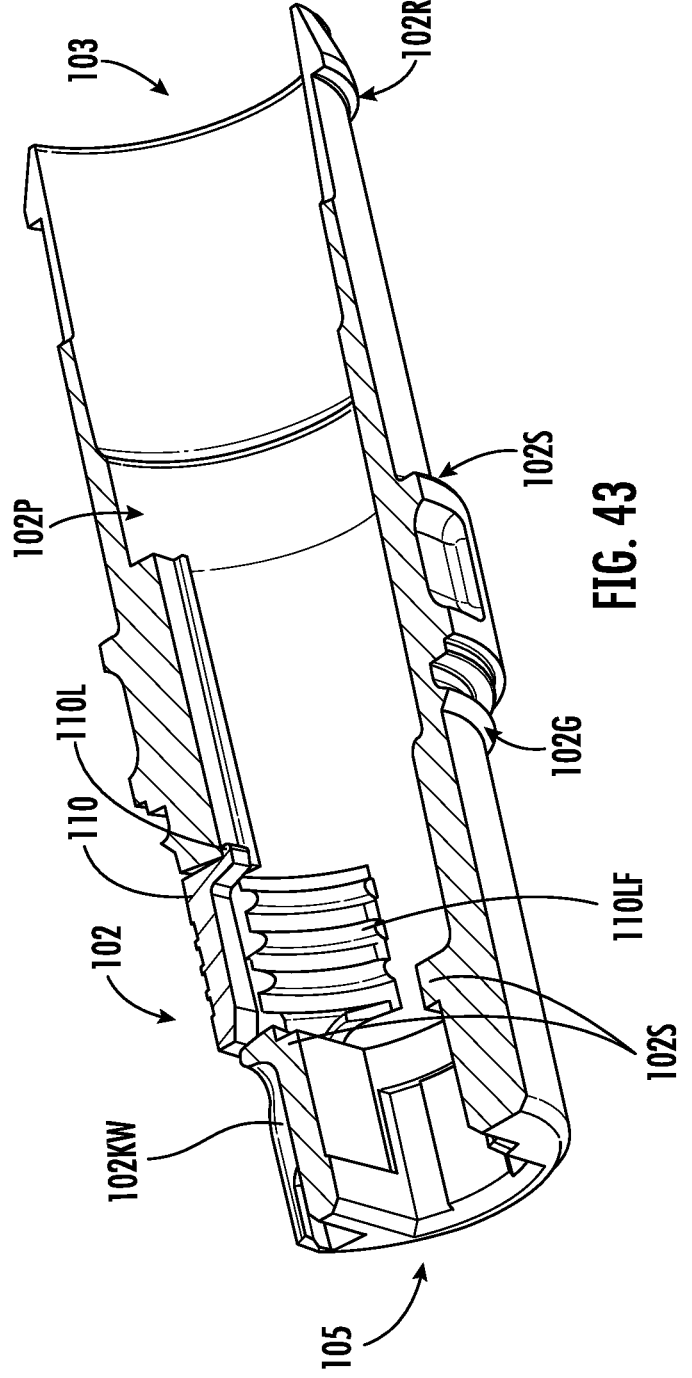
FIGS. 43 and 44 are longitudinal sectional views showing internal details of the adapter of the conversion adapter that receives a portion of the multi-fiber optical connector for enabling optically mating with a dissimilar connector using the conversion adapter.
Figure 44:
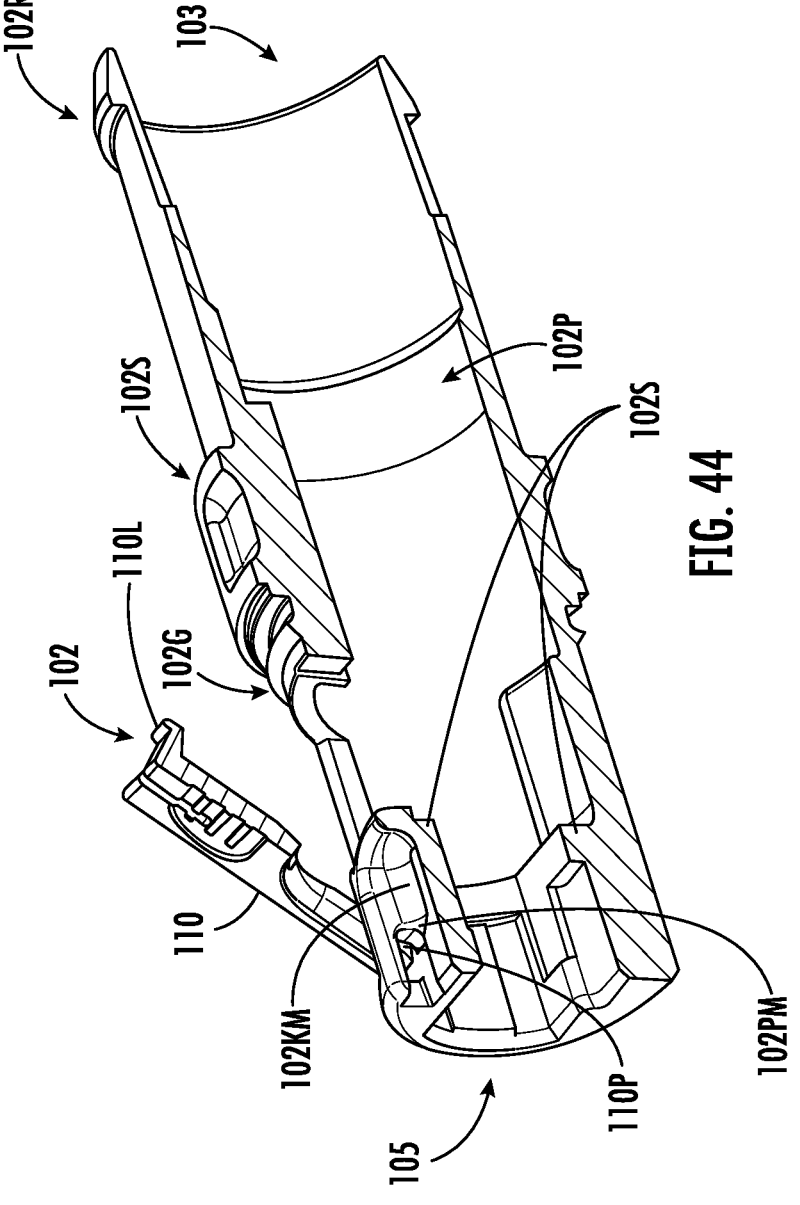

FIGS. 34-44 show various views related to the use of the conversion adapter 101 (FIG. 37) for enabling connector 100 to advantageously optical mate with a dissimilar connector in addition to the intended optical mating of connector 100 with devices having Evolv™ multifiber ports and connectors having Pushlok™ technology (not shown) available from Corning Optical Communications. FIGS. 34-36 depicts the cooperation of the conversion adapter 101 with connector 100 with the coupling nut 104 of the conversion adapter 101 removed for the sake of clarity. FIGS. 37-38 depict partially exploded views for explaining the use of the conversion adapter 101 with connector 100 with the coupling nut 104 depicted for showing the complete conversion adapter 101. FIGS. 43 and 44 depict sectional views of the adapter 102 and retainer 110 of the conversion adapter 101 without connector 10 for illustrating explanatory details. Retainer 110 is used for securing the adapter 102 to the connector housing 20 of connector 100 by engaging the threaded portion (TP) of the connector housing 20 as best shown in FIG. 36.

As shown, pocket 60PK of nosepiece 60 of connector 100 may have any suitable shape for cooperating with an exclusion feature of the dissimilar connector as needed, thereby expanding suitable devices for optical mating. By way of explanation, the exclusion feature of the dissimilar connector extends forward towards the optical mating adjacent to the ferrule and inhibits non-compatible connectors from damaging the ferrule end face of the dissimilar connector if mating with a non-compatible connector is attempted. To overcome this non-compatibility feature of the dissimilar connector, connector 100 uses nosepiece 60 comprising pocket 60PK configured for allowing mating to the dissimilar connector. Dissimilar connector may be an OptiTip® connector such as available from Corning Optical Communications of Charlotte, North Carolina.

Specifically, the pocket 60PK of nosepiece 60 may have a shape that is tailored to contour to accommodate the exclusion feature of the dissimilar connector. The pocket 60PK may be configured as a complete cutout portion through the sidewall of nosepiece 60 at the front end as shown in FIG. 33 or may be configured without having a complete cutout portion through the sidewall of nosepiece 60 at the front end 63. Pocket 60PK may extend from a front end 63 of the nosepiece 60 to a medial portion and is aligned in the longitudinal direction of the connector 100. When mated with the dissimilar connector, pocket 60PK is configured for providing a space for the exclusion feature of the dissimilar connector to occupy without inhibiting the mating of respective ferrules of the mating connectors.

FIGS. 34-36 show connector 100 inserted into the conversion adapter 101 with the coupling nut 104 removed for clarity. FIG. 37 depicts an exploded view of conversion adapter 101 comprising adapter 102, coupling nut 104, and retainer 110. As shown, connector 100 is received at the rear end 103 into the passageway 102P of the adapter 102 when it is desired for optical mating with the dissimilar connector. Conversion adapter 101 receives the dissimilar connector at the front end 105 of the adapter 102 into the passageway 102P using the keying for proper rotational alignment, and then the internal threads of the coupling nut 104 may engage the external threads for securing the optical mating between the dissimilar connector and connector 100.

FIGS. 34 and 35 shows connector 100 inserted into the passageway 102P of the adapter 102 of conversion adapter 101 in preparation for optical mating with dissimilar connector. Dissimilar connector may be inserted into the front end of assembly and secured using coupling nut 104 depicted in FIG. 37. As shown, conversion adapter 101 comprises an adapter 102, a coupling nut 104 and a retainer 110 that fits into a window 102W of adapter 102. Adapter 102 may be secured to the connector housing 20 using the retainer 110. Coupling nut 104 is disposed about the adapter 102 and may freely rotate in both directions about the adapter 102 when assembled so the internal threads on the coupling nut 104 may secure and release the dissimilar connector for mating and unmating as desired. Adapter 102 comprises a passageway 102P extending between a rear end 103 to a front end 105 for receiving respective connectors on opposing ends for optical mating within passageway 102P. As depicted in FIG. 36, when connector 100 is disposed within adapter 102 the pocket 60PK of nosepiece 60 is at least partially disposed within the adapter 102. Additionally, connector 100 may comprise one or more grooves disposed on the rear part of the connector 100 for receiving an O-ring 65 for environmental sealing the interface of the connector 100 and conversion adapter 101 near the rear end 103 of the passageway 102P of adapter 102.

Adapter 102 also comprises a female keyway 102KW on the outer surface of the adapter 102 at the front end 103. As shown, the female keyway 102KW extends to the front end 105 of adapter 102. Female keyway 102KW is configured for aligning the dissimilar connector 300 in the rotational orientation for proper alignment when optically mating the opposing ferrules of respective connectors using the conversion adapter 101. When the connector 100 is assembled with the adapter 102, the pocket 60PK of nosepiece 60 of connector is radially disposed on the opposite side from the female keyway 102KW on the outer surface of the adapter 102 as shown in FIG. 34. In other words, the pocket 60PK of nosepiece 60 of connector is disposed about 180 degrees from the female keyway 102KW of adapter 102. The female keyway 102KW on the outer surface of the adapter 102 is on the same side as the adapter window 102 as best shown in FIG. 37.

As best depicted in FIGS. 43 and 44, adapter 102 comprises a shoulder 102S on the outer surface at a medial portion. Shoulder 102S of the adapter 102 acts as a forward stop for the coupling nut 104 of the conversion adapter 101. Coupling nut 104 also comprises an attachment feature 104T at the front end for securing the optical mating between connector 100 and dissimilar connector 300. As depicted, the attachment feature 104T comprises threads disposed on an internal surface at the front end of coupling nut 104. Attachment feature 104T of coupling nut 104 cooperates with the corresponding structure such as complementary threads on the external portion of the housing of the dissimilar connector for securing the mating between connector 100 and the dissimilar connectors.

Adapter 102 may be attached to connector 100 in any suitable manner and may cooperate with the threaded portion (TP) of the connector housing 20. For instance, the conversion adapter 101 may include retainer 110 for cooperating with the threaded portion (TP) of connector housing 20 for attaching or securing to connector 100 as disclosed. However, adapter 102 may use other fastening feature with or without the retainer 110. For instance, a fastening feature may be disposed within passageway 102P that cooperates with the threaded portion TP of connector housing 20 such as an alignment finger that is flexible finger and arranged transversely with the longitudinal axis of adapter 102 such as generally aligned with the fastening feature. The alignment finger may deflect outward when installing the adapter 102 onto the connector 100 and once the proper position is reached on connector 100 by engaging with an alignment window 20AW of the connector housing 20 as depicted in FIG. 32.

As shown, adapter 102 may also comprise a groove 102G on the outer surface that may receive a sealing member such as an O-ring (not shown) as desired. The O-ring may provide a seal between the adapter 102 and the dissimilar connector 300. Although, adapter 102 is configured as a component as shown in FIG. 35 the adapter 102 may be formed from more than one component if desired.

Figure 39:
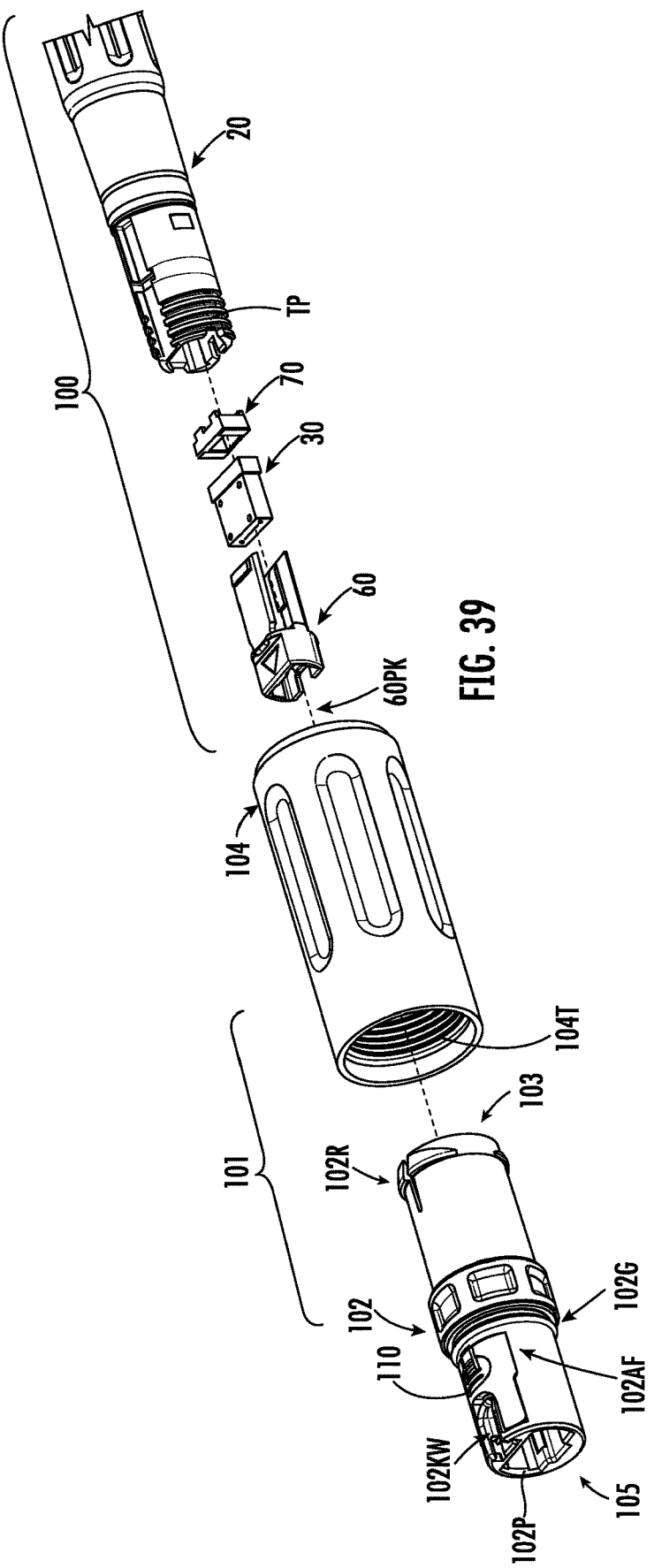
FIG. 39 depicts another exploded view of the multi-fiber optical connector and the conversion adapter of FIG. 37 with the retainer placed into the window of the adapter with the retainer in the closed position.

FIGS. 37-39 show various views of connector 100 and conversion adapter 101 with the retainer 110 and coupling nut 104. As depicted, adapter 102 comprises a window 102W for receiving the retainer 110 so that a portion of the retainer 110 may engage the threaded portion (TP) of the connector 100 for securing the adapter 102 of the conversion adapter 101 to the connector 100. Window 102W is shaped and contoured for receiving the retainer 110 and cooperating with the other structure of the adapter. Retainer 110 may attach to the adapter 102 in any suitable fashion. As depicted, retainer 110 may comprise a pivot point disposed near the front end of the retainer 110, thereby allowing the retainer 110 to rotate relative to the adapter 102 for securing the adapter 102 to the connector 100. Likewise, the adapter 102 comprises a pivot mount 102PM for cooperating with the pivot point 110P of retainer 110. Retainer 110 may also include a suitable structure for securing the retainer 100 in the attach position for securing to the connector 100 and inhibiting unintended release of the adapter 102 from the connector 100. For instance, structure for securing the retainer 110 may be a detent, latch or the like that cooperates with the adapter 110.

FIG. 37 depicts an exploded view of the conversion adapter 101 with the retainer 110 and coupling nut 104 exploded from the adapter 102. FIG. 38 depicts the retainer 110 attached to the adapter 102 at pivot mount 102PM and in the open position for receiving the connector 100 into the passageway 102P of the adapter, and FIG. 39 depicts the retainer 110 in the closed position such as required for securing the connector 100 in the adapter 102 once the connector 100 is fully-inserted into the adapter 102 for retaining the same.

Figure 40:
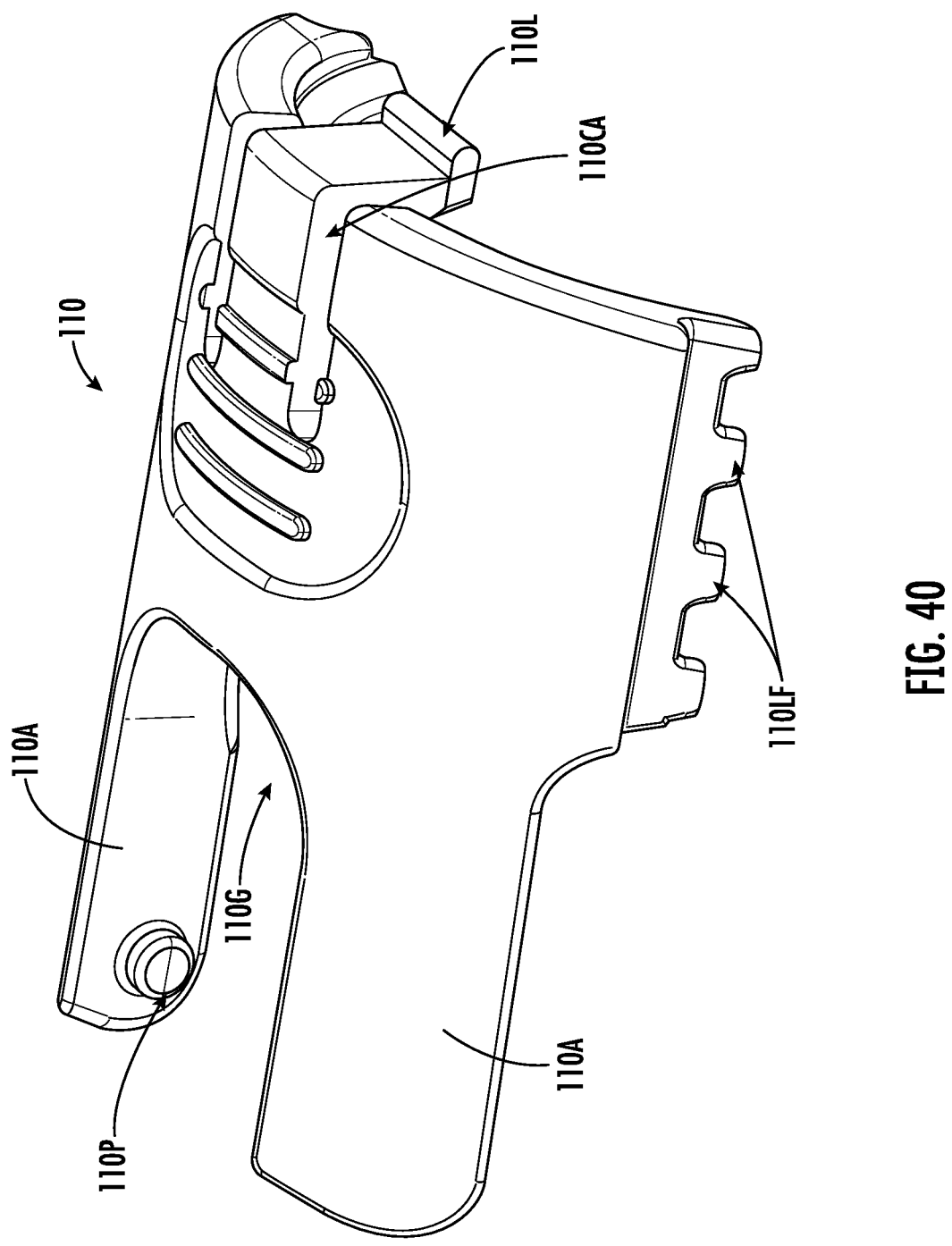
FIG. 40 is a detailed top perspective view of the retainer of the conversion adapter used for securing the conversion adapter to the multi-fiber optical connector for enabling the optical mating with a dissimilar connector.
Figure 41:
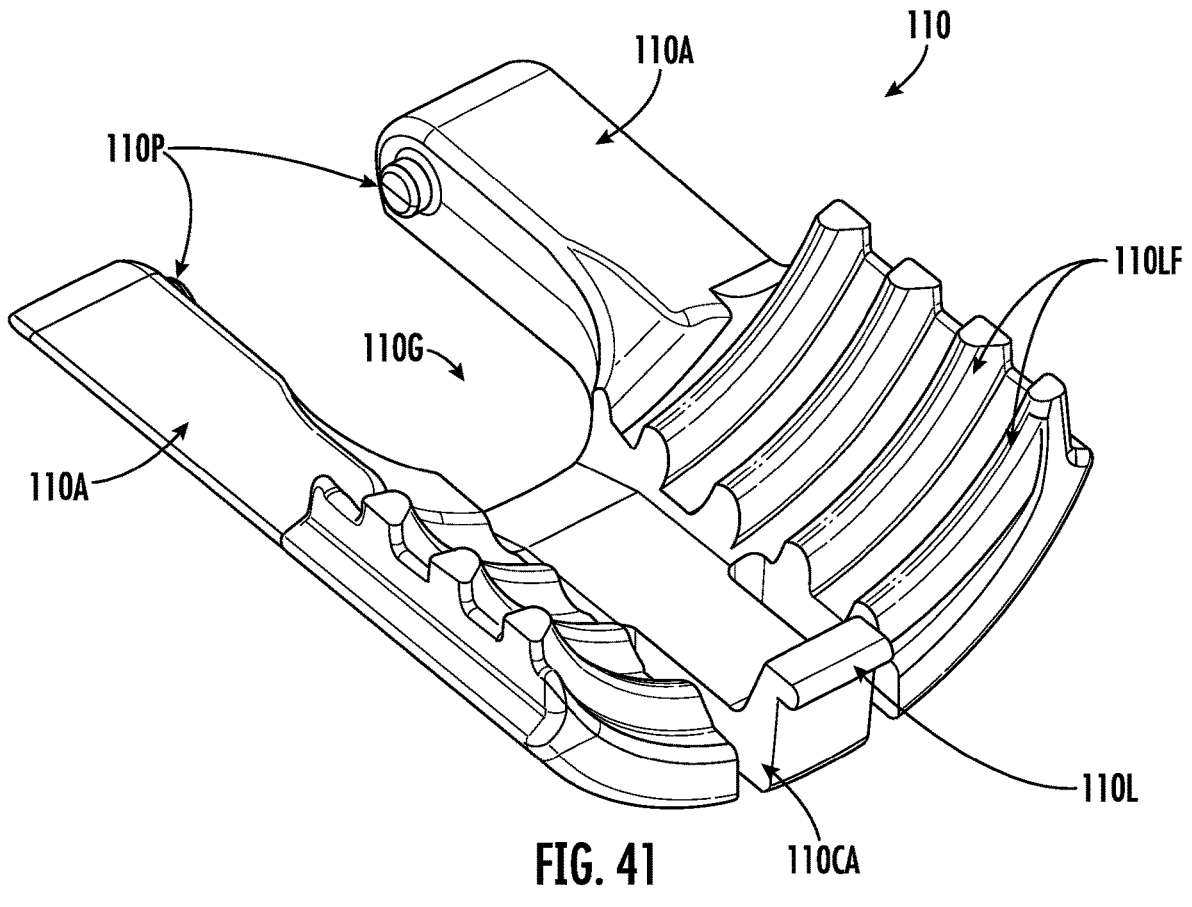
FIG. 41 is a detailed bottom perspective view of the retainer of the conversion adapter used for securing the conversion adapter to the multi-fiber optical connector for enabling the optical mating with a dissimilar connector.
Figure 42:
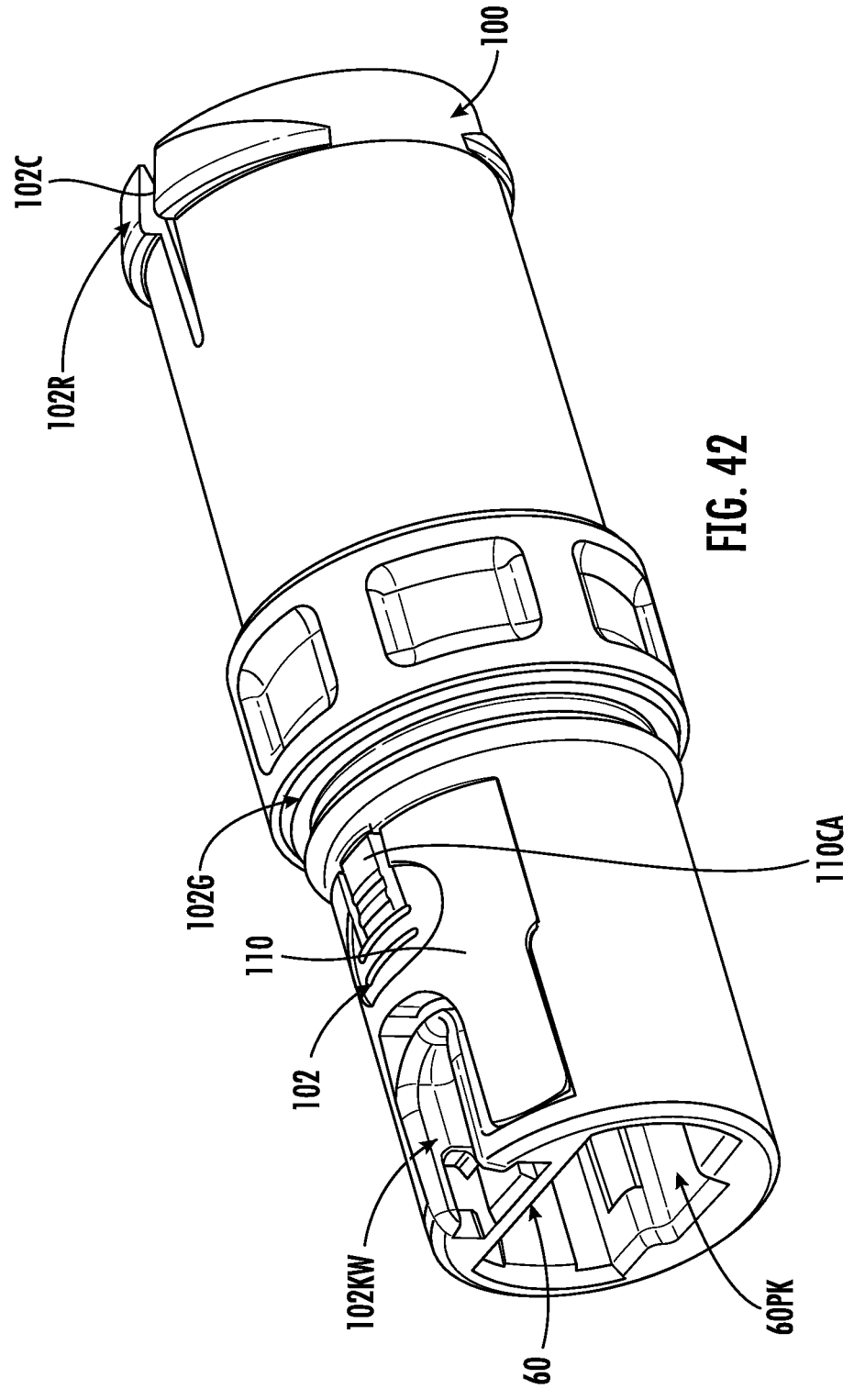
FIG. 42 shows a perspective view of the conversion having the retainer disposed in the window of the conversion adapter as when assembled to the multi-fiber optical connector without the coupling nut for clarity purposes.

FIGS. 40 and 41 show respective close-up top and bottom perspective views of retainer 110 of conversion adapter 101. As depicted, retainer 110 includes pivot points 110P on a first end and a latching feature 110L at the second end. The pivot points 110P are disposed on the opposing inner portions of retainer arms 110A that are spaced apart to form gap 110G. The gap 110G between the retainer arms 110A may have a horseshoe shape that conforms with the female keyway 102KW on the outer surface of the adapter 102, but other shapes for the gap are possible. The gap 110G between the retainer arms 110A also allows the retainer arms 110A to slightly flex so that the retainer 110 may be easily attached to the pivot mount 102PM of the adapter 102. The pivot points 110P of the retainer are configured as pin protrusions for allowing the rotation of the retainer 110 on the pivot mount 102PM of the adapter 102. However, the pivot points could be configured as holes or other structure on the retainer arms 102A to cooperate with the pivot mount 102PM disposed on the adapter 102.

As best shown in FIG. 41, the bottom portion of the retainer 110 comprises a locking feature 110LF for cooperating with the threaded portion (TP) on the connector housing 20 of the connector 100. In this embodiment, the locking feature 110LF are ridges formed in the curved bottom surface of the retainer 110 and are configured to cooperate with the threaded portion (TP) of the retainer 110 for securing the connector 100 when fully-inserted into the adapter 102 as depicted in FIG. 36. As depicted, the ridges of the locking feature 110LF on retainer 110 are configured to align and fit the valleys of the threaded portion (TP) of the connector housing 20. Retainer 110 also includes a latching structure 110L for securing the retainer 110 in the closed position for securing to the connector 100 to adapter 102 of the conversion adapter 101. As shown, retainer 110 comprises a cantilevered arm 110CA that extends from the medial portion to the second end of the retainer. The cantilevered arm 110CA includes a latch 110L on the end portion. The latch 110L cooperates with structure on the adapter 102 and may deflect and spring back to a retain position when engaging, thereby securing the retainer 110 in a closed position relative to the adapter 102. FIGS. 43 and 44 depict longitudinal sectional views of the retainer 110 attached to adapter 102 for showing details of the construction.

Other pivot constructions or pivot locations are possible for retainer 110. For instance, the retainer 110 need not pivot relative to the adapter, but instead could use a snap-fit attachment by pushing the retainer 110 into the window 102W of the adapter. In other embodiments, the retainer 100 may be attached to the adapter 102. For instance, an edge of retainer 110 may comprise a living hinge so that the retainer is integrally-formed with the adapter 102 for convenience.

To assemble the conversion adapter 101 to the connector the coupling nut 104 is threaded over the connector 100, and the connector is aligned and fully inserted into the rear end 103 of the passageway 102P of the adapter 102. Once the adapter 102 is properly inserted the retainer 110 may be rotated into the closed position so it latches to the adapter 102 for securing the connector 100 to the adapter by way of the retainer 110 engaging the threaded portion (TP) of the connector housing 20. The coupling nut 104 is pushed onto adapter 102 from the rear end 105 until it is properly positioned over the adapter. Adapter 102 may comprise one or more retainers 102R at the rear end 105 for inhibiting the coupling nut 104 from sliding too far rearward once positioned in place about the adapter 102. Retainer 102R of adapter 102 may be configured as a protrusion shaped like a ramp for with a forward-facing ledge so that once the coupling nut 104 is positioned in place it remains in place during normal operation and is inhibited from excessive rearward displacement. As shown, adapter 102 may also have one or more cutouts 102C arranged adjacent to the retainer 102R for allowing the rear end 105 of the adapter 102 to slightly flex to a smaller size and allowing the coupling nut 104 to move over the rear end 105 of the adapter and be captured on the adapter 102, thereby forming the conversion adapter 101. The geometry of the adapter 102 may allow different shaped coupling nuts 104 to be used that have similar functionality.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A male plug optical connector, comprising:
a ferrule comprising a plurality of bores for receiving one or more optical fibers, wherein the ferrule comprises an optical mating end face;
a nosepiece comprising a front portion and a rear portion along with a passageway extending from a front end to a rear end, wherein the front portion comprises a pocket disposed forward of a male key on a same side of the nosepiece, and the rear portion comprises at least one cantilevered arm, and the optical mating end face of the ferrule is disposed rearward of the front end of the nosepiece by a recess depth that is 1 millimeter or less when the male optical plug connector is assembled;
a connector housing comprising a longitudinal passageway extending from a rear end to a front end and a female key disposed on an outer surface along with a threaded portion integrally formed on the outer surface of the connector housing; and
a conversion adapter comprising:
an adapter comprising a passageway capable of receiving a portion of the connector housing of the male plug connector therein, the adapter comprising a female keyway on an outer surface of the adapter for keying with the dissimilar connector and a window disposed adjacent to the female keyway;
a coupling nut capable of receiving a portion of the adapter therethrough and comprising internal threads; and
a retainer that fits into the window of the adapter for securing the adapter to the connector housing by engaging the threaded portion of the connector housing.

2. The male plug optical connector of claim 1, the connector housing further comprising a locking feature integrally formed in the housing.

3. A male plug optical connector and a conversion adapter for mating the male plug with a dissimilar connector:
the male plug optical connector, comprising:
a ferrule comprising a plurality of bores for receiving one or more optical fibers;
a connector housing comprising a longitudinal passageway extending from a rear end to a front end with a female key disposed on an outer surface, and a locking feature integrally formed in the connector housing along with a threaded portion integrally formed on the outer surface of the connector housing;
a nosepiece comprising a front portion and rear portion along with a passageway extending from a front end to a rear end, wherein the front portion comprises a pocket disposed forward of a male key on the same side of the nosepiece, and the rear portion comprises a first cantilevered arm, a second cantilevered arm; and
the conversion adapter comprising:
an adapter comprising a passageway capable of receiving a portion of the connector housing of the male plug connector therein, the adapter comprising a female keyway on an outer surface of the adapter for keying with the dissimilar connector and a window disposed adjacent to the female keyway; and
a coupling nut capable of receiving a portion of the adapter therethrough and comprising internal threads; and
a retainer that fits into the window of the adapter for securing the adapter to the connector housing by engaging the threaded portion of the connector housing.

4. The male plug optical connector of claim 3, wherein the connector housing comprises a front opening sized for receiving a portion of the first cantilevered arm and a portion of the second cantilevered arm.

5. A male plug optical connector and a conversion adapter for mating the male plug with a dissimilar connector:
the male plug optical connector comprising:
a ferrule comprising a plurality of bores for receiving one or more optical fibers;

a nosepiece comprising a front portion and a rear portion along with a passageway extending from a front end to a rear end, wherein the front portion comprises a pocket disposed forward of a male key on the same side of the nosepiece, and the rear portion comprises a first cantilevered arm, and a second cantilevered arm;

a connector housing comprising a longitudinal passageway extending from a rear end to a front end with a female key disposed on an outer surface, and a locking feature integrally formed in the housing along with a threaded portion integrally formed on the outer surface of the connector housing, wherein the connector housing comprises a front opening sized for receiving a portion of the first cantilevered arm and a portion of the second cantilevered arm, and the longitudinal passageway is sized so that the ferrule may pass through a rear opening of the connector housing through the longitudinal passageway and through a front opening of the connector housing; and the conversion adapter comprising:

an adapter comprising a passageway capable of receiving a portion of the connector housing of the male plug connector therein, the adapter comprising a female keyway on an outer surface of the adapter for keying with the dissimilar connector and a window disposed adjacent to the female keyway; and a coupling nut capable of receiving a portion of the adapter therethrough and comprising internal threads; and a retainer that fits into the window of the adapter for securing the adapter to the connector housing by engaging the threaded portion of the connector housing.

6. The male plug optical connector of claim 5, wherein the passageway of the nosepiece is sized for receiving the ferrule therein.

7. A male plug optical connector and a conversion adapter for mating the male plug with a dissimilar connector:

the male plug optical connector comprising:

a ferrule comprising a plurality of bores for receiving one or more optical fibers;

a nosepiece comprising a front portion and rear portion along with a passageway extending from a front end to a rear end, wherein the front portion comprises a pocket disposed forward of a male key on a same side of the nosepiece, and the rear portion comprises a first cantilevered arm, a second cantilevered arm, wherein the passageway is sized for receiving the ferrule therein;

a connector housing comprising a longitudinal passageway extending from a rear end and a front end with a female key disposed on an outer surface, and a locking feature integrally formed in the connector housing along with a threaded portion integrally formed on the outer surface of the connector housing, wherein the connector housing comprises a front opening sized for receiving a portion of the first cantilevered arm and a portion of the second cantilevered arm, and the longitudinal passageway is sized so that the ferrule may pass through a rear opening of the connector housing through the longitudinal passageway and through a front opening of the connector housing; and the conversion adapter comprising:

an adapter comprising a passageway capable of receiving the connector housing of the male plug connector therein, the adapter comprising a female keyway on an outer surface of the adapter for keying with the dissimilar connector and a window disposed adjacent to the female keyway;

a coupling nut capable of receiving a portion of the adapter therethrough and comprising internal threads; and a retainer that fits into the window of the adapter for securing the adapter to the connector housing by engaging the threaded portion of the connector housing.

8. The male plug optical connector of claim 7, wherein the locking feature is a subtractive portion from a cylindrical geometry of the connector housing.

9. A male plug optical connector and a conversion adapter for mating the male plug with a dissimilar connector:

the male plug optical connector comprising:

a ferrule comprising a plurality of bores for receiving one or more optical fibers;

a nosepiece comprising a front portion and a rear portion along with a passageway extending from a front end to a rear end, wherein the front portion comprises a pocket disposed forward of a male key on a same side of the nosepiece, and the rear portion comprises a first cantilevered arm, a second cantilevered arm, wherein the passageway is sized for receiving the ferrule therein;

a connector housing comprising a longitudinal passageway extending from a rear end to a front end with a female key disposed on an outer surface, and a locking feature integrally formed in the connector housing and configured as a subtractive portion from a cylindrical sleeve geometry along with a threaded portion integrally formed on the outer surface of the connector housing, and wherein the connector housing comprises a front opening sized for receiving a portion of the first cantilevered arm and a portion of the second cantilevered arm, and the longitudinal passageway is sized so that the ferrule may pass through a rear opening of the connector housing through the longitudinal passageway and through a front opening of the connector housing; and the conversion adapter comprising:

an adapter comprising a passageway capable of receiving the connector housing of the male plug connector therein, the adapter comprising a female keyway on an outer surface of the adapter for keying with the dissimilar connector and a window disposed adjacent to the female keyway;

a coupling nut capable of receiving a portion of the adapter therethrough and comprising internal threads; and a retainer that fits into the window of the adapter for securing the adapter to the connector housing by engaging the threaded portion of the connector housing.

10. The male plug optical connector of claim 9, wherein the locking feature comprises a ramp with a ledge.

11. A male plug optical connector and a conversion adapter for mating the male plug with a dissimilar connector:

the male plug optical connector comprising:

a ferrule comprising a plurality of bores for receiving one or more optical fibers;

a nosepiece comprising a front portion and a rear portion along with a passageway extending from a front end to a rear end, wherein the front portion comprises a pocket disposed forward of a male key on a same side of the nosepiece, and the rear portion comprises a first cantilevered arm, a second cantilevered arm, wherein the passageway is sized for receiving the ferrule therein; and a connector housing comprising a longitudinal passageway extending from a rear end to a front end with a female key disposed on an outer surface (OS), and a locking feature (20L) integrally formed in the connector housing that is a subtractive portion from a cylindrical sleeve geometry of the connector housing and comprises a ramp with a ledge along with a threaded portion integrally formed on the outer surface of the connector housing, and wherein the connector housing comprises a front opening sized for receiving a portion of the first cantilevered arm and a portion of the second cantilevered arm, and the longitudinal passageway is sized so that the ferrule may pass through a rear opening of the connector housing through the longitudinal passageway and through a front opening of the connector housing; and the conversion adapter comprising:

an adapter comprising a passageway capable of receiving the connector housing of the male plug connector therein, the adapter comprising a female keyway on an outer surface of the adapter for keying with the dissimilar connector and a window disposed adjacent to the female keyway; and a coupling nut capable of receiving a portion of the adapter therethrough and comprising internal threads; and a retainer that fits into the window of the adapter for securing the adapter to the connector housing by engaging the threaded portion of the connector housing.

12. The male plug optical connector of claim 11, the ferrule is allowed limited movement between about 100-400 microns of movement in three degrees of freedom in the unmated state.

13. A male plug optical connector and a conversion adapter for mating with a dissimilar connector:

the male plug optical connector comprising:

a ferrule comprising a plurality of bores for receiving one or more optical fibers;

a nosepiece comprising a front portion and a rear portion along with a passageway extending from a front end to a rear end, wherein the front portion comprises a pocket disposed forward of a male key on a same side of the nosepiece), and the rear portion comprises a first cantilevered arm, a second cantilevered arm, wherein the passageway is sized for receiving the ferrule therein;

a connector housing comprising a longitudinal passageway extending from a rear end to a front end with a female key disposed on an outer surface, and a locking feature integrally formed in the connector housing that is a subtractive portion from a cylindrical sleeve geometry and comprises a ramp with a ledge along with a threaded portion integrally formed on the outer surface of the connector housing, and wherein the connector housing comprises a front opening sized for receiving a portion of the first cantilevered arm and a portion of the second cantilevered arm, and the longitudinal passageway is sized so that the ferrule may pass through a rear opening of the connector housing through the longitudinal passageway and through a front opening of the connector housing; and the conversion adapter comprising:

an adapter comprising a passageway capable of receiving the connector housing of the male plug connector therein, the adapter comprising a female keyway on an outer surface of the adapter for keying with the dissimilar connector and a window disposed adjacent to the female keyway;

a coupling nut capable of receiving a portion of the adapter therethrough and comprising internal threads; and a retainer that fits into the window of the adapter for securing the adapter to the connector housing by engaging the threaded portion of the connector housing.

14. The male plug optical connector of claim 11, wherein the female key is disposed about 180 degrees apart from the locking feature on the connector housing.

15. A male plug optical connector and a conversion adapter for mating the male plug with a dissimilar connector:

the male plug optical connector comprising:

a ferrule comprising a plurality of bores for receiving one or more optical fibers;

a nosepiece comprising a front portion and a rear portion along with a passageway extending from a front end to a rear end, wherein the front portion comprises a pocket disposed forward of a male key on a same side of the nosepiece, and rear portion comprises a first cantilevered arm, a second cantilevered arm, wherein the passageway is sized for receiving the ferrule therein, wherein the ferrule is allowed limited movement between about 100-400 microns of movement in each of the three degrees of freedom in the unmated state; and a connector housing comprising a longitudinal passageway extending from a rear end to a front end with a female key disposed on an outer surface, and a locking feature integrally formed in the connector housing that is a subtractive portion from a cylindrical sleeve geometry and comprises a ramp with a ledge along with a threaded portion integrally formed on the outer surface of the connector housing, wherein the female key is disposed about 180 degrees apart from the locking feature and the connector housing comprises a front opening sized for receiving a portion of the first cantilevered arm and a portion of the second cantilevered arm, and the longitudinal passageway is sized so that the ferrule may pass through a rear opening of the connector housing through the longitudinal passageway and through a front opening of the connector housing; and the conversion adapter comprising:

an adapter comprising a passageway capable of receiving the connector housing of the male plug connector therein, the adapter comprising a female keyway on an outer surface of the adapter for keying with the dissimilar connector and a window disposed adjacent to the female keyway; and a coupling nut capable of receiving a portion of the adapter therethrough and comprising internal threads; and a retainer that fits into the window of the adapter for securing the adapter to the connector housing by engaging the threaded portion of the connector housing.

16. The male plug optical connector of claim 15, the nosepiece further comprising a male keying feature.

17. A male plug optical connector and a conversion adapter for mating the male plug with a dissimilar connector:

the male plug optical connector comprising:

a ferrule comprising a plurality of bores for receiving one or more optical fibers;

a nosepiece comprising a front portion and a rear portion along with a passageway extending from a front end to a rear end, wherein the front portion comprises a pocket disposed forward of a male key on a same side of the nosepiece, and rear portion comprises a first cantilevered arm, a second cantilevered arm, a male keying feature, wherein the passageway is sized for receiving the ferrule therein, wherein the ferrule is allowed limited movement between about 100-400 microns of movement in each of the three degrees of freedom in the unmated state; and a connector housing comprising a longitudinal passageway extending from a rear end to a front end with a female key disposed on an outer surface, and a locking feature integrally formed in the connector housing that is a subtractive portion from a cylindrical sleeve geometry and comprises a ramp with a ledge along with a threaded portion integrally formed on the outer surface of the connector housing, wherein the female key is disposed about 180 degrees apart from the locking feature and the connector housing comprises a front opening sized for receiving a portion of the first cantilevered arm and a portion of the second cantilevered arm, and the longitudinal passageway is sized so that the ferrule may pass through a rear opening of the connector housing through the longitudinal passageway and through a front opening of the connector housing; and the conversion adapter comprising:

an adapter comprising a passageway capable of receiving the connector housing of the male plug connector therein, the adapter comprising a female keyway on an outer surface of the adapter for keying with the dissimilar connector and a window disposed adjacent to the female keyway;

a coupling nut capable of receiving a portion of the adapter therethrough and comprising internal threads; and a retainer that fits into the window of the adapter for securing the adapter to the connector housing by engaging the threaded portion of the connector housing.

18. The male plug optical connector of claim 17, further comprising a plug configured for being received in the connector housing.

19. A male plug optical connector and a conversion adapter for mating the male plug with a dissimilar connector:

the male plug optical connector comprising:

a ferrule comprising a plurality of bores for receiving one or more optical fibers;

a nosepiece comprising a front portion and a rear portion along with a passageway extending from a front end to a rear end, wherein the front portion comprises a pocket disposed forward of a male key on a same side of the nosepiece, and rear portion comprises a first cantilevered arm, a second cantilevered arm, a male keying feature, wherein the passageway is sized for receiving the ferrule therein, wherein the ferrule is allowed limited movement between about 100-400 microns of movement in each of the three degrees of freedom in the unmated state;

a connector housing comprising a longitudinal passageway extending from a rear end to a front end with a female key disposed on an outer surface, and a locking feature integrally formed in the connector housing that is a subtractive portion from a cylindrical sleeve geometry and comprises a ramp with a ledge along with a threaded portion integrally formed on the outer surface of the connector housing, wherein the female key is disposed about 180 degrees apart from the locking feature and the connector housing comprises a front opening sized for receiving a portion of the first cantilevered arm and a portion of the second cantilevered arm, and the longitudinal passageway is sized so that the ferrule may pass through a rear opening of the connector housing through the longitudinal passageway and through a front opening of the connector housing;

a plug configured for being received in the connector housing; and the conversion adapter comprising:

an adapter comprising a passageway capable of receiving the connector housing of the male plug connector therein, the adapter comprising a female keyway on an outer surface of the adapter for keying with the dissimilar connector and a window disposed adjacent to the female keyway; and a coupling nut capable of receiving a portion of the adapter therethrough and comprising internal threads; and a retainer that fits into the window of the adapter for securing the adapter to the connector housing, and wherein the retainer engages the threaded portion of the connector housing for securing the adapter to the male plug optical connector.

20. The male plug optical connector of claim 19, wherein the retainer is attached to the adapter at a pivot point.

21. The male plug optical connector of claim 19, wherein the ferrule comprises an optical mating end face, and the optical mating end face is disposed rearward of the front end of the nosepiece by a recess depth that is 1 millimeter or less when the male optical plug connector is assembled.

22. The male plug optical connector of claim 19, wherein the nosepiece comprises a ferrule back stop disposed within a passageway of the nosepiece for limiting travel of the ferrule in a Z-direction.

23. The male plug optical connector of claim 19, wherein the threaded portion is interrupted by the female key.

24. The male plug optical connector of claim 19, wherein the pocket of the nosepiece is radially disposed on the opposite side from female keyway of the adapter when assembled.

25. The male plug optical connector of claim 19, wherein the pocket of the nosepiece is disposed about 180 degrees from the female keyway when assembled.

26. The male plug optical connector of claim 19, wherein the adapter comprises an internal fastening feature comprising internal threads.

27. The male plug optical connector of claim 19, wherein the adapter comprises an alignment finger that acts as a rotational stop for the adapter with respect to the connector.

28. The male plug optical connector of claim 27, wherein the connector housing comprises an alignment window for cooperating with the alignment finger.

29. The male plug optical connector of claim 19, wherein the adapter comprises a shoulder that acts as a forward stop for the coupling nut.

30. The male plug optical connector of claim 19, further comprising an O-ring.

31. The male plug optical connector of claim 19, wherein the connector housing comprises one or more windows for securing the nosepiece.

32. The male plug optical connector of claim 19, wherein the nosepiece comprises a non-round cross-section.

33. The male plug optical connector of claim 19, wherein the connector housing comprises a cylindrical sleeve with one or more features integrally formed in the primitive geometry of the cylindrical sleeve.

34. The male plug optical connector of claim 19, wherein an interface between the connector housing and the nosepiece comprises one or more clocking features for rotational alignment.

35. The male plug optical connector of claim 19, the connector housing further comprising at least one aperture disposed in a rear portion.

36. The male plug optical connector of claim 19, further comprising a spacer.

37. The male plug optical connector of claim 19, wherein the nosepiece comprises one or more rails.

38. The male plug optical connector of claim 37, wherein a distance D between a first rail disposed on a first side of the nosepiece and a second rail on an opposing side of the nosepiece is between 100-400 microns larger than a complimentary dimension of the ferrule.

39. The male plug optical connector of claim 19, wherein the fiber optic connector is a portion of a cable assembly comprising a fiber optic cable having an optical fiber.

40. The male plug optical connector of claim 39, wherein the fiber optic cable and the optical fiber are secured to the connector housing with an adhesive, epoxy, or glue.

41. The male plug optical connector of claim 39, wherein the fiber optic cable comprises one or more tensile yarns or glass-reinforced plastics that are secured to the retention body.

42. The male plug optical connector of claim 39, wherein the fiber optic cable comprises a round cross-section or a non-round cross-section.

43. The male plug optical connector of claim 19, further comprising one or more heat shrinks.

44. The male plug optical connector of claim 19, further comprising a ferrule boot having a portion that fits within the ferrule.

45. The male plug optical connector of claim 19, further comprising a connector boot.

46. The male plug optical connector of claim 19, wherein the multi-fiber optical connector excludes a spring for biasing the ferrule to a forward position.

47. A method of making an optical cable assembly comprising a male plug optical connector and a conversion adapter for mating the male plug with a dissimilar connector:

inserting one or more optical fibers of a fiber optic cable into a rear opening of a connector housing and through the longitudinal passageway the connector housing and through a front opening of the connector housing, wherein the connector housing comprises a female key disposed on an outer surface along with a threaded portion integrally formed on the outer surface of the connector housing;

attaching the one or more optical fibers to a ferrule;

inserting the ferrule into a passageway of a nosepiece, wherein the nosepiece comprises a front portion and a rear portion along with a passageway extending from a front end to a rear end, wherein the front portion comprises a pocket disposed forward of a male key on a same side of the nosepiece, and the rear portion comprises at least one cantilevered arm;

inserting the at least one cantilevered arm of the nosepiece into the passageway of the connector housing from the front end;

placing an adhesive into the connector housing for securing the fiber optic cable to the connector housing; and attaching the conversion adapter to the connector, comprising:

placing a coupling nut comprising internal threads about a portion of an adapter comprising a passageway and a female keyway on an outer surface of the adapter for keying with the dissimilar connector;

attaching the connector housing within a portion of the passageway of the adapter; and securing the connector housing to the adapter by inserting a retainer that fits into a window of the connector housing disposed adjacent to a female keyway of the connector housing, thereby securing the adapter to the male plug optical connector by engaging the threaded portion of the connector housing with a portion of the retainer.

48. The method of claim 47, wherein the connector housing further comprises a locking feature integrally formed in the connector housing for retaining the fiber optic connector in a complimentary device.

49. The method of claim 48, wherein the locking feature comprises a ramp with a ledge.

50. The method of claim 47, the connector housing further comprising a female key.

51. The method of claim 47, wherein the ferrule is allowed limited movement between about 100-400 microns of movement in each of the three degrees of freedom in the unmated state.

52. The method of claim 47, wherein the nosepiece comprises one or more rails.

53. The method of claim 52, wherein a distance D between a first rail disposed on a first side of the nosepiece and a second rail on an opposing side of the nosepiece is between 100-400 microns larger than a complimentary dimension of the ferrule.

54. The method of claim 47, wherein the fiber optic cable comprises a non-round cable.

55. The method of claim 47, wherein the pocket of the nosepiece is radially disposed on the opposite side from female keyway of the adapter when assembled.

56. The method of claim 47, wherein the pocket of the nosepiece is disposed about 180 degrees from the female keyway when assembled.

57. The method of claim 47, wherein the adapter comprises an internal fastening feature configured as internal threads.

58. The method of claim 47, wherein the adapter comprises an alignment finger that acts as a rotational stop for the adapter with respect to the connector.

59. The method of claim 47, wherein the connector housing comprises an alignment window for cooperating with the alignment finger.

60. The method of claim 47, wherein the adapter comprises a shoulder that acts as a forward stop for the coupling nut.

61. The method of claim 47, wherein the step of placing the adhesive into the connector housing secures an optical fiber and strength component to the connector housing.

62. The method of claim 47, wherein the multi-fiber optical connector excludes a spring for biasing the ferrule to a forward position.

63. A conversion adapter for mating dissimilar connectors comprising:

an adapter comprising a passageway configured for receiving the connector housing of a male plug connector therein, a female keyway on an outer surface of the adapter configured for keying a dissimilar connector for mating with the male plug connector and a window, along with an internal fastening feature comprising internal threads;

a retainer that fits into the window of the adapter for securing the adapter to the connector housing, wherein the retainer engages the threaded portion of the connector housing for securing the adapter to the male plug optical connector; and a coupling nut capable of receiving a portion of the adapter therethrough and comprising internal threads.

64. The conversion adapter of claim 63, wherein the retainer comprises a pivot point for rotating with respect to the adapter.

65. The conversion adapter of claim 63, wherein the adapter comprises a shoulder that acts as a forward stop for the coupling nut.

\* \* \* \* \*